(12) United States Patent
Krenzer et al.

(10) Patent No.: US 10,592,768 B2
(45) Date of Patent: Mar. 17, 2020

(54) HOUGH PROCESSOR

(71) Applicant: Fraunhofer-Gesellschaft zur Foerderung der angewandten Forschung e.V., Munich (DE)

(72) Inventors: Daniel Krenzer, Wutha-Farnroda (DE); Albrecht Hess, Schoenbrunn (DE); András Kátai, Ilmenau (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 15/228,826

(22) Filed: Aug. 4, 2016

(65) Prior Publication Data

US 2016/0342856 A1 Nov. 24, 2016

Related U.S. Application Data

(63) Continuation of application No. PCT/EP2015/052001, filed on Jan. 30, 2015.

(30) Foreign Application Priority Data

Feb. 4, 2014 (DE) .................. 10 2014 201 997

(51) Int. Cl.
*G06K 9/46* (2006.01)
*G06K 9/00* (2006.01)
(Continued)

(52) U.S. Cl.
CPC ......... *G06K 9/4671* (2013.01); *G06F 17/145* (2013.01); *G06K 9/0061* (2013.01);
(Continued)

(58) Field of Classification Search
CPC .. G06K 9/4633; G06K 9/481; G06K 9/00604; G06K 9/00986; G06K 9/0061
See application file for complete search history.

(56) References Cited

U.S. PATENT DOCUMENTS

| | | |
|---|---|---|
| 3,069,654 A | 12/1962 | Hough |
| 5,832,138 A | 11/1998 | Nakanishi et al. |
| | (Continued) | |

FOREIGN PATENT DOCUMENTS

| | | |
|---|---|---|
| CN | 103297767 A | 9/2013 |
| DE | 102004046617 A1 | 4/2006 |
| | (Continued) | |

OTHER PUBLICATIONS

Chen et al: "Quantization-free parameter space reduction in ellipse detection", ESA, 2011.*
(Continued)

*Primary Examiner* — Ruiping Li
(74) *Attorney, Agent, or Firm* — Perkins Coie LLP; Michael A. Glenn

(57) ABSTRACT

A Hough processor comprises a pre-processor and a Hough transformation unit. The pre-processor is configured to receive a plurality of samples respectively comprising an image and in order to rotate or reflect the image of the respective sample. The Hough transformation unit is configured to collect a predetermined searched pattern in the plurality of samples on the basis of a plurality of versions. The Hough transformation unit comprises a characteristic being dependent on the searched pattern, which is adjustable according to the searched pattern.

30 Claims, 24 Drawing Sheets

(51) Int. Cl.

| | | |
|---|---|---|
| *G06F 17/14* | (2006.01) | |
| *G06T 7/33* | (2017.01) | |
| *G06T 7/73* | (2017.01) | |
| *G06T 7/77* | (2017.01) | |
| *G06T 7/13* | (2017.01) | |
| *G06K 9/48* | (2006.01) | |
| *G06T 3/40* | (2006.01) | |
| *G06T 3/60* | (2006.01) | |
| *G06T 5/00* | (2006.01) | |

(52) U.S. Cl.
CPC ..... *G06K 9/00335* (2013.01); *G06K 9/00597* (2013.01); *G06K 9/00604* (2013.01); *G06K 9/00986* (2013.01); *G06K 9/4633* (2013.01); *G06K 9/481* (2013.01); *G06T 3/40* (2013.01); *G06T 3/60* (2013.01); *G06T 5/002* (2013.01); *G06T 7/13* (2017.01); *G06T 7/337* (2017.01); *G06T 7/74* (2017.01); *G06T 7/77* (2017.01); *G06T 2207/10012* (2013.01); *G06T 2207/20008* (2013.01); *G06T 2207/20061* (2013.01); *G06T 2207/30201* (2013.01)

(56) References Cited

U.S. PATENT DOCUMENTS

| | | | |
|---|---|---|---|
| 7,164,807 | B2 | 1/2007 | Morton et al. |
| 7,948,493 | B2 | 5/2011 | Frank et al. |
| 9,619,884 | B2 | 4/2017 | Zhao et al. |
| 2003/0179921 | A1 | 9/2003 | Sakai et al. |
| 2006/0274973 | A1 | 12/2006 | Mohamed et al. |
| 2007/0014552 | A1 | 1/2007 | Ebisawa |
| 2007/0066916 | A1 | 3/2007 | Lemos |
| 2008/0012860 | A1* | 1/2008 | Klefenz ............... G06K 9/0061 345/441 |
| 2008/0310730 | A1 | 12/2008 | Hayasaki et al. |
| 2012/0106790 | A1 | 5/2012 | Sultana et al. |
| 2013/0083999 | A1 | 4/2013 | Bhardwaj et al. |
| 2013/0346844 | A1 | 12/2013 | Graepel et al. |
| 2016/0079538 | A1 | 3/2016 | Uezawa et al. |
| 2016/0335475 | A1 | 11/2016 | Krenzer et al. |
| 2017/0032214 | A1 | 2/2017 | Ruf et al. |
| 2017/0200304 | A1 | 7/2017 | Li |

FOREIGN PATENT DOCUMENTS

| | | | |
|---|---|---|---|
| DE | 102005047160 B4 | | 6/2007 |
| JP | 07244738 A | | 9/1995 |
| JP | 2002288670 A | | 10/2002 |
| JP | 2003157408 A | | 5/2003 |
| JP | 2003223630 A | | 8/2003 |
| JP | 2005038121 A | | 2/2005 |
| JP | 2005230049 A | | 9/2005 |
| JP | 2006285531 A | | 10/2006 |
| JP | 2008513168 A | | 5/2008 |
| JP | 2008546088 A | | 12/2008 |
| JP | 2009510571 A | | 3/2009 |
| JP | 2011112398 A | | 6/2011 |
| KR | 20140066789 A | | 6/2014 |
| WO | 2006032253 A1 | | 3/2006 |

OTHER PUBLICATIONS

Fitzgibbon, A. et al., "Direct least square fitting of ellipses", IEEE Transactions on Pattern Analysis and Machine Intelligence, Jg. 21 (Nr. 5), 1999, pp. 476-480.

Klefenz, F. et al., "Real-time calibration-free autonomous eye tracker", Acoustics Speech and Signal Processing (ICASSP), 2010 IEEE International Conference on, IEEE, Piscataway, NJ, USA, Mar. 14, 2010, pp. 762-766.

Kublbeck, Christian et al., "Face Detection and Tracking in Video Sequences Using the Modified Census Transformation", Image and Vision Computing, Elsevier, Guildford, GB., Jun. 2006, pp. 564-572.

Lischka, T., "Untersuchung eines Eye Tracker Prototypen zur automatischen Operationsmikroskopsteuerung", Doktorarbeit, Universität Hamburg, Translated in English by Machine, 2007, 75 pages.

Schreiber, K., "Erstellung und Optimierung von Algorithmen zur Messung von Augenbewegungen mittels Video-Okulographie-Methoden", Diplomarbeit, Universität Tübingen, Online verfügbar unter: http://www.genista.de/manches/diplom/diplom.html (zuletzt geprüft am: Oct. 23, 2011), (With English Translation by Machine), 1999, 135 pages.

Spindler, F. et al., "Gaze Control Using Human Eye Movements", Proceedings of the 1997 IEEE International Conference on Robodics and Automation. Albuquerque, Apr. 20-25, 1997; [Proceedings of the IEEE International Conference on Robotics and Automation], New York, IEEE, US, vol. conf. 14, Apr. 20, 1997 (Apr. 20, 1997),, Apr. 20, 1997, pp. 2258-2263.

Stockman, G. C. et al., "Equivalence of Hough Curve Detection to Template Matching", Communications of the ACM, XP055185730, Retrieved from the Internet: URL:http://dl.acm.org/citation.cfm?doid=359863.359882 [retrieved on Apr. 24, 2015], Nov. 30, 1977, pp. 365-372.

Viola, Paul et al., "Robust Real-Time Object Detection", Second International Workshop on Statistical and Computational Theories of Vision—Modeling, Learning, Computing and Sampling, Jul. 13, 2001, 1-25.

Crowley, James L., "A Representation for Visual Information", Pittsburgh, Pennsylvania, URL:http://www-prima.imag.fr/jlc/papers/Crowley-Thesis81.pdf, Nov. 1981.

Ebisawa, Y. et al., "Remote Eye-gaze Tracking System by One-Point Gaze Calibration", Official journal of the Institute of Image Information and Television Engineers, vol. 65, No. 12, p. 1768-1775 Japan, The Institute of Image Information and Television Engineers, Dec. 1, 2011, Dec. 1, 2011.

Hezel, S. et al., "FPGA-Based Template Matching Using Distance Transforms", Filed-Programmable Custom Computing Machines. Proceedings 10th Annual IEEE Symposium on Apr. 22-24, 2002, Piscataway NJ., Apr. 22, 2002, pp. 89-97.

Husar, Peter et al., "Autonomes, Kalibrationsfreies and Echtzeitfaehiges System zur Blickrichtungsverfolgung Eines Fahrers", VDE-Kongress 2010- E-Mobility: Technologien-Infrastruktur Markte Nov. 8, 2010-Nov. 9, 2010 at Leipzig, Deutschland, Jan. 1, 2010, pp. 1-4.

Kohlbecher, S., "Calibration-free eye tracking by reconstruction of the pupil ellipse in 3D space", ETRA '08 Proceedings of the 2008 Symposium on Eye Tracking Research & Applications, Jan. 1, 2008, pp. 135-138.

Liang, Xuejun et al., "Data Buffering and Allocation in Mapping Generealized Template Matching on Reconfigurable Systems", The Journal of Supercomputing, Kluwer Academic Publishers, May 1, 2001, pp. 77-91.

Safaee-Rad, Reza et al., "Three-Dimensional Location Estimation of Circular Features for Machine Vision", IEEE Transactions on Robotics and Automation, IEEE Inc, New York, US, vol. 8, No. 5, Oct. 1, 1992, pp. 624-640.

Schreiber, Kai, "Creation and Optimization of Algorithms for Measuring Eye Movements by Means of Video Oculography Methods", English Translation, Jan. 22, 1999, 1-275.

Shih, Sheng-Wen et al., "A Novel Approach to 3-D Gaze Tracking Using Stereo Cameras", IEEE Transactions on Systems, Man and Cybernetics. Part B: Cybernetics, IEEE Service Center, Piscataway, NJ, US, vol. 34, No. 1, Feb. 1, 2004, pp. 234-245.

Fitzgibbon, A. et al., "Matlab code—Direct least square fitting of ellipses", http://research.microsoft.com/en-us/um/people/awf/ellipse/fitellipse.html (Jul. 6, 2005).

Klenfenz, Frank, "Ein systolischer Arrayprozessor zur Spurrekonstruktion als Trigger in Driftkammern", Dissertation; Ruprecht-Karls-Universität Heidelberg, 1992. Unavailable, but equivalent to U.S. Pat. No. 7,948,493 cited herein.

Nayak, •Naresh G., "Accelerated Computation using Runtime Partial Reconfiguration", Master's Thesis, Institute of Computer Architecture and Computer Engineering, University of Stuttgart, Stuttgart, Nov. 2013.

* cited by examiner

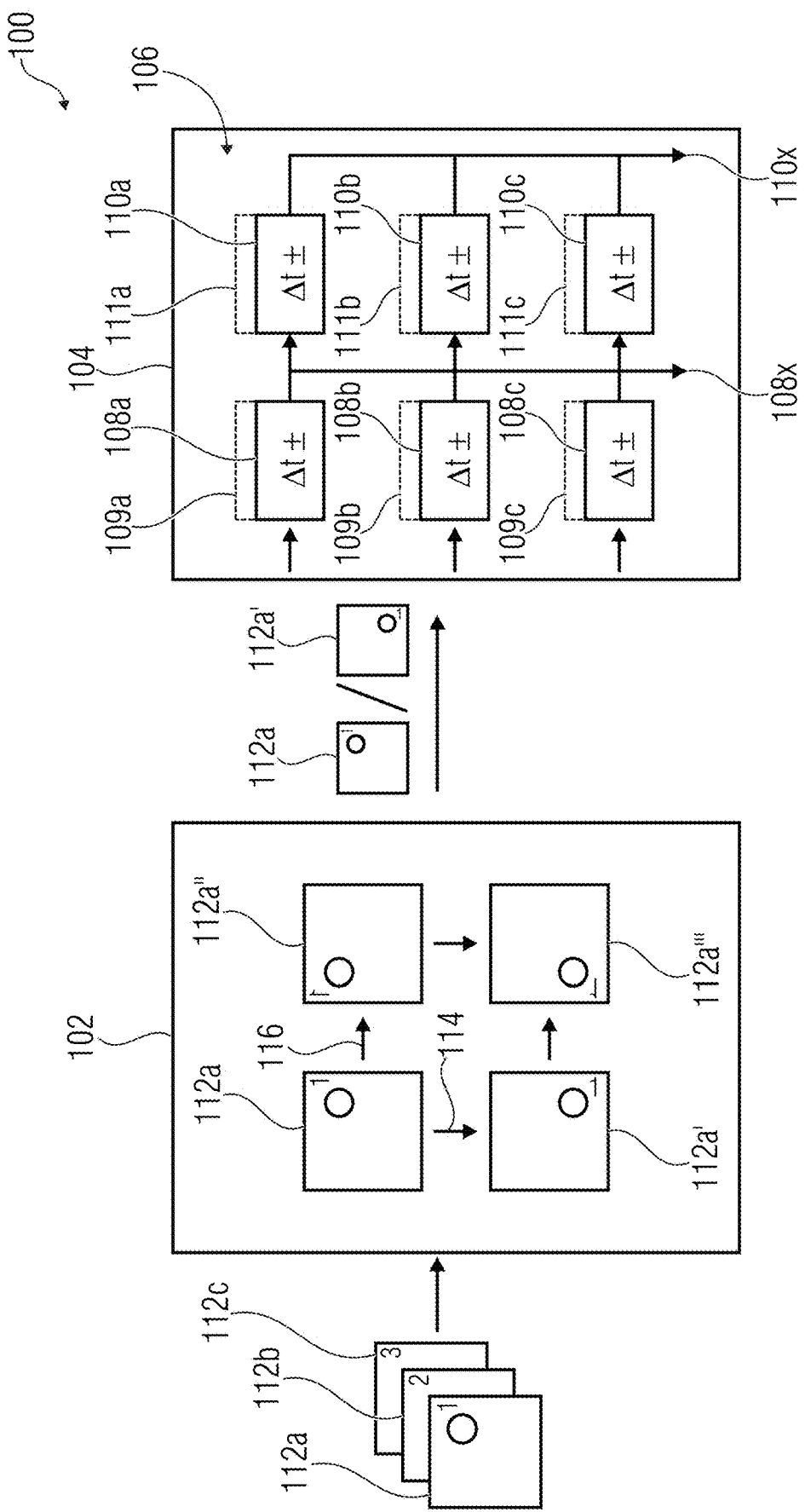

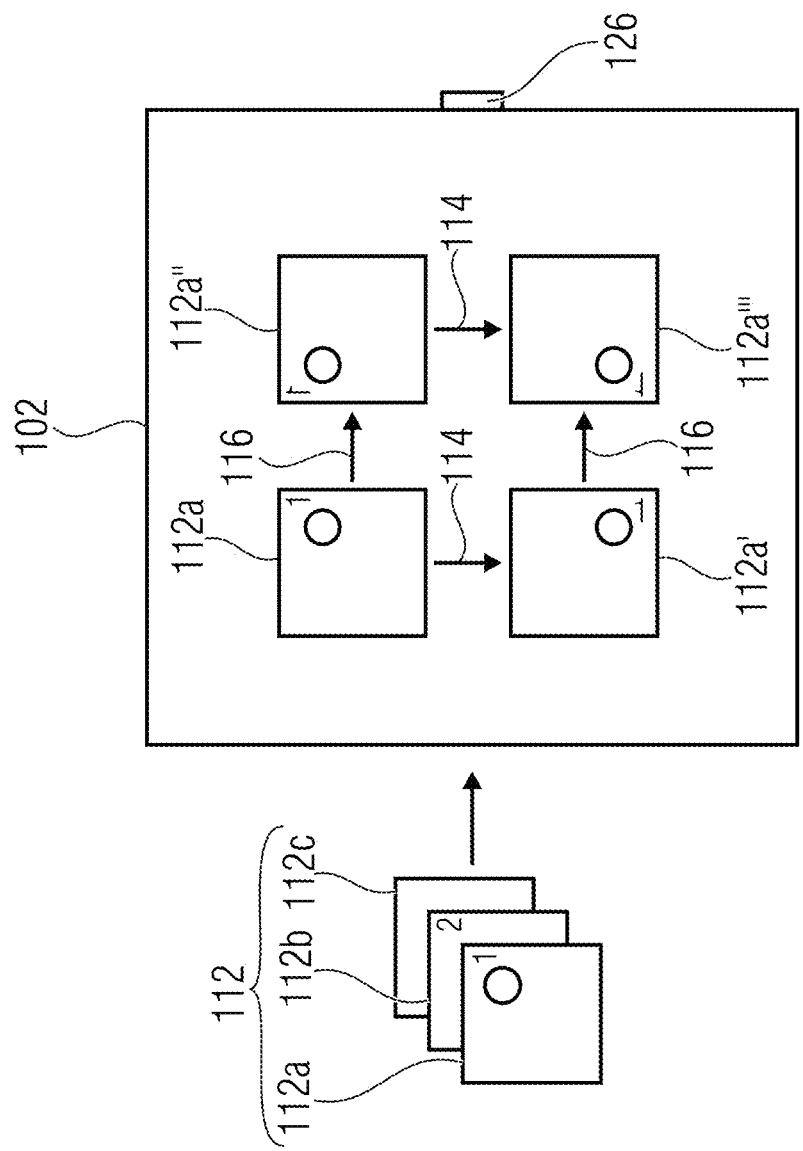

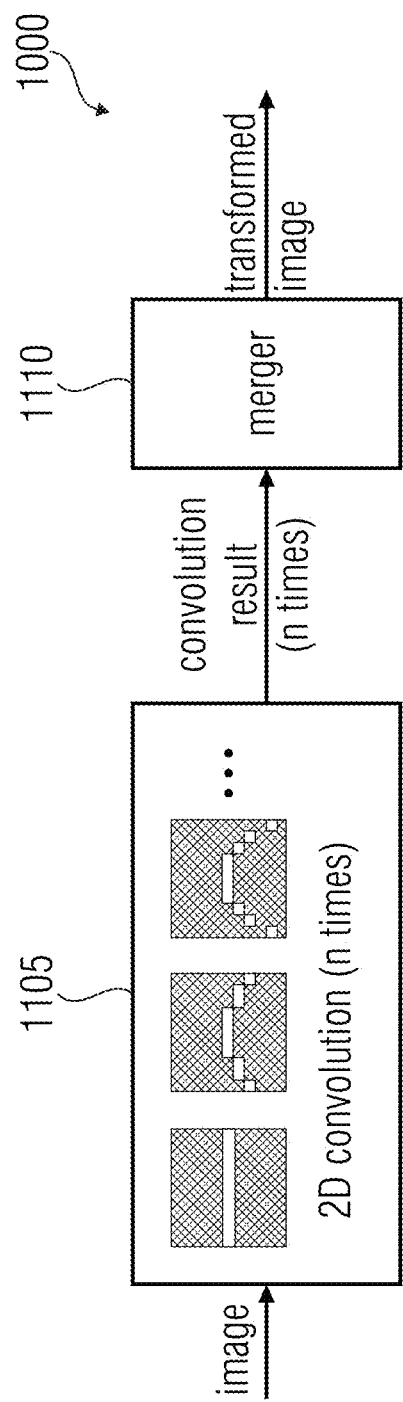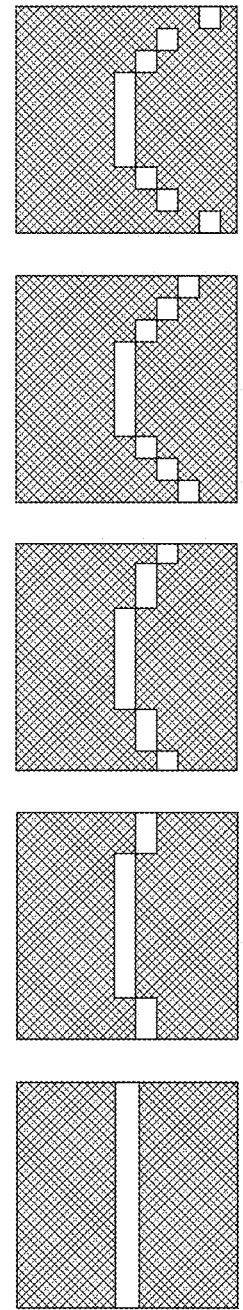
Fig. 4a
Fig. 4b

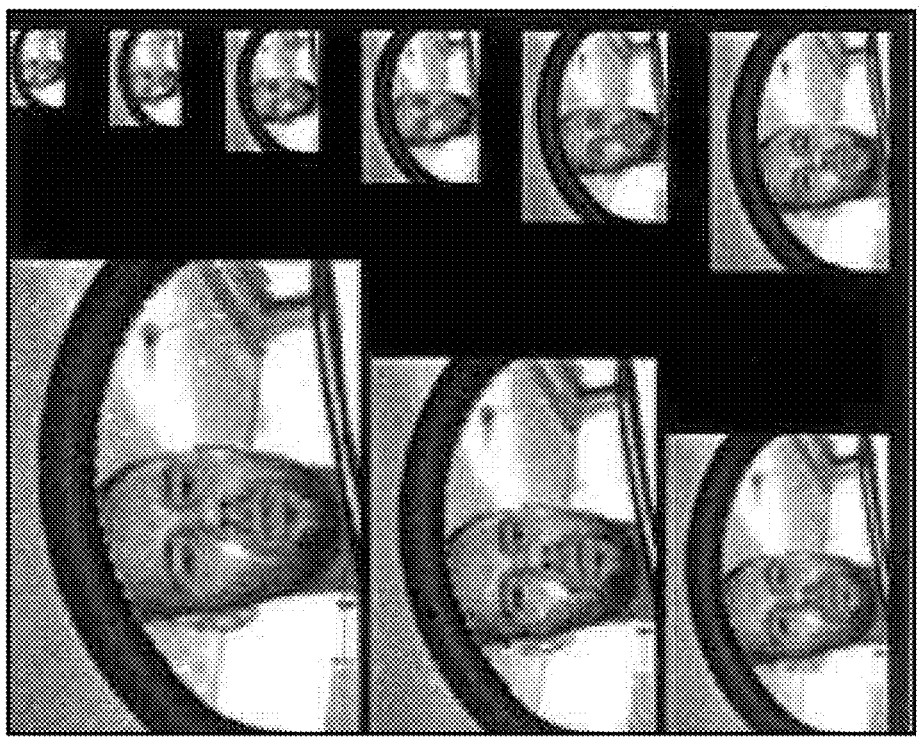
Fig. 7b

HOUGH PROCESSOR

CROSS-REFERENCE TO RELATED APPLICATIONS

This application is a continuation of copending International Application No. PCT/EP2015/052001, filed Jan. 30, 2015, which is incorporated herein by reference in its entirety, and additionally claims priority from German Application No. DE 102014201997.4, filed Feb. 4, 2014, which is also incorporated herein by reference in its entirety.

BACKGROUND OF THE INVENTION

Embodiments of the present invention relate to a Hough processor, further embodiments relate to an image analyzing system for tracking a pupil with a Hough processor, a method for a Hough processing and a computer program for executing the method.

Various image recognition systems or image evaluation systems, as e.g. 2D image analyzing tools or 3D image analyzers may be based on the Hough transformation as explained in the following.

Hough processors serve for the execution of a Hough transformation by means of which geometric patterns like straight lines or circles or also only segments of such geometric patterns can be recognized. During recognition, it is typically emanated from gradient images or monochrome images or binary edge images. By means of the Hough transformation, a transfer of a two-dimensional initial image into a multi-dimensional accumulator room occurs, which is also referred to as a Hough room. In this room, the searched structure is phrased in a parameter image or the Hough room is stretched over the parameters. According to the complexity of the structure to be detected, the Hough room has a plurality of dimensions. Thus, a Hough room typically comprises two dimensions for the recognition (angle between x-axis and normal on the straight line and distance plumb foot point from the origin, cf. Hessian normal form); regarding a Hough room for the recognition of circles, typically three dimensions (two times position coordinates of the circle midpoint, once circle radius) are available, while a Hough room for the recognition of ellipses typically comprises five dimensions (two times position coordinates ellipsis midpoint, two times ellipsis diameter, once inclination angle). Insofar, the Hough transformation is characterized in that an image to be processed is transferred to an n-dimensional Hough room. The searched geometric features could also be referred to as Hough features. These are recognizable according to their frequency distribution in the Hough room (can also be referred to as accumulator room).

The Hough transformation constitutes the basis in order to efficiently and reliably recognize geometric structures by means of a Hough transformation algorithm. In practice, for example the detection of an ellipsis or ellipsis form, as e.g. regarding a pupil or an iris, or also other distinctive structures in the eye (e.g. eye lids) is an important application, whereby, however, it should be noted that the execution of Hough transformation algorithms is very complex in calculating. This results in the fact that the real-time capability of Hough transformation algorithms is limited. A further disadvantage resulting therefrom is that an embodiment of a Hough transformation algorithm typically presupposes specific Hough processors or generally very efficient processors so that the implementation of a Hough recognition algorithm by means of simple and/or cost efficient processors, but also FPGAs (Field Programmable Gate Arrays, integrated switch with programmable logic switch elements) is difficult or even impossible.

Improvements regarding the performance have been achieved by a so-called parallel Hough transformation, as it is e.g. described in the patent specification of DE 10 2005 047 160 B4. Regarding this parallel Hough transformation, however, only a binary result relating to an image coordinate (position of the structure), but not the measure for the accordance of the searched structure or further structure features, can be detected. Furthermore, a flexible adjustment of the transformation core during the ongoing operation is not possible, that limits the suitability regarding dynamic image contents (e.g. small and big pupils). Thus, the transformation core is not reconfigurable so that other structures cannot be recognized during the ongoing operation.

Therefore, there is the need for an improved concept.

SUMMARY

According to an embodiment, a Hough processor may have: a pre-processor, which is configured to receive a plurality of samples respectively including an image and to rotate the image of the respective sample and/or to reflect and to output a plurality of versions of the image of the respective sample for each sample; and a Hough transformation unit, which is configured to collect a predetermined searched pattern within the plurality of samples on the basis of the plurality of versions, wherein a characteristic of the Hough transformation unit, which depends on the searched pattern, is adjustable.

According to another embodiment, an image analyzing system for tracking a pupil may have: a first Hough path for a first camera, wherein the first Hough path includes an inventive Hough processor; and a processing unit including a unit for analyzing the collected patterns and for outputting a geometry parameter set, which describes the geometry of one or more predefined searched patterns for each sample.

According to another embodiment, a method for Hough processing may have the steps of: pre-processing of a plurality of samples respectively including an image by using a pre-processor, wherein the image of the respective sample is rotated and/or reflected so that a plurality of versions of the image of the respective sample for each sample is indicated; and collecting a predetermined pattern in the plurality of samples on the basis of a plurality of versions by using a Hough transformation unit including an adjustable characteristic which depends on the searched pattern, wherein the characteristic is adjusted according to the selected set of patterns.

Another embodiment may have a non-transitory digital storage medium having a computer program stored thereon to perform the method for Hough processing having the steps of: pre-processing of a plurality of samples respectively including an image by using a pre-processor, wherein the image of the respective sample is rotated and/or reflected so that a plurality of versions of the image of the respective sample for each sample is indicated; and collecting a predetermined pattern in the plurality of samples on the basis of a plurality of versions by using a Hough transformation unit including an adjustable characteristic which depends on the searched pattern, wherein the characteristic is adjusted according to the selected set of patterns, when said computer program is run by a computer, an embedded processor, a programmable logic component or a client-specific chip.

According to another embodiment, a Hough processor may have: a pre-processor, which is configured to receive a plurality of samples respectively including an image and to rotate the image of the respective sample and/or to reflect and to output a plurality of versions of the image of the respective sample for each sample; and a Hough transformation unit, which is configured to collect a predetermined searched pattern within the plurality of samples on the basis of the plurality of versions, wherein a characteristic of the Hough transformation unit, which depends on the searched pattern, is adjustable, wherein the Hough transformation unit includes a delay filter the filter characteristic of which depending on the selected searched pattern is adjustable, wherein the delay filter of the Hough transformation unit includes one or more delay elements, which are selectively switchable during the ongoing operation in order to allow an adjustment of the filter characteristic of the delay filter.

According to another embodiment, a Hough processor may have: a pre-processor, which is configured to receive a plurality of samples respectively including an image and to rotate the image of the respective sample and/or to reflect and to output a plurality of versions of the image of the respective sample for each sample; and a Hough transformation unit, which is configured to collect a predetermined searched pattern within the plurality of samples on the basis of the plurality of versions, wherein a characteristic of the Hough transformation unit, which depends on the searched pattern, is adjustable, wherein the Hough transformation unit is connected to a processing unit including a unit for analyzing of collected Hough features in order to output a plurality of geometry parameter sets describing the geometry of one or more predefined searched patterns for every sample, wherein the processing unit includes a unit for controlling the adjustable Hough transformation unit in the case of an absent or incorrect recognition of the searched pattern.

According to another embodiment, a method for Hough processing may have the steps of: pre-processing of a plurality of samples respectively including an image by using a pre-processor, wherein the image of the respective sample is rotated and/or reflected so that a plurality of versions of the image of the respective sample for each sample is indicated; and collecting a predetermined pattern in the plurality of samples on the basis of a plurality of versions by using a Hough transformation unit including an adjustable characteristic which depends on the searched pattern, wherein the characteristic is adjusted according to the selected set of patterns, wherein the adjustable characteristic is a filter characteristic of a delay filter, wherein the adjusting of the delay filter is carried out during the implementation or during the ongoing operation, if the pattern is not or incorrectly recognized.

Embodiments of the present invention create a Hough processor with a pre-processor and a Hough transformation unit. The pre-processor is configured in order to receive a plurality of samples respectively comprising one image and in order to rotate and/or reflect the respective sample and to output a plurality of versions of the image of the respective sample. The Hough transformation unit is configured in order to collect a predetermined searched pattern in the plurality of samples on the basis of the plurality of versions. The Hough transformation unit comprises a characteristic being dependent on the searched pattern, which is adjustable according to the searched pattern.

The understanding underlying the invention is that an improved calculation of Hough features by means of a Hough processor with a Hough transformation unit is allowed, which comprises according to the searched pattern an adjustable characteristic, as e.g. a filter characteristic of a delay filter or a characteristic of a PC based (fast) 2D correlation. For example, to each combination of delay elements of the delay filter, a specific search pattern or searched feature can be assigned. In detail, every configuration of a delay filter detects several characteristics of a specific search pattern or a curve array, whereby every column amount represents a specific pattern, thus, for a concrete characteristic of the curve array. Thereby, the characteristic is dynamic, i.e. during the ongoing Hough transformation adjustable, in order to vary the search pattern or the curve arrays. Regarding the feasibility of implementation, it is advantageous to divide the Hough processor into two functionality units, namely into one pre-processor and one Hough transformation unit. The pre-processor executes for the search of patterns a pre-processing, which may e.g. comprise reflecting and/or rotating of the image in which the pattern is to be recognized. These different versions outputted by the pre-processor are outputted to the Hough transformation unit, which then can search one or more searched patterns, e.g. an increasing straight line in the first version and a decreasing straight line in the second version, whereby the same search pattern is applied.

It should be noted at this point that the filter core, which is also referred to as Hough core, can also comprise according to embodiments a plurality of columns with respectively one switchable delay element for each line, in order to detect a plurality of different patterns (e.g. straight line/straight line segment, an ellipsis segment, a complete ellipsis, a circle and/or a straight line or a segment of an ellipsis, a circle or a straight line). By this plurality of columns, different characteristics of the patterns may be detected, regarding a circle segments, e.g. different curves and regarding a straight line, different increases can be displayed. A predetermined pattern is for example recognizable, if the amount over the individual delay elements within a column is maximal or exceeds a predetermined threshold.

According to further embodiments and due to the switching of the individual delay elements, the adjustment of the filter characteristic occurs. In order to carry out this switching during the ongoing operation of the Hough core, e.g. a multiplexer may assist.

According to further embodiments, the pre-processor may be configured in order to rotate the image about 360°/n and to output n versions of the image parallel to several Hough cores or in series to one, or to rotate the image about 360°/n and then to reflect the versions and thereafter to output the rotated and the reflected versions. Due to the fact that a part of the Hough processing, which is identical for the detection of different patterns, is upstream, the performance is increased. This allows a real-time capability with simultaneously minimizing of the resource consumption, also during the implementation of common processors, or in particular on FPGAs. Insofar, a Hough processor is implemented by means of FPGA architecture in order to carry out the above described processing for several samples one after the other.

According to further embodiments, the Hough transformation unit is configured in order to output the detection result in form of a multi-dimensional Hough room comprising information on the collected patterns, as e.g. the position (in x-, y-coordinates, cf. image coordinates of the transformed image), a size (or a diameter) of the recognized feature or a possible inclination of the feature. Further, also a measure for the accordance with searched structure can be outputted.

According to further embodiments, a so-called non-maxima suppression is used, which extracts local maxima in the multi-dimensional Hough room by means of predefined or dynamically adjusted thresholds. Thus, a Hough feature is then extracted by the extractor, if it is a local maximum and exceeds the thresholds.

According to further embodiments, the Hough processor can be connected to an upstream processing unit, which for example comprises means for controlling the adjustable delay time or the delay elements of the Hough transformation unit.

According to further embodiments, the Hough processor can be part of an image analyzing system, whereby the above mentioned processing unit is configured in order analyze the detected pattern and to output as analysis result a geometry parameter describing the geometry of the one pattern or of several predefined patterns.

Furthermore, according to further embodiments, the processing unit may comprise a selective adaptive data processor, which is configured in order to carry out a smoothing of a parameter calculated by the Hough room (e.g. the position of the ellipsis) over several samples. Thereby, an implausible value is replaced by another one, which e.g. is based on the previous one.

A further embodiment relates to a further image analyzing system comprising two Hough paths with two Hough processors so that two image files of two cameras of a stereoscopic camera assembly can be processed simultaneously. For this, the image analyzing system may also comprise a 3D image analyzer, which is configured in order to calculate a position and an alignment (point of view) of an object.

Further embodiments relate to a method for the Hough processing with the steps of pre-processing of a plurality of samples and the collecting of a predetermined pattern by using a Hough transformation unit, whereby the Hough transformation unit comprises a filter with adjustable filter characteristic.

BRIEF DESCRIPTION OF THE DRAWINGS

Embodiments of the present invention will be detailed subsequently referring to the appended drawings, in which:

FIG. 1 is a schematic block diagram of a Hough processor with a pre-processor and a Hough transformation unit according to an embodiment;

FIG. 2a is a schematic block diagram of a pre-processor according to an embodiment;

FIG. 4a-d is a schematic block diagram of a further implementation of a Hough transformation unit according to an embodiment;

DETAILED DESCRIPTION OF THE INVENTION

Figure 2B:
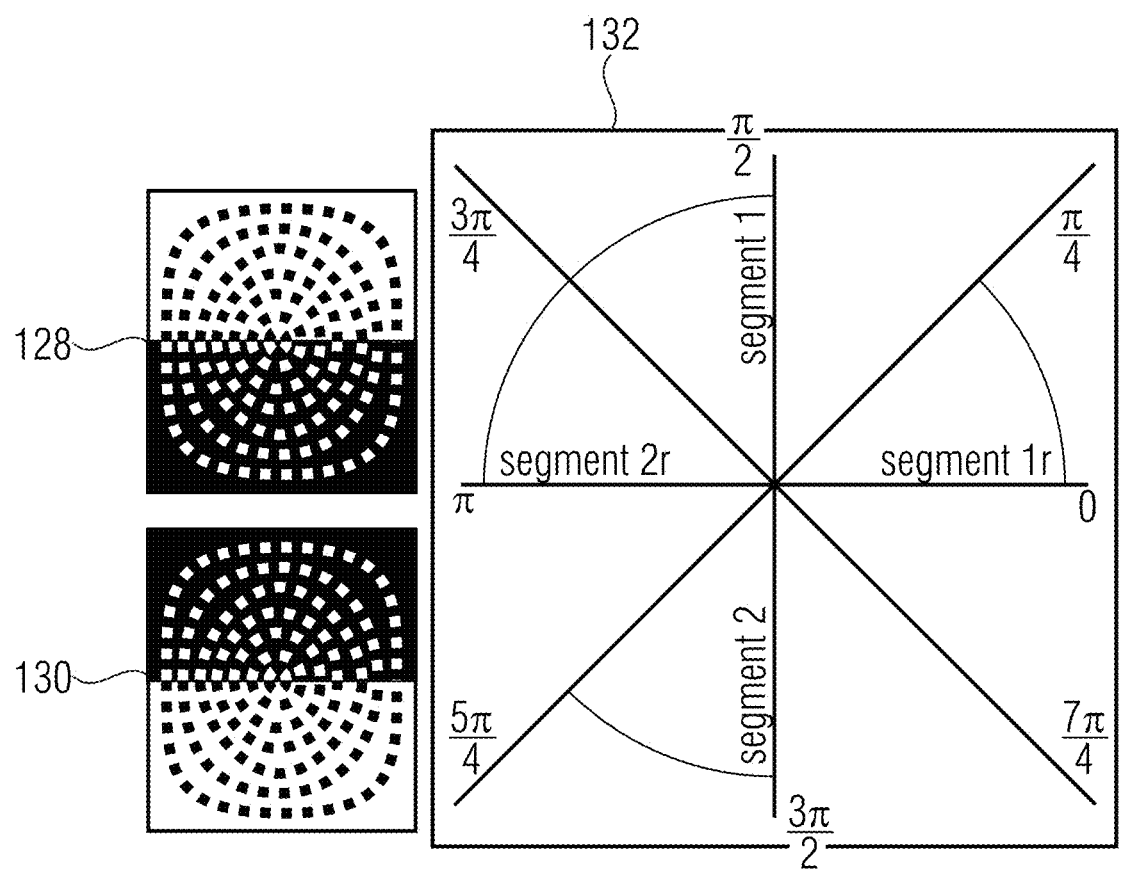
FIG. 2b is a schematic illustration of Hough cores for the detection of straights (sections)

In the following, embodiments of the present invention are described in detail by means of the Figures. It should be noted that same elements are provided with the same reference signs so that the description of whose is applicable to one another and/or is exchangeable.

FIG. 1 shows a Hough processor 100 with a pre-processor 102 and a Hough transformation unit 104. The pre-processor 102 constitutes the first signal processing stage and is informationally linked to the Hough transformation unit 104. The Hough transformation unit 104 has a delay filter 106, which can comprise at least one, however, advantageously a plurality of delay elements 108a, 108b, 108c, 110a, 110b, and 110c. The delay elements 108a to 108c and 110a to 110c of the delay filter 106 are typically arranged as a matrix, thus, in columns 108 and 110 and lines a to c and signaling linked to each other. According to the embodiment in FIG. 1, at least one of the delay elements 108a to 108c and/or 110a to 110c has an adjustable delay time, here symbolized by means of the "+/−" symbols. For activating the delay elements 108a to 108c and 110a to 110c and/or for controlling the same, a separate control logic and/or control register (not shown) can be provided. This control logic controls the delay time of the individual delay elements 108a to 108c and/or 110a to 110c via optional switchable elements 109a to 109c and/or 111a to 111c, which e.g. can comprise a multiplexer and a bypass. The Hough transformation unit 104 can comprise an additional configuration register (not shown) for the initial configuration of the individual delay elements 108a to 108c and 110a to 110c.

The pre-processor 102 has the objective to process the individual samples 112a, 112b, and 112c in a way that they can be efficiently processed by the Hough transformation unit 104. For this purpose, the pre-processor 102 receives the image data and/or the plurality of samples 112a, 112b, and 112c and performs a pre-processing, e.g. in form of a rotation and/or in form of a reflection, in order to output the several versions (cf. 112a and 112a') to the Hough transformation unit 104. The outputting can occur serially, if the Hough transformation unit 104 has a Hough core 106, or also parallel, if several Hough cores are provided. Thus, this means that according to the implementation, the n versions of the image are either entirely parallel, semi-parallel (thus, only partly parallel) or serially outputted and processed. The pre-processing in the pre-processor 102, which serves the purpose to detect several similar patterns (rising and falling straight line) with a search pattern or a Hough core configuration, is explained in the following by means of the first sample 112a.

This sample can e.g. be rotated, e.g. about 90° in order to obtain the rotated version 112a'. This procedure of the rotation has reference sign 114. Thereby, the rotation can occur either about 90°, but also about 180° or 270° or generally about 360°/n, whereby it should be noted that depending on the downstream Hough transformation (cf. Hough transformation unit 104), it may be very efficient to carry out only a 90° rotation. These sub-aspects are addressed with reference to FIG. 2. Furthermore, the image 112a can also be reflected, in order to obtain the reflected version 112a". The procedure of reflecting has the reference sign 116. The reflecting 116 corresponds to a rearward read-out of the memory. Based on the reflected version 112*a*" as well as based on the rotated version 112*a*', a fourth version can be obtained from a rotated and reflected version 112*a*''', either by carrying out the procedure 114 or 116. On the basis of the reflection 116, then two similar patterns (e.g. rightwards opened semicircle and leftwards opened semicircle) with the same Hough core configuration as subsequently described, are detected.

The Hough transformation unit 104 is configured in order to detect in the versions 112*a* or 112*a*' (or 112*a*" or 112*a*''') provided by the pre-processor 102 a predetermined searched pattern, as e.g. an ellipsis or a segment of an ellipsis, a circle or a segment of a circle, a straight line or a segment of a straight line. For this, the filter arrangement is configured corresponding to the searched predetermined pattern. Depending on the respective configuration, some of the delay elements 108*a* to 108*c* or 110*a* to 110*c* are activated or bypassed. Hence, when applying a film strip of the image 112*a* or 112*a*' to be examined to the transformation unit 104 some pixels are selectively delayed by the delay elements 108*a* to 108*c*, which corresponds to an intermediate storage and others are directly transmitted to the next column 110. Due to this procedure, then curved or inclined geometries are "straightened". Depending on the loaded image data 112*a* or 112*a*', and/or, to be precise, depending on the image structure of the applied line of the image 112*a* or 112*a*', high column amounts occur in one of the columns 108 or 110, whereas the column amounts in other columns are lower. The column amount is outputted via the column amount output 108*x* or 110*x*, whereby here optionally an addition element (not shown) for establishing the column amount of each column 108 or 110 can be provided. With a maximum of one of the column amounts, a presence of a searched image structure or of a segment of the searched image structure or at least of the associated degree of accordance with the searched structure can be assumed. Thus, this means that per processing step, the film strip is moved further about a pixel or about a column 108 or 110 so that with every processing step by means of a starting histogram, it is recognizable, whether one of the searched structures is detected or not, or if the probability for the presence of the searched structure is correspondingly high. In other words, this means that overriding a threshold value of the respective column amount of column 108 or 110, show the detection of a segment of the searched image structure, whereby every column 108 or 110 is associated to a searched pattern or a characteristic of a searched pattern (e.g. angle of a straight line or radius of a circle). It should be noted here that for the respective structure, not only the respective delay element 110*a*, 110*b*, and 110*c* of the respective line 110 is decisive, but in particular the previous delay elements 108*a*, 108*b*, and 108*c* in combination with the subsequent delay elements 110*a*, 110*b*, and 110*c*. Corresponding to the state of the art, such structures or activations of delay elements or bypass are a priori predetermined.

Via the variable delay elements 108*a* to 108*c* or 110*a* to 110*c* (delay elements), the searched characteristic (thus, e.g. the radius or the increase) can be adjusted during ongoing operation. As the individual columns 108 and 110 are linked to each other, a change of the entire filter characteristic of the filter 106 occurs during adjusting the delay time of one of the delay elements 108*a* to 108*c* or 110*a* to 110*c*. Due to the flexible adjustment of the filter characteristic of the filter 106 of the Hough transformation unit 104, it is possible to adjust the transformation core 106 during the runtime so that e.g. dynamic image contents, as e.g. for small and large pupils can be collected and tracked with the same Hough core 106. In FIG. 3*c*, it is referred to the exact implementation on how the delay time can be adjusted. In order to then enable the Hough processor 100 or the transformation unit 104 having more flexibility, all delay elements 108*a*, 108*b*, 108*c*, 110*a*, 110*b* and/or 110*c* (or at least one of the mentioned) are carried out with a variable or discretely switchable delay time so that during the ongoing operation, it can be switched between the different patterns to be detected or between the different characteristics of the patterns to be detected.

According to further embodiments, the size of the shown Hough core 104 is configurable (either during operation or previously) so that, thus, additional Hough cells can be activated or deactivated.

Figure 5A:
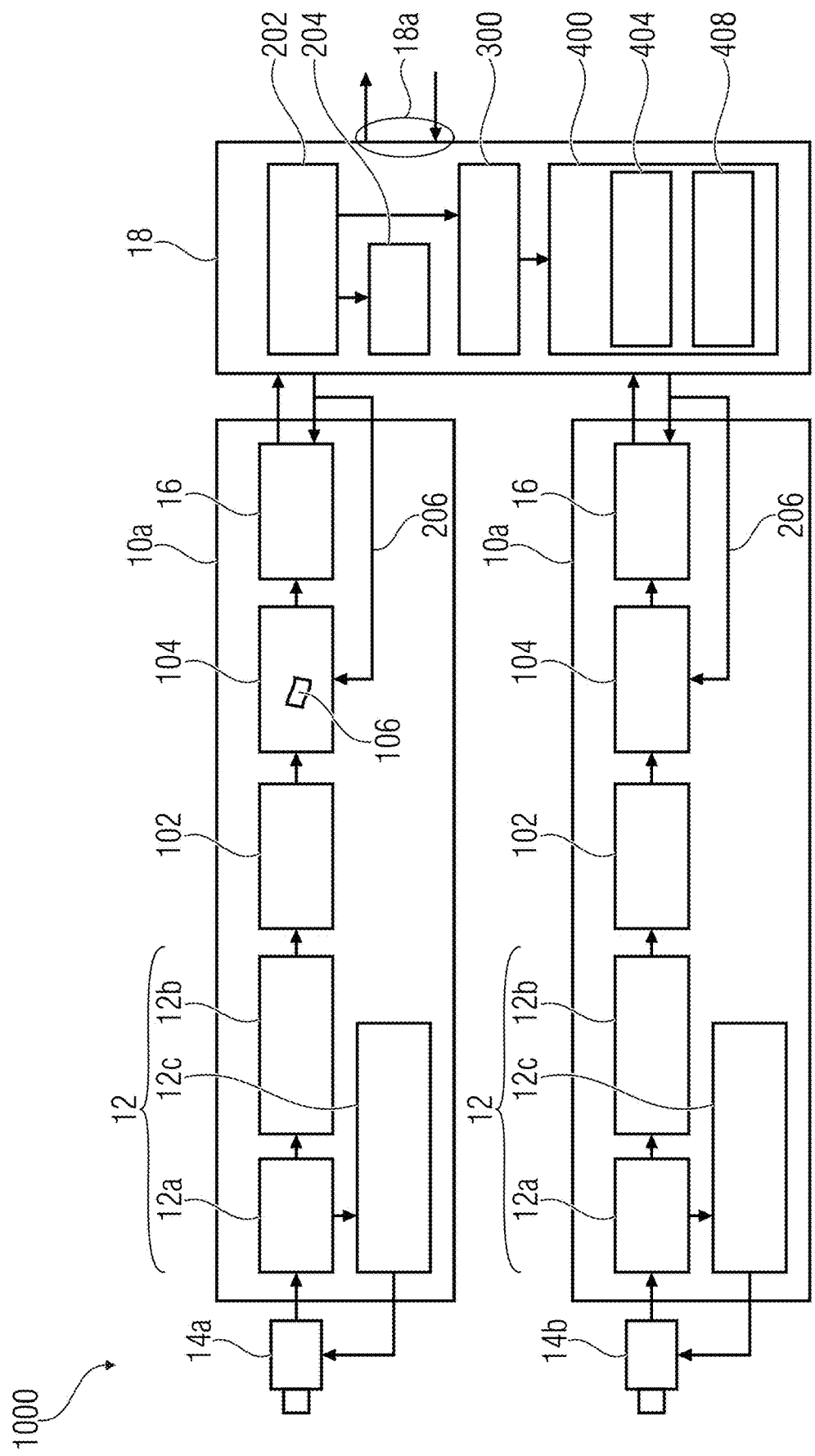
FIG. 5a is a schematic block diagram of a stereoscopic camera assembly with two image processors and a post-processing unit, whereby each of the image processors comprises one Hough processor according to embodiments.

According to further embodiments, the transformation unit 104 can be connected to means for adjusting the same or, to be precise, for adjusting the individual delay elements 108*a* to 108*c* and 110*a* to 110*c*, as e.g. with a controller (not shown). The controller is e.g. arranged in a downstream processing unit and is configured in order to adjust the delay characteristic of the filter 106, if a pattern cannot be recognized, or if the recognition is not sufficiently well (low accordance of the image content with the searched pattern). With reference to FIG. 5*a*, it is referred to this controller.

The above mentioned embodiment has the advantage that it is easily and flexibly to be realized and that it is particularly able to be implemented on an FPGA (Field Programmable Gate Array). The background hereto is that the above described parallel Hough transformation gets along without regression and is so to say entirely parallelized. Therefore, the further embodiments relate to FPGAs, which at least have the Hough transformation unit 104 and/or the pre-processor 102. With an implementation of the above described device to an FPGA, e.g. a XILINX Spartan 3A DSP, a very high frame rate of e.g. 60 FPS with a resolution of 640×480 could be achieved by using a frequency at 96 MHz, as due to the above described structure 104 with a plurality of columns 108 and 110, a parallel processing or a so-called parallel Hough transformation is possible.

FIG. 2 shows the pre-processor 102, which serves the pre-processing of the video data stream 112 with the frames 112*a*, 112*b*, and 112*c*. The pre-processor 102 is configured in order to receive the samples 112 as binary edge images or even as gradient images and to carry out on the basis of the same the rotation 114 or the reflection 116, in order to obtain the four versions 112*a*, 112*a*', 112*a*", and 112*a*'". To this, the background is that typically the parallel Hough transformation, as carried out by the Hough transformation unit, is based on two or four respectively pre-processed, e.g. about 90° shifted versions of an image 112*a*. As shown in FIG. 2*a*, initially, a 90° rotation (112*a* to 112*a*') occurs, before the two versions 112*a* and 112*a*' are horizontally reflected (cf. 112*a* to 112*a*" and 112*a*' to 112*a*'"). In order to carry out the reflection 116 and/or the rotation 114, the pre-processor has in the corresponding embodiments an internal or external storage, which serves the charging of the received image data 112.

The processing of rotating 114 and/or reflecting 116 of the pre-processor 102 depends on the downstream Hough transformation, the number of the parallel Hough cores (parallelizing degree) and the configuration of the same, as it is described in particular with reference to FIG. 2*b*. Insofar, the pre-processor 102 can be configured in order to output the pre-processed video stream according to the parallelizing degree of the downstream Hough transformation unit 104 corresponding to one of the three following constellations via the output 126:

100% parallelizing: simultaneous output of four video data streams, namely one non-rotated and non-reflected version 112a, one about 90° rotated version 112a', and a respectively reflected version 112a" and 112a'".

50% parallelizing: output of two video data streams, namely non-rotated 112a and about 90% reflected 112a' in a first step and output of the respectively reflected variants 112a" and 112a'" in a second step.

25% parallelizing: respective output of one video data stream, namely non-rotated 112a, about 90° rotated 112a', reflected 112a", and reflected and rotated 112a'", sequentially.

Alternatively to the above variant, it would also be conceivable that based on the first version, three further versions solely by rotation, thus, e.g. by rotation about 90°, 180°, and 270°, are established, on the basis of which the Hough transformation is performed.

According to further embodiments, the pre-processor 102 can be configured in order to carry out further image processing steps, as e.g. an up-sampling. Additionally, it would also be possible that the pre-processor creates the gradient image. For the case that the gradient image creation will be part of the image pre-processing, the grey-value image (initial image) could be rotated in the FPGA.

FIG. 2b shows two Hough core configurations 128 and 130, e.g. for two parallel 31×31 Hough cores, configured in order to recognize a straight line or a straight section. Furthermore, a unit circle 132 is applied in order to illustrate in which angle segment, the detection is possible. It should be noted at this point that the Hough core configuration 128 and 130 is to be respectively seen in a way that the white dots illustrate the delay elements. The Hough core configuration 128 corresponds to a so-called type 1 Hough core, whereas the Hough core configuration 120 corresponds to a so-called type 2 Hough core. As derivable from the comparison of the two Hough core configurations 128 and 130, the one constitutes the inverse of the other one. With the first Hough core configuration 128, a straight line in the segment 1 between $3\pi/4$ and $7\pi/2$ can be detected, whereas a straight line in the segment $3\pi/2$ and $5\pi/4$ (segment 2) is detectable by means of the Hough core configuration 130. In order enable a detection in the further segments, as described above, the Hough core configuration 128 and 130 is applied to the rotated version of the respective image. Consequently, by means of the Hough core configuration 128, the segment 1r between $\pi/4$ and zero and by means of the Hough core configuration 130, the segment 2r between $\pi$ and $3\pi/4$ can be collected.

Alternatively, when using only one Hough core (e.g. type 1 Hough core), a rotation of the image once about 90°, once about 180° and once about 270° can be useful, in order to collect the above described variants of the straight line alignment. On the other hand, due to the flexibility, during the configuration of the Hough core, only one Hough core type can be used, which is during ongoing operation reconfigured or regarding which the individual delay elements can be switched on or off in a way, that the Hough core corresponds to the inverted type. Thus, in other words, this means that when using the pre-processor 102 (in the 50% parallelizing operation) and the configurable Hough transformation unit 104 with only one Hough core and with only one image rotation, the entire functionality can be displayed, which otherwise can only be covered by means of two parallel Hough cores. Insofar, it becomes clear that the respective Hough core configuration or the selection of the Hough core type depends on the pre-processing, which is carried out by the pre-processor 102.

Figure 3A:
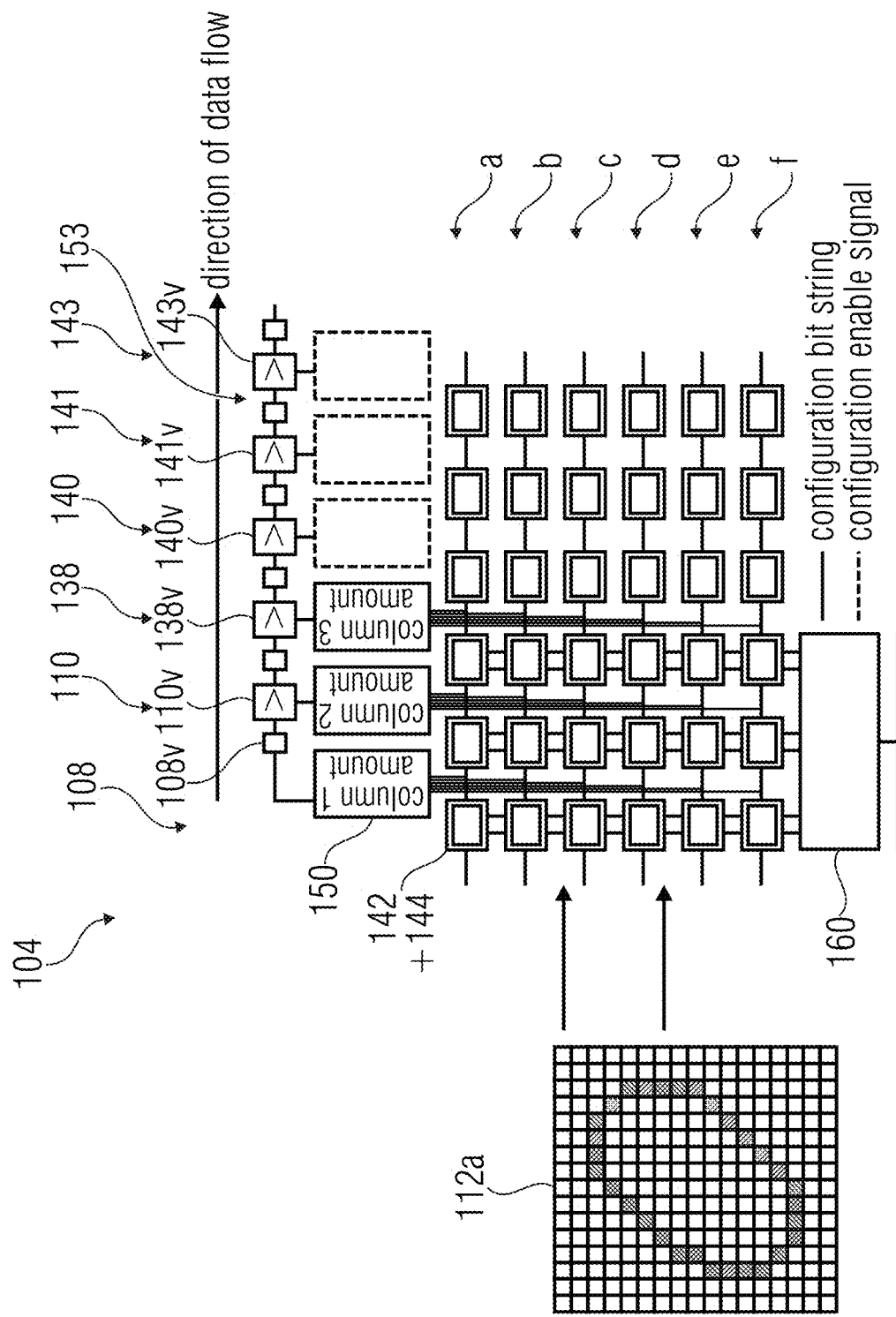
FIG. 3a is a schematic block diagram of a possible implementation of a Hough transformation unit according to an embodiment.

FIG. 3a shows a Hough core 104 with m columns 108, 110, 138, 140, 141, and 143 and n lines a, b, c, d, e, and f so that m×n cells are formed. The column 108, 110, 138, 140, 141, and 143 of the filter represents a specific characteristic of the searched structure, e.g. for a specific curve or a specific increase of the straight line segment.

Every cell comprises a delay element, which is adjustable with respect to the delay time, whereby in this embodiment, the adjustment mechanism is realized due to the fact that respectively a switchable delay element with a bypass is provided. In the following, with reference to FIG. 3b, the construction of one single cells is representatively described. The cell (108a) from FIG. 3b comprises the delay element 142, a remote controllable switch 144, as e.g. a multiplexer, and a bypass 146. By means of the remote controllable switch 144, the line signal either can transferred via the delay element 142 or it can be lead undelayed to the intersection 148. The intersection 148 is on the one hand connected to the amount element 150 for the column (e.g. 108), whereby on the other hand, via this intersection 148, also the next cell (e.g. 110a) is connected.

The multiplexer 144 is configured via a so-called configuration register 160 (cf. FIG. 3a). It should be noted at this point that the reference sign 160 shown here only relates to a part of the configuration register 160, which is directly coupled to the multiplexer 144. The element of the configuration register 160 is configured in order to control the multiplexer 144 and receives thereto via a first information input 160a, a configuration information, which originates e.g. from a configuration matrix, which is stored in the FPGA internal BRAM 163. This configuration information can be a column-by-column bit string and relates to the configuration of several (also during transformation) of the configured delaying cells (142+144 of one column). Therefore, the configuration information can be furthermore transmitted via the output 160b. As the reconfiguration is not possible at any point in time of the operation, the configuration register 160 or the cell of the configuration register 160 receives a so-called enabling signal via a further signal input 160c, by means of which the reconfiguration is started. Background to this is that the reconfiguration of the Hough core needs a certain time, which depends on the number of delay elements or in particular on the size of a column. Thereby, for every column element, a clock cycle is associated and a latency of few clock cycles occurs due to the BRAM 163 or the configuration logic 160. The total latency for the reconfiguration is typically negligible for video-based image processing. It is assumed that in the present embodiment, the video data streams recorded with a CMOS sensor have a horizontal and vertical blanking, whereby the horizontal blanking or the horizontal blanking time can be used for the reconfiguration. Due to this context, the size of the Hough core structure implemented in the FPGA, predetermines the maximum size for the Hough core configuration. If e.g. smaller configurations are used, these are vertically centered and aligned in horizontal direction to column 1 of the Hough core structure. Non-used elements of the Hough core structure are all occupied with activated delay elements.

The evaluation of the data streams processed in this way with the individual delay elements (142+144) occurs column-by-column. For this, it is summed-up column-by-column, in order to detect a local amount maximum, which displays a recognized searched structure. The summation per column 108, 110, 138, 140, 141, and 143 serves to determine a value, which is representative for the degree of accordance with the searched structure for one of the characteristic of the structure, assigned to the respective column. In order to determine the local maxima of the column amounts, per column 108, 110, 138, 140, 141, or 143, so-called comparer 108v, 110v, 138v, 140v, 141v, or 143v are provided, which are connected to the respective amount elements 150. Optionally, between the individual comparers 108v, 110v, 138v, 140v, 141v, 143v of the different columns 108, 110, 138, 140, 141, or 143, also further delay elements 153 can be provided, which serve to compare the column amounts of adjacent columns. In detail, during pass-through of the filter, the columns 108, 110, 138, or 140 with the highest degree of accordance for a characteristic of the searched pattern is picked out of the filter. During detecting a local maximum of a column amount (comparison previous, subsequent column), the presence of a searched structure can be assumed. Thus, the result of the comparison is a column number (possibly including column amount=degree of accordance), in which the local maximum had been recognized ore in which the characteristic of the searched structure is found, e.g. column 138. Advantageously, the result comprises a so-called multi-dimensional Hough room, which comprises all relevant parameters of the searched structure, as e.g. the kind of the pattern (e.g. straight line or half circle), degree of accordance of the pattern, characteristic of the structure (intensity of the curve regarding curve segments or increase and length regarding straight line segments) and the position or orientation of the searched pattern. In other words, this means that for each point in the Hough room the grey values of the corresponding structure are added in the image segment. Consequently, maxima are formed by means of which the searched structure in the Hough room can easily be located and lead back to the image segment.

Figure 3B:
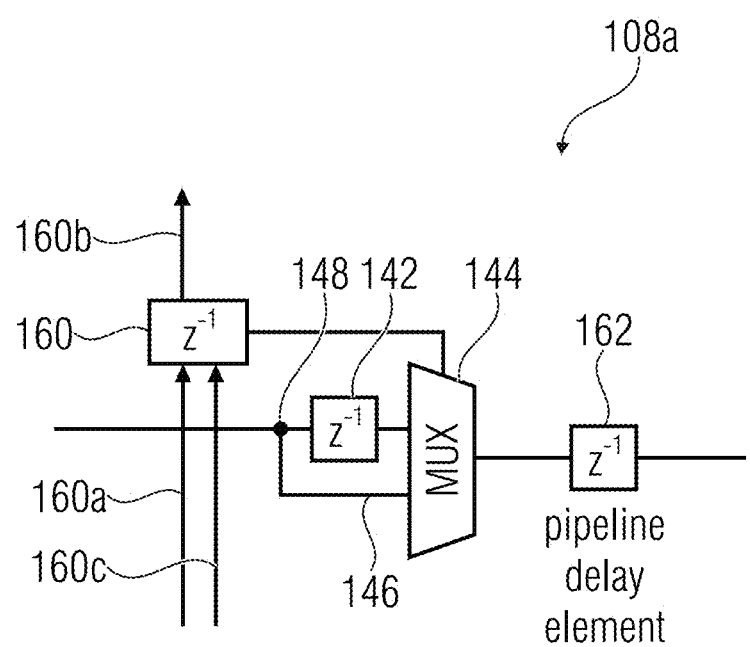
FIG. 3b is a single cell of a deceleration matrix according to an embodiment.

The Hough core cell from FIG. 3b can have an optional pipeline delay element 162 (pipeline-delay), which e.g. is arranged at the output of the cell and is configured in order to delay the by means of the delay element 142 delayed signal as well as the by means of the bypass 146 non-delayed signal.

As indicated with reference to FIG. 1, such a cell also can have a delay element with a variability or a plurality of switched and bypassed delay elements so that the delay time is adjustable in several stages. Insofar, further implementations beyond the implementation of the Hough core cell as shown in FIG. 3b would alternatively be conceivable.

In the following, an application of the above described device within an image processing system 1000 is explained with reference to FIG. 5a. FIG. 5a shows an FPGA implemented image processor 10a with a pre-processor 102 and a Hough transformation unit 104. Prior to the pre-processor 102, furthermore, an input stage 12 may be implemented in the image processor 10a, which is configured in order to receive image data or image samples from a camera 14a. For this, the input stage 12 may e.g. comprise an image takeover intersection 12a, a segmentation and edge detector 12b and measures for the camera control 12c. The measures for the camera control 12c are connected to the image intersection 12a and the camera 14 and serve to control the factors like illumination time and/or intensification.

The image processor 10a further comprises a so-called Hough feature extractor 16, which is configured in order to analyze the multi-dimensional Hough room, which is outputted by the Hough transformation unit 104 and which includes all relevant information for the pattern recognition, and on the basis of the analyzing results to output a compilation of all Hough features. In detail, a smoothing of the Hough feature rooms occurs here, i.e. a spatial smoothing by means of a local filter or a thinning of the Hough room (rejection of information being irrelevant for the pattern recognition). This thinning is carried out under consideration of the kind of the pattern and the characteristic of the structure so that non-maxima in the Hough probability room are faded out. Furthermore, for the thinning, also threshold values can be defined so that e.g. minimally or maximally admissible characteristics of a structure, as e.g. a minimal or a maximal curve or a smallest or greatest increase can be previously determined. By means of threshold-based rejection, also a noise suppression in the Hough probability room may occur.

The analytical retransformation of the parameters of all remaining points in the original image segment, results e.g. from the following Hough features: for the curved structure, position (x- and y-coordinates), appearance probability, radius and angle, which indicates to which direction the arc is opened, can be transmitted. For a straight line, parameters as position (x- and y-coordinates), appearance probability, angle, which indicates the increase of a straight line, and length of the representative straight segment can be determined. This thinned Hough room is outputted by the Hough feature extractor 16 or generally, by the image processor 10a for the processing at a post-processing unit 18.

The post-processing unit may e.g. be realized as embedded processor and according to its application, may comprise different sub-units, which are exemplarily explained in the following. The post-processing unit 18 may comprise a Hough feature post-geometry-converter 202. This geometry converter 202 is configured in order to analyze one or more predefined searched patterns, which are outputted by the Hough feature extractor and to output the geometry explaining parameters. Thus, the geometry converter 202 may e.g. be configured in order to output on the basis of the detected Hough features geometry parameters, as e.g. first diameter, second diameter, shifting and position of the midpoint regarding an ellipsis (pupil) or a circle. According to an embodiment, the geometry converter 202 serves to detect and select a pupil by means of 3 to 4 Hough features (e.g. curves). Thereby, criteria, as e.g. the degree of accordance with the searched structure or the Hough features, the curve of the Hough features or the predetermined pattern to be detected, the position and the orientation of the Hough features are included. The selected Hough feature combinations are arranged, whereby primarily the arrangement according to the amount of the obtained Hough features and in a second line, according to the degree of accordance with the searched structure occurs. After the arrangement, the Hough feature combination at this point is selected and therefrom, the ellipsis is fitted, which most likely represents the pupil within the camera image.

Furthermore, the post-processing unit 18 comprises an optional controller 204, which is formed to return a control signal to the image processor 10a (cf. control channel 206) or, to be precise, return to the Hough transformation unit 104, on the basis of which the filter characteristic of the filter 106 is adjustable. For the dynamic adjustment of the filter core 106, the controller 204 typically is connected to the geometry converter 202 in order to analyze the geometry parameters of the recognized geometry and in order to track the Hough core within defined borders in a way that a more precise recognition of the geometry is possible. This procedure is a successive one, which e.g. starts with the last Hough core configuration (size of the lastly used Hough core) and is tracked, as soon as the recognition 202 provides insufficient results. To the above discussed example of the pupil or ellipsis detection, thus, the controller can adjust the ellipsis size, which e.g. depends on the distance between the object to be recorded and the camera 14a, if the person belonging thereto approaches the camera 14a. The control of the filter characteristic hereby occurs on the basis of the last adjustments and on the basis of the geometry parameters of the ellipsis.

According to further embodiments, the post-processing unit 18 may have a selective-adaptive data processor 300. The data processor has the purpose to post-process outliers and dropouts within a data series in order to e.g. carry out a smoothing of the data series. Therefore, the selective-adaptive data processor 300 is configured in order to receive several sets of values, which are outputted by the geometry converter 202, whereby every set is assigned to respective sample. The filter processor of the data processor 300 carries out a selection of values on the basis of the several sets in a way that the data values of implausible sets (e.g. outliers or dropouts) are exchanged by internally determined data values (exchange values) and the data values of the remaining sets are further used unchanged. In detail, the data values of plausible sets (not containing outliers or dropouts), are transmitted and the data values of implausible sets (containing outliers or dropouts) are exchanged by data values of a plausible set, e.g. the previous data value or by an average from several previous data values. The resulting data series from transmitted values and probably from exchange values, is thereby continuously smoothened. Thus, this means that an adaptive time smoothing of the data series (e.g. of a determined ellipsis midpoint coordinate), e.g. occurs according to the principle of the exponential smoothing, whereby dropouts and outliers of the data series to be smoothened (e.g. due to erroneous detection during the pupil detection) do not lead to fluctuations of the smoothened data. In detail, the data processor may smoothen over the data value of the newly received set, if it does not fall within the following criteria:

According to the associated degree of accordance, which is quantified by one of the additional values of the set, with the searched structure, it is a dropout of the data series.

According to the associated size parameters or geometry parameters, it is a dropout, if e.g. the size of the actual object deviates too strong from the previous object.

According to a comparison of the actual data value with the threshold values, which had been determined based on the previous data values, it is a dropout, if the actual data value (e.g. the actual position value) is not between the threshold values. An illustrative example for this is, if e.g. the actual position coordinate (data value of the set) of an object deviates too strong from the previously by the selective adaptive data processor determined position coordinate.

If one of these criteria is fulfilled, furthermore, the previous value is outputted or at least consulted for smoothing the actual value. In order to obtain a possibly little delay during the smoothing, optionally the actual values are stronger rated than past values. Thus, during applying of an exponential smoothing, the actual value can be determined by means of the following formula:

Actually smoothened value=actual value×smoothing coefficient+last smoothened value×(1−smoothing coefficient)

The smoothing coefficient is within defined borders dynamically adjusted to the tendency of the data to be smoothened, e.g. reduction of the rather constant value developments or increase regarding inclining or falling value developments. If in a long-term a greater leap occurs regarding the geometry parameters to be smoothened (ellipsis parameters), the data processor and, thus, the smoothened value development adjust to the new value. Generally, the selective adaptive data processor 300 can also be configured by means of parameters, e.g. during initializing, whereby via these parameters, the smoothing behavior, e.g. maximum period of dropouts or maximum smoothing factor, are determined.

Thus, the selective adaptive data processor 300 or generally, the post-processing unit 18 may output plausible values with high accuracy of the position and geometry of a pattern to be recognized. For this, the post-processing unit has an intersection 18a, via which optionally also external control commands may be received. If more data series shall be smoothened, it is also conceivable to use for every data series a separate selective adaptive data processor or to adjust the selective adaptive data processor in a way that per set of data values, different data series can be processed.

In the following, the above features of the selective adaptive data processor 300 are generally described by means of a concrete embodiment:

The data processor 300 e.g. may have two or more inputs as well as one output. One of the inputs (receives the data value) is provided for the data series to be processed. The output is a smoothened series based on selected data. For the selection, further inputs (the additional values for the more precise assessment of the data values are received) are consulted and/or the data series itself. During processing within the data processor 300, a change of the data series occurs, whereby it is distinguished between the treatment of outliers and the treatment of dropouts within the data series.

Outliers: during the selection, outliers are (within the data series to be processed) arranged and exchanged by other (internally determined) values.

Dropouts: For the assessment of the quality of the data series to be processed, one or more further input signals (additional values) are consulted. The assessment occurs by means of one or more threshold values, whereby the data is divided into "high" and "low" quality. Data with a low quality are assessed being dropouts and are exchanged by other (internally determined) values.

In the next step, e.g. a smoothing of the data series occurs (e.g. exponential smoothing of a time series). For the smoothing, the data series is consulted, which has been adjusted of dropouts and outliers. The smoothing may occur by a variable (adaptive) coefficient. The smoothing coefficient is adjusted to the difference of the level of the data to be processed.

According to further embodiments, it is also possible that the post-processing unit 18 comprises an image analyzer, as e.g. a 3D image analyzer 400. In case of the 3D image analyzer 400, with the post-processing unit 18 also a further image collecting unit consisting of an image processor 10b and a camera 14 can be provided. Thus, two cameras 14a and 14b as well as the image processors 10a and 10b establish a stereoscopic camera arrangement, whereby the image processor 10b is identical with the image processor 10a.

The 3D image analyzer 400 is configured in order to receive at least one set of image data, which is determined on the basis of one first image (cf. camera 14a), and a second set of image data, which is determined on the basis of a second image (cf. camera 14b), whereby the first and the second image display a pattern from different perspectives and in order to calculate on the basis of this a point of view or a 3D gaze vector. For this, the 3D image analyzer 400 comprises a position calculator 404 and an alignment calculator 408. The position calculator 404 is configured in order to calculate a position of the pattern within a three-dimensional room based on the first set, the second set and a geometric relation between the perspectives or the first and the second camera 14a and 14b. The alignment calculator 408 is configured in order to calculate a 3D gaze vector, e.g. a gaze direction, according to which the recognized pattern is aligned to within the three-dimensional room, whereby the calculation is based on the first set, the second set and the calculated position (cf. position calculator 404).

For this, it may be e.g. consulted a so-called 3D camera system model, which e.g. has stored in a configuration file all model parameters, as position parameter, optical parameter (cf. camera 14a and 14b).

In the following, based on the example of the pupil recognition, now the entire functionality of the 3D image analyzer 400 is described. The model stored or loaded in the 3D image analyzer 400 comprises data regarding the camera unit, i.e. regarding the camera sensor (e.g. pixel size, sensor size, and resolution) and the used objective lenses (e.g. focal length and objective lens distortion), data or characteristics of the object to be recognized (e.g. characteristics of an eye) and data regarding further relevant objects (e.g. a display in case of using the systems 1000 as input device).

The 3D position calculator 404 calculates the eye position or the pupil midpoint on the basis of the two or even several camera images (cf. 14a and 14b) by triangulation. For this, it is provided with 2D coordinates of a point in the two camera images (cf. 14a and 14b) via the process chain from image processors 10a and 10b, geometry converter 202 and selective adaptive data processor 300. From the delivered 2D coordinates, for both cameras 10a and 10b, the rays of light are calculated, which have displayed the 3D point as 2D point on the sensor, by means of the 3D camera model, in particular under consideration of the optical parameters. The point of the two straight lines with the lowest distance to each other (in the ideal case, the intersection of the straight lines) is assumed as being the position of the searched 3D point. This 3D position together with an error measure describing the accuracy of the delivered 2D coordinates in connection with the model parameters, is either via the intersection 18a outputted as the result, or is transmitted to the gaze direction calculator 408.

On the basis of the position within the 3D room, the gaze direction calculator 408 can determine the gaze direction from two ellipsis-shaped projections of the pupil to the camera sensors without calibrating and without knowing the distance between the eyes and the camera system. For this, the gaze direction calculator 408 uses besides the 3D position parameters of the image sensor, the ellipsis parameter, which are determined by means of the geometry analyzer 202 and the position determined by means of the position calculator 404. From the 3D position of the pupil midpoint and the position of the image sensors, by rotation of the real camera units, virtual camera units are calculated, the optical axis of which passes through the 3D pupil midpoint. Subsequently, respectively from the projections of the pupil on the real sensors, projections of the pupil on the virtual sensors are calculated so that two virtual ellipses arise. From the parameters of the virtual ellipsis, the two points of view of the eye on an arbitrarily parallel plane to the respective virtual sensor plane, may be calculated. With the four points of view and the 3D pupil midpoints, four gaze direction vectors can be calculated, thus, respectively two vectors per camera. From these four possible gaze direction vectors, exactly one of the one camera is nearly identical to the one of the other camera. Both identical vectors indicate the searched gaze direction of the eye, which is then outputted by the gaze direction calculator 404 via the intersection 18a.

A particular advantage of this 3D calculation is that a contactless and entirely calibration-free determination of the 3D eye position of the 3D gaze direction and the pupil size does not depend on the knowledge on the position of the eye towards the camera is possible. An analytic determination of the 3D eye position and the 3D gaze direction under consideration of a 3D room model enables an arbitrary number of cameras (greater 1) and an arbitrary camera position in the 3D room. A short latency time with the simultaneously high frame rate enables a real-time capability of the described system 1000. Furthermore, also the so-called time regimes are fixed so that the time differences between successive results are constant.

According to an alternative variant, it is also possible to carry out a gaze direction determination, as in explained in the following with reference to FIG. 5.

In the previous description regarding the "3D image analyzer", which includes the method for the calibration-free eye-tracking, so far at least two camera images from different perspectives had been necessitated. Regarding the calculation of the gaze direction, there is a position, at which per camera image exactly two possible gaze direction vectors are determined, whereby respectively the second vector corresponds to a reflection of the first vector at the intersection line between camera and the pupil midpoint. From both vectors, which result from the other camera image, exactly one vector nearly corresponds to a calculated vector from the first camera image. These corresponding vectors indicate the gaze direction to be determined.

In order to be able to carry out the calibration-free eye-tracking also with a camera, the actual gaze direction vector (in the following "vb") has to be selected from the two possible gaze direction vectors, in the following "v1" and "v2", which are determined from the camera image.

Figure 5B:
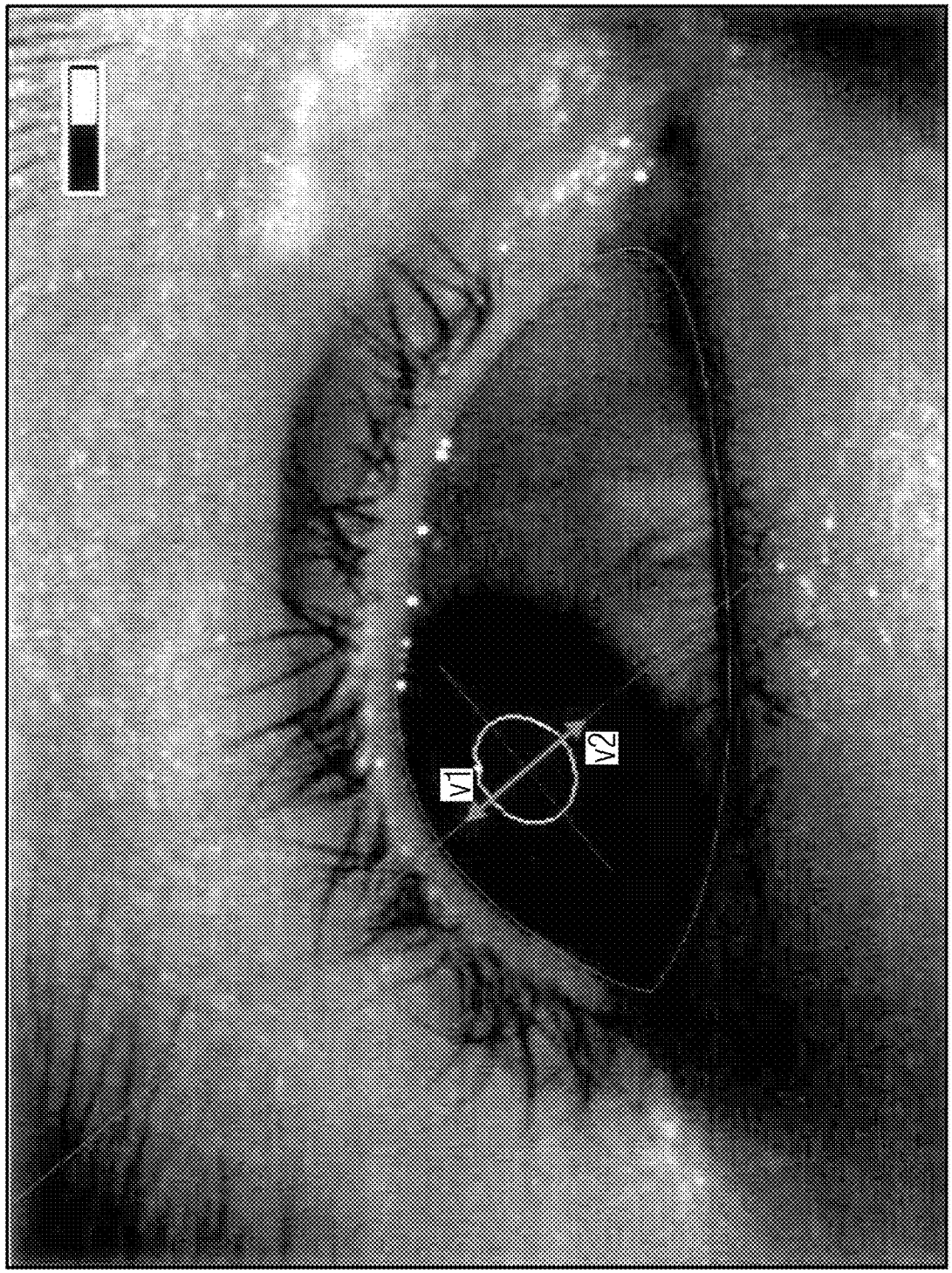
FIG. 5b is an exemplary picture of an eye for the illustration of a point of view detection, which is feasible with the unit from FIG. 5a and for explanation of the point of view detection in the monoscopic case.

This process is explained with reference to FIG. 5b. FIG. 5b shows the visible part of the eyeball (green framed) with the pupil and the two possible gaze directions v1 and v2.

For selecting the gaze direction "vb", there are several possibilities, which may be used individually or in combination in order to select the actual gaze direction vector. Some of these possibilities (the listing is not final) are explained in the following, whereby it is assumed that v1 and v2 (cf. FIG. 5a) have already been determined at the point in time of this selection:

Accordingly, a first possibility (the white dermis around the iris) may occur in the camera image. 2 beams are defined (starting at the pupil midpoint and being infinitely long), one in the direction of v1 and one in the direction of v2. Both beams are projected into the camera image of the eye and run there from the pupil midpoint to the image edge, respectively. The beam distorting the pixel which belong fewer to the sclera, belongs to the actual gaze direction vector vb. The pixel of the sclera differ by their grey value from those of the adjacent iris and from those of the eyelids. This method reaches its limits, if the face belonging to the captured eye is too far averted from the camera (thus, if the angle between the optical axis of the camera and the perpendicularly on the facial plane standing vector becomes too large).

According to a second possibility, an evaluation of the position of the pupil midpoint may occur during the eye opening. The position of the pupil midpoint within the visible part of the eyeball or during the eye opening, may be used for the selection of the actual gaze direction vector. One possibility thereto is to define two beams (starting at the pupil midpoint and being infinitely long), one in direction of v1 and one in direction of v2. Both beams are projected into the camera image of the eye and run there from the pupil midpoint to the image edge, respectively. Along both beams in the camera image, respectively the distance between the pupil midpoint and the edge of the eye opening (in FIG. 5b green marked) is determined. The beam, for which the shorter distance arises, belongs to the actual gaze direction vector. This method reaches its limits, if the if the face belonging to the captured eye is too far averted from the camera (thus, if the angle between the optical axis of the camera and the perpendicularly on the facial plane standing vector becomes too large).

According to a third possibility, an evaluation of the position of the pupil midpoint may occur towards a reference pupil midpoint. The position of the pupil midpoint determined in the camera image within the visible part of the eyeball or during the eye opening may be used together with a reference pupil midpoint for selecting the actual gaze direction vector. One possibility for this is to define 2 beams (starting at the pupil midpoint and being infinitely long), one in direction of v1 and one in direction of v2. Both beams are projected into the camera image of the eye and run there from the pupil midpoint to the edge of the image, respectively. The reference pupil midpoint during the eye opening corresponds to the pupil midpoint if the eye directly looks to the direction of the camera sensor center which is used for the image recording. The beam projected into the camera image, which has in the image the smallest distance to the reference pupil midpoint, belongs to the actual gaze direction vector. For determining the reference pupil midpoint, there are several possibilities, from which some are described in the following:

Possibility 1 (specific case of application): The reference pupil midpoint arises from the determined pupil midpoint, in the case, in which the eye looks directly in the direction of the camera sensor center. This is given, if the pupil contour on the virtual sensor plane (cf. description regarding gaze direction calculation) characterizes a circle.

Possibility 2 (general case of application): As rough estimate of the position of the reference pupil midpoint the focus of the surface of the eye opening may be used. This method of estimation reaches its limits, if the plane in which the face is lying, is parallel to the sensor plane of the camera. This limitation may be compensated, if the inclination of the facial plane towards the camera sensor plane is known (e.g. by a previously performed determination of the head position and alignment) and this is used for correction of the position of the estimated reference pupil midpoint.

Possibility 3 (general case of application): If the 3D position of the eye midpoint is available, a straight line between the 3D eye midpoint and the virtual sensor midpoint can be determined as well as its intersection with the surface of the eyeball. The reference pupil midpoint arises from the position of this intersection converted into the camera image.

According to further embodiments, instead of FPGAs 10a and 10b, an ASIC (application specific chip) can be used, which is particularly realizable at high quantities with very low costs. Summarized, however, it can be established that independent from the implementation of the Hough processor 10a and 10b, a low energy consumption due to the highly efficient processing and the associated low internal clock requirement can be achieved.

Despite these features, the here used Hough processor or the method carried out on the Hough processor remains very robust and not susceptible to failures. It should be noted at this point that the Hough processor 100 as shown in FIG. 1 can be used in different combinations with different features, as e.g. presented with respect to FIG. 5.

Applications of the Hough processor according to FIG. 1 are e.g. warning systems for momentary nodding off or fatigue detectors as driving assistance systems in the automobile sector (or generally for security-relevant man-machine-interfaces). Thereby, by evaluation of the eyes (e.g. covering of the pupil or iris as measure for the eye blink degree) and under consideration of the points of view and the focus, specific fatigue pattern can be detected.

Further, the Hough processor can be used regarding input devices or input interfaces for technical devices; whereby then the eye position and the gaze direction are used as input parameters, a precise application would be the support of the user when viewing screen contents, e.g. with highlighting of specific focused areas. Such applications are in the field of assisted living, computer games, regarding optimizing of 3D visualizing by including the gaze direction, regarding market and media development or regarding ophthalmological diagnostics and therapies of particular interest.

As already indicated above, the implementation of the above presented method does not depend on the platform so that the above presented method can also be performed on other units, as e.g. a PC. Thus, a further embodiment relates to a method for the Hough processing with the steps of processing a majority of samples, which respectively have an image by using a pre-processor, whereby the image of the respective sample is rotated and/or reflected so that a majority of versions of the image of the respective sample for each sample is outputted and of the collection of predetermined patterns in a majority of samples on the basis of the majority of versions by using a Hough transformation unit, which has a delay filter with a filter characteristic being dependent on the selected predetermined set of patterns.

Even if in the above explanations in connection with the adjustable characteristic, it was referred to a filter characteristic, it should be noted at this point that according to further embodiments, the adjustable characteristic may also relate to the post-processing characteristic (curve or distortion characteristic) regarding a fast 2D correlation. This implementation is explained with reference to FIG. 4a to FIG. 4d.

Figure 4C:
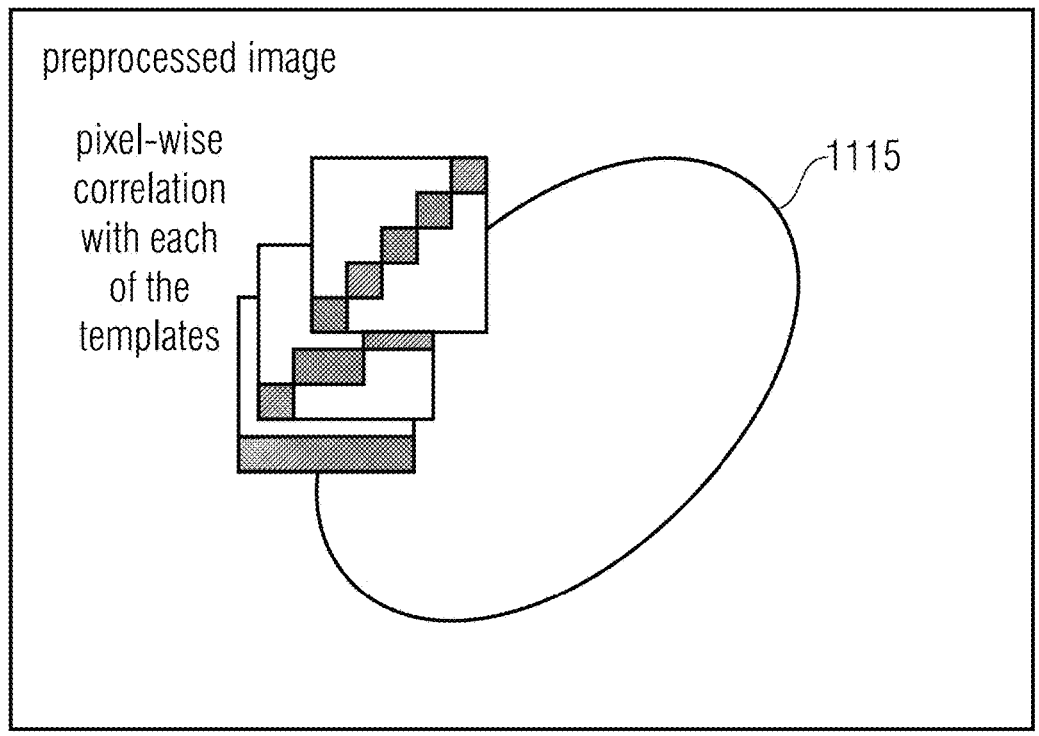
Figure 4D:
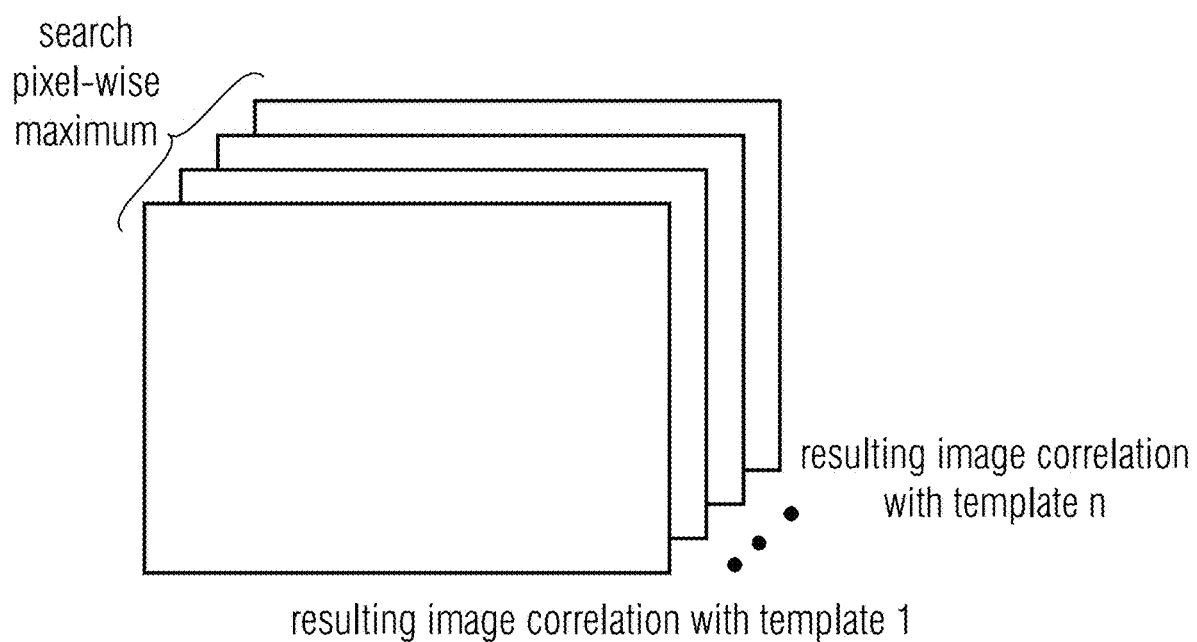

FIG. 4a shows a processing chain 1000 of a fast 2D correlation. The processing chain of the 2D correlation comprises at least the function blocks 1105 for a multitude 2D folding and 1110 for the merging. The procedure regarding the multitude 2D folding is illustrated in FIG. 4b. FIG. 4b shows the exemplary compilation at templates. By means of FIG. 4c in combination with FIG. 4d, it becomes obvious, how a Hough feature can be extracted on the basis of this processing chain 1000. FIG. 4c exemplarily shows the pixel-wise correlation with n templates (in this case e.g. for straight lines with different increase) for the recognition of the ellipsis 1115, while FIG. 4d shows the result of the pixel-wise correlation, whereby typically via the n result images still a maximum search occurs. Every result image contains one Hough feature per pixel. In the following, this Hough processing is described in the overall context.

Contrary to the implementation with a delay filter with adjustable characteristic (implementation optimized for parallel FPGA structures), regarding the here outlined Hough processing, which in particular is predestined for a PC-based implementation, a part of the processing would be exchanged by another approach.

So far, it was the fact that quasi every column of the delay filter represents a searched structure (e.g. straight line segments of different increase). With passing the filter, the column number with the highest amount value is decisive. Thereby, the column number represents a characteristic of the searched structure and the amount value indicates a measure for the accordance with the searched structure.

Regarding the PC-based implementation, the delay filter is exchanged by fast 2D correlation. The previous delay filter is to be formed according to the size in the position n of characteristics of a specific pattern. This n characteristics are stored as templates in the storage. Subsequently, the pre-processed image (e.g. binary edge image or gradient image) is passed pixel-wise. At every pixel position, respectively all stored templates with the subjacent image content (corresponding to the post-processing characteristic) are synchronized (i.e. the environment of the pixel position (in size of the templates) is evaluated). This procedure is referred to as correlation in the digital image processing. Thus, for every template a correlation value is obtained—i.e. a measure for the accordance—with the subjacent image content. Thus, the latter correspond to the column amounts form the previous delay filter. Now, decision is made (per pixel) for the template with the highest correlation value and its template number is memorized (the template number describes the characteristic of the searched structure, e.g. increase of the straight line segment).

Thus, per pixel a correlation value and a template number is obtained. Thereby, a Hough feature, as it already had been outlined, may be entirely described.

It should be further noted that the correlation of the individual templates with the image content may be carried out in the local area as well as in the frequency area. This means that the initial image first of all is correlated with respectively all n templates. N result images are obtained. If these result images are put one above the other (like in a cuboid), the highest correlation value per pixel would be searched (via all planes). Thereby, individual planes then represent the individual templates in the cuboid. As a result, again an individual image is obtained, which then per pixel contains a correlation measure and a template number—thus, per pixel one Hough feature.

Even if the above aspects had been described in connection with the "pupil recognition", the above outlined aspects are also usable for further applications. Here, for example, the application "warning systems for momentary nodding off" is to be mentioned, to which in the following it is referred to in detail.

The warning system for momentary nodding off is a system consisting at least of an image collecting unit, an illumination unit, a processing unit and an acoustic and/or optical signaling unit. By evaluation of an image recorded by the user, the device is able to recognize beginning momentary nodding off or fatigue or deflection of the user and to warn the user.

The system can e.g. be developed in a form that a CMOS image sensor is used and the scene is illuminated in the infrared range. This has the advantage that the device works independently from the environmental light and, in particular does not blind the user. As processing unit, an embedded processor system is used, which executes a software code on the subjacent operation system. The signaling unit currently consists of a multi-frequency buzzer and an RGBLED.

The evaluation of the recorded image can occur in form of the fact that in a first processing stage, a face and an eye detection and an eye analysis are performed with a classifier. This processing stage provides first indications for the alignment of the face, the eye position and the degree of the blink reflex.

Based on this, in the subsequent step, a model-based eye precise analysis is carried out. An eye model used therefor can e.g. consist of: a pupil and/or iris position, a pupil and/or iris size, a description of the eyelids and the eye edge points. Thereby, it is sufficient, if at every point in time, some of these components are found and evaluated. The individual components may also be tracked via several images so that they have not to be completely searched again in every image.

The previously described Hough features can be used in order to carry out the face detection or the eye detection or the eye analysis or the eye precise analysis. The previously described 2D image analyzer can be used for the face detection or the eye detection or the eye analysis. For the smoothing of the determined result values or intermediate results or value developments during the face detection or eye detection or eye analysis, the described adaptive selective data processor can be used.

A chronological evaluation of the degree of the blink reflex and/or the results of the eye precise analysis, can be used for determining the momentary nodding of or the fatigue or deflection of the user. Additionally, also the calibration-free gaze direction determination as described in connection with the 3D image analyzer can be used in order obtain better results for the determination of the momentary nodding off or the fatigue or deflection of the user. In order to stabilize these results, moreover, the adaptive selective data processor can be used.

The procedure described in the embodiment "momentary nodding off warning system" for the determination of the eye position can also be used for the determination of an arbitrarily other defined 2D position, as e.g. the nose position, or nasal root position within a face.

When using one set of information from one image and a further set of information, this position can also be determined in the 3D room, whereby the further set of information can be generated from an image of a further camera or by evaluation of relations between objects in the first camera image.

According to an embodiment, the Hough processor in the stage of initial image can comprise a unit for the camera control.

Although some aspects have been described in connection with a device, it is understood that these aspects also constitute a description of the respective method so that a block or a component of a device is also to be understood as being a respective method step or a feature of a method step. Analogous thereto, aspects which had been described in connection with or as being a method step, also constitute a description of a respective block or detail or feature of the respective device. Some or all method steps may be carried out by an apparatus (by using a hardware apparatus), as e.g. a microprocessor, of a programmable computer or an electronic switch. Regarding some embodiments, some or more of the important method steps can be carried out by such an apparatus.

According to specific implementation requirements, embodiments of invention may be implemented into hardware or software. The implementation may be carried out by using a digital storage medium, as e.g. a Floppy Disc, a DVD, a Blu-ray Disc, a CD, a ROM, a PROM, am EPROM, an EEPROM, or a FLASH memory, a hard disc or any other magnetic or optical storage, on which electronically readable control signals are stored, which collaborate with a programmable computer system in a way that the respective method is carried out. Therefore, the digital storage medium may be computer readable.

Some embodiments according to the invention, thus, comprise a data carrier having electronically readable control signals, which are able to collaborate with a programmable computer system in a way that one of the herein described methods is carried out.

Generally, embodiments of the present invention can be implemented as computer program product with a program code, whereby the program code is effective in order to carry out one of the methods, if the computer program product runs on a computer.

The program code may e.g. be stored on a machine-readable carrier.

Further embodiments comprise the computer program for the execution of one of the methods described herein, whereby the computer program is stored on a machine-readable carrier.

In other words, thus, one embodiment of the method according to the invention is a computer program having a program code for the execution of one of the methods defined herein, if the computer program runs on a computer.

A further embodiment of the method according to the invention, thus, is a data stream or a sequence of signals, which constitute the computer program for carrying out one of the herein defined methods. The data stream or the sequence of signals can e.g. be configured in order to be transferred via a data communication connection, e.g. via the Internet.

A further embodiment comprises a processing unit, e.g. a computer or a programmable logic component, which is configured or adjusted in order to carry out one of the herein defined methods.

A further embodiment comprises a computer, on which the computer program for executing one of the herein defined method is installed.

A further embodiment according to the invention comprises a device or a system, which are designed in order to transmit a computer program for executing at least one of the herein defined methods to a recipient. The transmission may e.g. occur electronically or optically. The recipient may be a computer, a mobile device, a storage device, or a similar device. The device or the system can e.g. comprise a file server for the transmission of the computer program to the recipient.

Regarding some embodiments, a programmable logic component (e.g. a field programmable gate array, an FPGA) may be used in order to execute some or all functionalities of the herein defined methods. Regarding some embodiments, a field-programmable gate array can collaborate with a microprocessor, in order to execute one of the herein defined methods. Generally, regarding some embodiments, the methods are executed by an arbitrary hardware device. This can be a universally applicable hardware as a computer processor (CPU) or a hardware specific for the method, as e.g. an ASIC.

In the following, the above described inventions or aspects of the inventions are described from two further perspectives in other words:

Integrated Eye-Tracker

The integrated eye-tracker comprises a compilation of FPGA-optimized algorithms, which are suitable to extract (ellipsis) features (Hough features) by means of a parallel Hough transformation from a camera live image. Thereafter, by evaluating the extracted features, the pupil ellipsis can be determined. When using several cameras with a position and alignment known to each other, the 3D position of the pupil midpoint as well as the 3D gaze direction and the pupil diameter can be determined. For the calculation, the position and form of the ellipsis in the camera images are consulted. Calibration of the system for the respective user is not necessitated as well as knowledge of the distance between the cameras and the analyzed eye. The used image processing algorithms are in particular characterized in that they are optimized for the processing on an FPGA (field programmable gate array). The algorithms enable a very fast image processing with a constant refresh rate, minimum latency periods and minimum resource consumption in the FPGA. Thus, these modules are predestined for time-, latency, and security-critical applications (e.g. driving assistance systems), medical diagnostic systems (e.g. perimeters) as well as application for human machine interfaces (e.g. mobile devices), which necessitate a small construction volume.

Problem

Robust detection of 3D eye positions and 3D gaze directions in the 3D room in several (live) camera images as well as detection of the pupil size Very short reaction period (or processing time)

Small construction

Autonomous functionality (independent from the PC) by integrated solution

State of the Art

Eye-tracker systems

Steffen Markert: gaze direction determination of the human eye in real time (diploma thesis and patent DE 10 2004 046 617 A1)

Andrew T. Duchowski: Eye Tracking Methodology: Theory and Practice

Parallel Hough Transformation

Johannes Katzmann: A real time implementation for the ellipsis Hough transformation (diploma thesis and patent DE 10 2005 047 160 B4)

Christian Holland-Nell: Implementation of a pupil detection algorithm based on the Hough transformation for circles (diploma thesis and patent DE 10 2005 047 160 B4)

Disadvantages of the Current State of the Art

Eye-tracker systems

Disadvantages:

Eye-tracking systems generally necessitate a (complex) calibration prior to use

The system according to Markert (patent DE 10 2004 046 617 A1) is calibration-free, however works only under certain conditions:

1. Distance between camera and pupil midpoint has to be known and on file

2. The method only works for the case that the 3D pupil midpoint lies within the optical axes of the cameras The overall processing is optimized for PC hardware and, thus, is also subject to their disadvantages (no fixed time regime is possible during the processing)

Efficient systems are necessitated, as the algorithms have a very high resource consumption Long processing period and, thus, long delay periods until the result is available (partly dependent on the image size to be evaluated)

Parallel Hough Transformation

Disadvantages:

Only binary edge images can be transformed

Transformation only provides a binary result related to an image coordinate (position of the structure was found, but not: hit probability and further structure features)

No flexible adjustment of the transformation core during the ongoing operation and, thus, only insufficient suitability for dynamic image contents (e.g. small and big pupils)

Reconfiguration of the transformation core to other structures during operation is not possible and, thus limited suitability for object recognition Implementation The overall system determines from two or more camera images, in which the same eye is displayed, respectively a list of multi-dimensional Hough features and respectively calculates on their basis the position and form of the pupil ellipsis. From the parameters of these two ellipses as well as solely from the position and alignment of the camera to each other, the 3D position of the pupil midpoint as well as the 3D gaze direction and the pupil diameter can be determined entirely calibration-free. As hardware platform, a combination of at least two image sensors, FPGA and/or downstream microprocessor system is used (without the mandatory need of a PCI).

Figure 6:
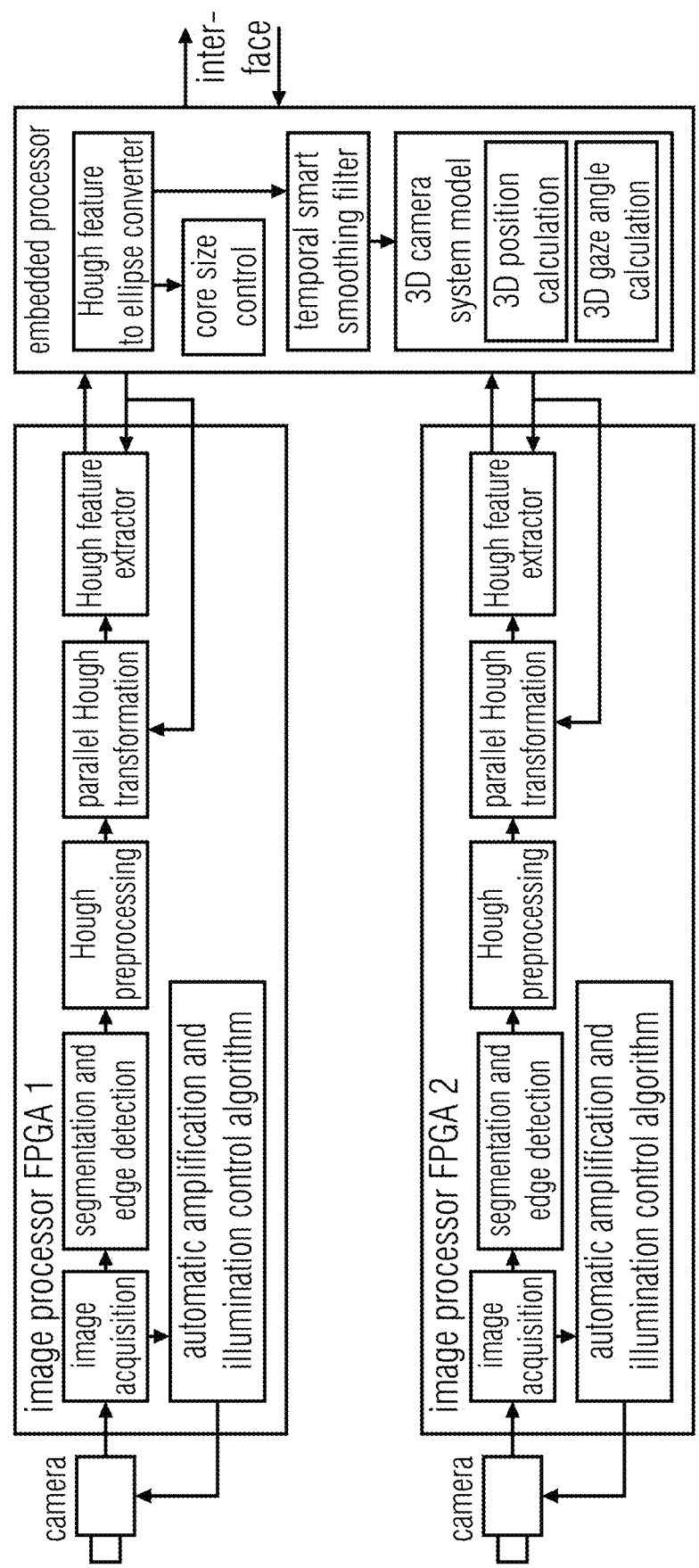
FIG. 6-7 are further illustrations for explanation of additional embodiments and/or aspects.

"Hough preprocessing", "Parallel Hough transform", "Hough feature extractor", "Hough feature to ellipse converter", "Core-size control", "Temporal smart smoothing filter", "3D camera system model", "3D position calculation" and "3D gaze direction calculation" relate to individual function modules of the integrated eye tracker. They fall into line of the image processing chain of the integrated eyetracker as follows:

FIG. 6 shows a block diagram of the individual function modules in the integrated eye-tracker. The block diagram shows the individual processing stages of the integrated eye-tracker. In the following, a detailed description of the modules is presented.

"Hough pre-processing"
  Function
    Up-sampling of a video stream for the module "Parallel Hough Transform", in particular by image rotation and up-sampling of the image to be transformed according to the parallelizing degree of the module "Parallel Hough Transform"
  Input
    Binary edge image or gradient image
  Output
    According to the parallelizing degree of the subsequent module, one or more video streams with up-sampled pixel data from the input
  Detailed description
    Based on the principle, the parallel Hough transformation can be applied to the image content from four about respectively 90° distorted main directions
    For this, in the pre-processing, an image rotation of about 90° occurs
    The two remaining directions are covered by the fact that respectively the rotated and the non-rotated image are horizontally reflected (by reverse readout of the image matrix filed in the storage)
    According to the parallelizing degree of the module, the following three constellations arise for the output:
      100% parallelizing: simultaneous output of four video data streams: about 90° rotated, non-rotated as well as respectively reflected
      50% parallelizing: output of two video data streams: about 90° rotated and non-rotated, the output of the respectively reflected variations occurs sequentially
      25% parallelizing: output of a video data stream: about 90° rotated and non-rotated and respectively their reflected variations are outputted sequentially "Parallel Hough transform"
  Function
    Parallel recognition of simple patterns (straight lines with different sizes and increases and curves with different radii and orientations) and their appearance probability in a binary edge or gradient image
  Input
    For the parallel Hough Transformation up-sampled edge or gradient image (output of the "Hough preprocessing" module)
  Output
    Multi-dimensional Hough room containing all relevant parameters of the searched structure
  Detailed description
    Processing of the input by a complex delay-based local filter, which has a defined "passing direction" for pixel data and is characterized by the following features:
      Filter core with variable size consisting of delay elements
      For the adaptive adjustment of the filter to the searched patterns, delay elements can be switched on and off during the operation
      Every column of the filter represents a specific characteristic of the searched structure (curve or straight line increase)
      Summation via the filter columns provides appearance probability for the characteristic of the structure represented by the respective column
      When passing the filter, the column with the highest appearance probability for a characteristic of the searched pattern is outputted
    For every image pixel, the filter provides one point in the Hough room, which contains the following information:
      Kind of the pattern (e.g. straight line or half circle)
      Appearance probability for the pattern
      Characteristic of the structure (intensity of the curve or for straight lines: increase and length)
      Position or orientation of the structure in the image
    As transformation result, a multi-dimensional image arises, which is in the following referred to as Hough room.

"Hough feature extractor"
  Function
    Extraction of features from the Hough room containing relevant information for the pattern recognition
  Input
    Multi-dimensional Hough room (output of the "parallel Hough transform" module)
  Output
    List of Hough features containing relevant information for the pattern recognition
  Detailed description
    Smoothing of the Hough feature rooms (spatial correction by means of local filtering)
    "Thinning" of the Hough room (suppression of non-relevant information for the pattern recognition) by a modified "non-maximumsuppression":

Fading out of points non-relevant for the processing ("non-maxima" in the Hough probability room) by considering the kind of the pattern and the characteristic of the structure Further thinning of the Hough room points by means of suitable thresholds:

Noise suppression by threshold value in the Hough probability room

Indication of an interval for minimum and maximum admissible characteristic of the structure (e.g. minimum/maximum curve regarding curved structures or lowest/highest increase regarding straight lines)

Analytical retransformation of the parameters of all remaining points in the original image scope results in the following Hough features:

Curved structures with the parameters:
Position (x- and y-image coordinates)
Appearance probability of the Hough features
Radius of the arc
Angle indicating in which direction the arc is opened Straight lines with the parameters:
Position (x- and y-image coordinates)
Appearance probability of the Hough features
Angle indicating the increase of the straight line
Length of the represented straight line segment "Hough feature to ellipse converter"

Function
Selection of the 3 to 4 Hough features (curves), which describe with the highest probability the pupil edge (ellipsis) in the image and settling to an ellipsis Input
List of all detected Hough features (curves) in a camera image Output
Parameter of the ellipsis representing with the highest probability the pupil Detailed description
From the list of all Hough features (curves), combinations of 3 to 4 Hough features are formed, which due to their parameters can describe the horizontal and vertical extreme points of an Thereby, the following criteria have an influence on the selection of the Hough features:
Scores (probabilities) of the Hough features
Curve of the Hough features
Position and orientation of the Hough features to each other The selected Hough feature combinations are arranged:
Primarily according to the number of the contained Hough features
Secondary according to combined probability of the contained Hough features After arranging, the Hough feature combination being in the first place is selected and the ellipsis, which represents most probably the pupil in the camera image, is fitted "Core-size control"

Function
Dynamic adjustment of the filter core (Hough core) of the parallel Hough transformation to the actual ellipsis size Input
Last used Hough core size
Parameters of the ellipsis, which represents the pupil in the corresponding camera image Output
Updated Hough core size Detailed description
Dependent on the size (length of the half axes) of the ellipsis calculated by the "Hough feature to ellipse converter", the Hough core size is tracked in order to increase the accuracy of the Hough transformation results during the detection of the extreme points "Temporal smart smoothing filter"

Function
Adaptive simultaneous smoothing of the data series (e.g. of a determined ellipsis midpoint coordinate) according to the principle of the exponential smoothing, whereby the dropouts or extreme outliers within the data series to be smoothened do NOT lead to fluctuations of the smoothened data Input
At every activation time of the module, respectively one value of the data series and the associated quality criteria (e.g. appearance probability of a fitted ellipsis)

Output
Smoothened data value (e.g. ellipsis midpoint coordinate)

Detailed description
Via a set of filter parameters, with initializing the filter, its behavior can be determined
The actual input value is used for the smoothing, if it does not fall within one of the following categories:
Corresponding to the associated appearance probability, it is a dropout in the data series
Corresponding to the associated ellipsis parameters, it is an outlier
If the size of the actual ellipsis differs to much from the size of the previous ellipsis
With a too large difference of the actual position towards the last position of the ellipsis If one of these criteria is fulfilled, furthermore, the previously determined value is outputted, otherwise, the current value for smoothing is consulted In order to obtain a possibly low delay during smoothing, current values are stronger rated than past ones:

Currently smoothed value=current value*smoothing coefficient+last smoothened value*(1−smoothing coefficient)

The smoothing coefficient is adjusted within defined borders dynamically to the tendency of the data to be smoothened:
Reduction with rather constant value development in the data series
Increase with increasing or decreasing value development in the data series If in the long term a larger leap regarding the ellipsis parameters to be smoothened occurs, the filter and, thus, also the smoothened value development adjusts "3D camera system model"
Function
Modeling of the 3D room, in which several cameras, the user (or his/her eye) and possibly a screen are located
Input
Configuration file, containing the model parameters (position parameter, optical parameters, amongst others) of all models
Output
Provides a statistical framework and functions for the calculations within this model
Detailed description
Modeling of the spatial position (position and rotation angle) of all elements of the model as well as their geometric (e.g. pixel size, sensor size, resolution) and optical (e.g. focal length, objective distortion) characteristics
The model comprises at this point in time the following elements:
Camera units, consisting of:
Camera sensors
Objective lenses
Eyes
Display
Besides the characteristics of all elements of the model, in particular the subsequently described functions "3D position calculation" (for the calculation of the eye position) and "3D gaze direction calculation" (for the calculation of the gaze direction) are provided
By means of this model, inter alia the 3D line of sight (consisting of the pupil midpoint and the gaze direction vector (corrected corresponding to biology and physiology of the human eye can be calculated
Optionally, also the point of view of a viewer on another object of the 3D model (e.g. on a display) may be calculated as well as the focused area of the viewer "3D position calculation"
Function
Calculation of the spatial position (3D coordinates) of a point, captured by two or more cameras (e.g. pupil midpoint) by triangulation
Input
2D-coordinates of one point in two camera images
Output
3D-coordinates of the point
Error measure: describes the accuracy of the transferred 2D-coordinates in combination with the model parameters
Detailed description
From the transferred 2D-coordinates, by means of the "3D camera system model" (in particular under consideration of the optical parameters) for both cameras, the light beams are calculated, which have displayed the 3D point as 2D point on the sensors
These light beams are described as straight lines in the 3D room of the mode
The point of which both straight lines have the smallest distance (in the ideal case, the intersection of the straight lines), is assumed to be the searched 3D point "3D gaze direction calculation"
Function
Determination of the gaze direction from two ellipsis-shaped projections of the pupil to the camera sensors without calibration and without knowledge of the distance between eye and camera system
Input
3D position parameters of the image sensors
Ellipsis parameters of the pupil projected to both image sensors
3D positions of the ellipsis midpoint on both image sensors
3D position of the pupil midpoint
Output
3D gaze direction in vector and angle demonstration
Detailed description
From the 3D position of the pupil midpoint and the position of the image sensors, by rotation of the real camera units, virtual camera units are calculated, the optical axis of which passes through the 3D pupil midpoint
Subsequently, from the projections of the pupil to the real sensor projections of the pupil, respectively the virtual sensors are calculated, thus, so to speak, two virtual ellipses arise
From the parameters of the virtual ellipses, for both sensors, respectively two view points of the eye can be calculated on a parallel plane being arbitrary parallel to the respective sensor plane
With these four points of view and the 3D pupil midpoint, four gaze direction vectors can be calculated (respectively two vectors from the results of each camera)
From these four gaze direction vectors, exactly one is (nearly) identical with one of the one camera with one of the other camera
Both identical vectors indicate the searched gaze direction of the eye, which is then provided by the module "3D gaze direction calculation" as result 4. a) Advantages
Contactless and completely calibration-free determination of the 3D eye positions, 3D gaze direction and pupil size independent from the knowledge of the eye's position towards the cameras
Analytical determination of the 3D eye position and 3D gaze direction (by including a 3D room model) enables an arbitrary number of cameras (>2) and an arbitrary camera position in the 3D room
Measuring of the pupil projected to the camera and, thus, a precise determination of the pupil size
High frame rates (e.g. 60 FPS @ 640×480 on one XILINX Spartan 3A DSP @ 96 MHz) and short latency periods due to completely parallel processing without recursion in the processing chain
Use of FPGA hardware and algorithms, which had been developed for the parallel FPGA structures
Use of the Hough transformation (in the described adjusted form for FPGA hardware) for the robust feature extraction for the object recognition (here: features of the pupil ellipsis)
Algorithms for the post-processing of the Hough transformation results are optimized on parallel processing in FPGAs
Fixed time regime (constant time difference between consecutive results)

Minimum construction room, as completely integrated on a chip

Low energy consumption

Possibility for a direct porting of the processing to FPGA to an ASIC→very cost-effective solution with high quantities due to exploitation of scaling effects Application In a (live-) camera image data stream, 3D eye positions and 3D gaze directions are detected, which can be used for the following applications:

Security-relevant fields e.g., momentary nodding off warning system or fatigue detectors as driving assistance system in the automotive sector, by evaluation of the eyes (e.g. coverage of the pupil as measure for the blink degree) and under consideration of the points of view and the focus Man-machine-interfaces As input interfaces for technical devices (eye position and gaze direction may be used as input parameters)

Support of the user when viewing screen contents (e.g. highlighting of areas, which are viewed)

E.g.
in the field of Assisted Living
for computer games
gaze direction supported input for Head Mounted Devices
optimizing of 3D visualizations by including the gaze direction Market and media development E.g. assessing attractiveness of advertisement by evaluating of the spatial gaze direction and the pint of view of the test person Ophthalmological diagnostic (e.g. objective perimetry) and therapy FPGA-Face Tracker One aspect of the invention relates to an autonomous (PC-independent) system, which in particular uses FPGA-optimized algorithms and which is suitable to detect a face in a camera live image and its (spatial) position. The used algorithms are in particular characterized in that they are optimized for the processing on an FPGA (field programmable gate array) and compared to the existing methods, get along without recursion in the processing. The algorithms allow a very fast image processing with constant frame rate, minimum latency periods and minimum resource consumption in the FPGA. Thereby, these modules are predestined for a time/latency-/security-critical application (e.g. driving assistance systems) or applications as human machine interfaces (e.g. for mobile devices), which necessitate a small construction volume. Moreover, by using a second camera, the spatial position of the user for specific points in the image may be determined highly accurate, calibration-free and contactless.

Problem

Robust and Hardware-Based Face Detection in a (Live) Camera Image

Detection of face and eye position in the 3D room by using a stereoscopic camera system
Very short reaction period (or processing period)
Small construction
Autonomous functionality (independency from the PC) by integrated solution State of the Art Literature:

Christian Küblbeck, Andreas Ernst: Face detection and tracking in video sequences using the modified census transformation Paul Viola, Michael Jones: Robust Real-time Object Detection Disadvantages of Current Face Tracker Systems The overall processing is optimized for PC systems (more general: general purpose processors) and, thus, is also subject to their disadvantages (e.g. fixed time regime during processing is not possible (example: dependent on the image content, e.g. background, the tracking possibly takes a longer time))

Sequential processing; the initial image is successively brought into different scaling stages (until the lowest scaling stage is reached) and is searched respectively with a multi-stage classifier regarding faces Depending on how many scaling stages have to be calculated or how many stages of the classifier have to be calculated, the processing period varies until the result is available In order to reach high frame rates, efficient systems are necessitated (higher clock rates, under circumstances multi-score systems), as the already to PC hardware optimized algorithms despite have a very high resource consumption (in particular regarding embedded processor systems)

Based on the detected face position, the classifiers provide only inaccurate eye positions (the eyes' position—in particular the pupil midpoint—is not analytically determined (or measured) and is therefore subject to high inaccuracies)

The determined face and eye positions are only available within the 2D image coordinates, not in 3D Implementation The overall system determines from a camera image (in which only one face is displayed) the face position and determines by using this position, the positions of the pupil midpoints of the left and right eye. If two or more cameras with a known alignment to each other are used, these two points can be indicated for the three-dimensional room. Both determined eye positions may be further processed in systems, which use the "integrated eye-tracker".

Figure 7A:
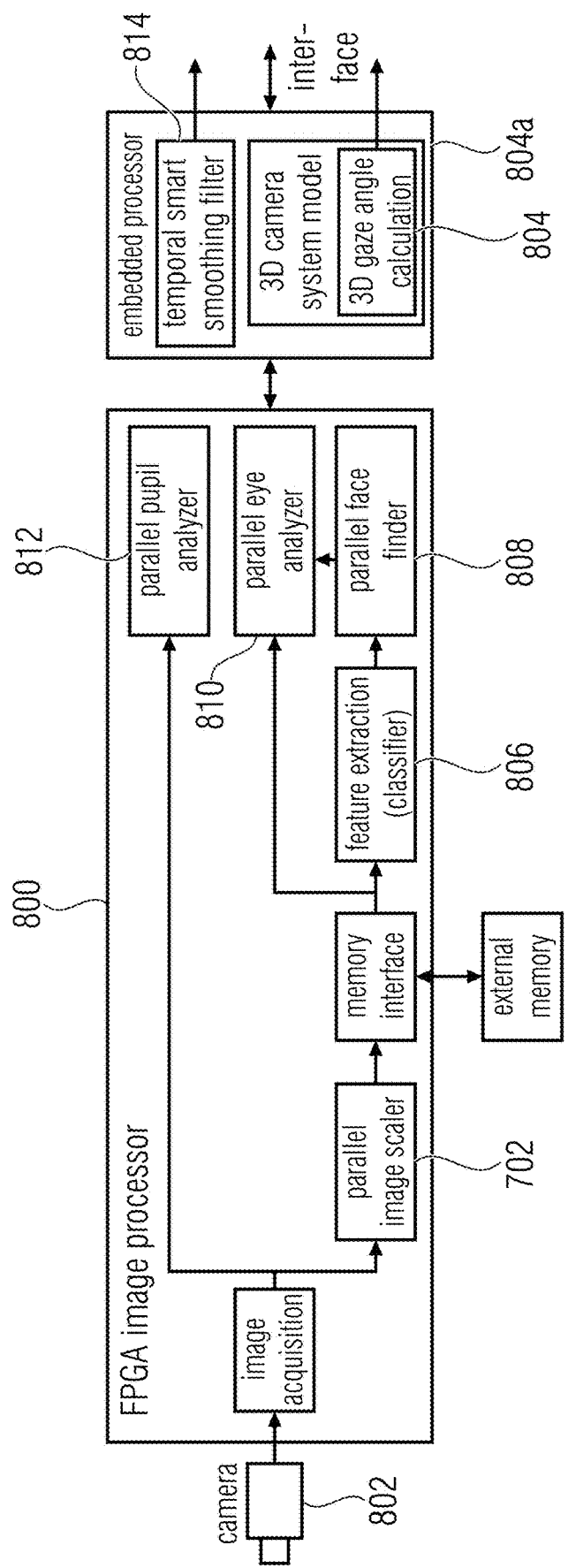

The "parallel image scaler", "parallel face finder", "parallel eye analyzer", "parallel pupil analyzer", "temporal smart smoothing filter", "3D camera system model" and "3D position calculation" relate to individual function modules of the overall system (FPGA face tracker). They get in lane with the image processing chain of FPGA face trackers as follows:

FIG. 7a shows a block diagram of the individual function modules in the FPGA face tracker. The function modules "3D camera system model" and "3D position calculation" are mandatorily necessitated for the face tracking, however, are used when using a stereoscopic camera system and calculating suitable points on both cameras for the determination of spatial positions (e.g. for determining the 3D head position during calculation of the 2D face midpoints in both camera images).

The module "feature extraction (classification)" of the FPGA face trackers is based on the feature extraction and classification of Küblbeck/Ernst of Fraunhofer IIS (Erlangen, Germany) and uses an adjusted variant of its classification on the basis of census features.

The block diagram shows the individual processing stages of the FPGA face tracking system. In the following, a detailed description of the modules is presented.

The block diagram shows the individual processing stages of the FPGA face tracking system. In the following, a detailed description of the modules is presented.

Figure 7C:
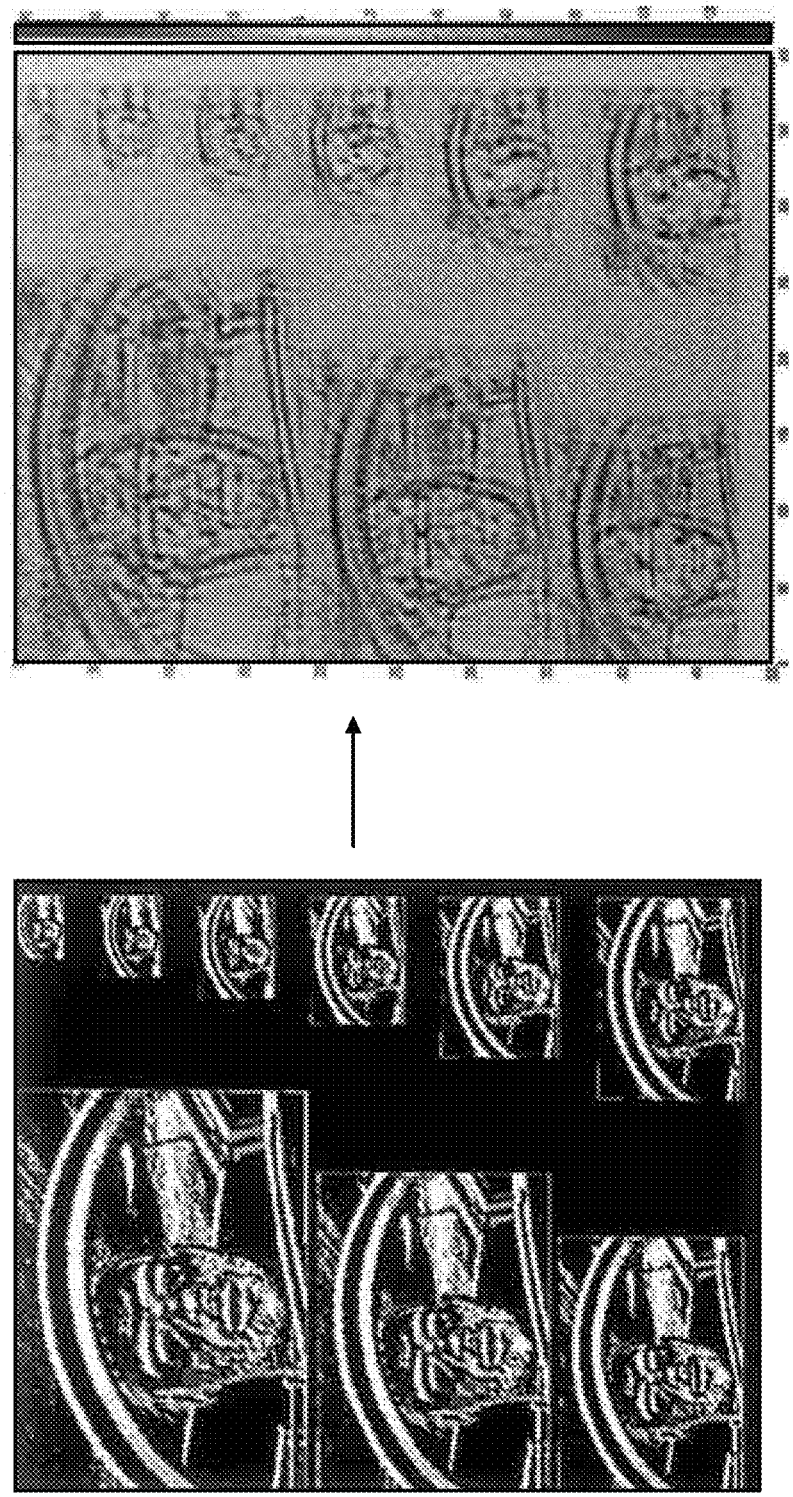

"Parallel image scaler"
　Function
　　Parallel calculation of the scaling stages of the initial image and arrangement of the calculated scaling stages in a new image matrix in order to allow the subsequent image processing modules a simultaneous analysis of all scaling stages
　FIG. 7b shows the initial image (original image) and result (downscaling image) of the parallel image scaler.
　Input
　　Initial image in original resolution
　Output
　　New image matrix containing more scaled variants of the initial image in an arrangement suitable for the subsequent face tracking modules
　Detailed description
　　Establishing an image pyramid by parallel calculation of different scaling stages of the initial image
　　In order to guarantee a defined arrangement of the previously calculated scaling stages within the target matrix, a transformation of the image coordinates of the respective scaling stages into the image coordinate system of the target matrix occurs by means of various criteria:
　　　Defined minimum distance between the scaling stages in order to suppress a crosstalk of analysis results in adjacent stages
　　　Defined distance to the edges of the target matrix in order to guarantee the analysis of faces partly projecting from the image "Parallel face finder"
　Function
　　Detects a face from classification results of several scaling stages, which are jointly arranged in a matrix.
　As shown in FIG. 7c, the result of the classification (rightwards) constitutes the input for the parallel face finder.
　Input
　　Classified image matrix containing several scaling stages
　Output
　　Position at which with highest probability a face is located (under consideration of several criteria)
　Detailed description
　　Noise suppression for limiting the classification results
　　Spatial correction of the classification results within the scaling scales by means of a combination of local amount- and maximum filter
　　Orientation on the highest appearance probability for a face optionally at the face size over and away of all scaling stages
　　Spatial averaging of the result positions over and away of selected scaling stages
　　　Selection of the scaling stages included in the averaging takes place under consideration of the following criteria:
　　　　Difference of the midpoints of the selected face in the viewed scaling stages
　　　　Dynamically determined deviation of the highest result of the amount filter
　　　　Suppression of scaling stages without classification result
　　Threshold-based adjustment of the detection performance of the "parallel face finder"

"Parallel eye analyzer"
　Function
　　Detects parallel during the face detection the position of the eyes in the corresponding face (this is above all important for not ideally frontally captured and distorted faces)
　Input
　　Image matrix containing several scaling stages of the initial image (from the "parallel image scaler" module) as well as the respective current position, at which the searched face with highest probability is located (from the "parallel face finder" module)
　Output
　　Position of the eyes and an associated probability value in the currently detected face by the "parallel face finder"
　Detailed description
　　Based on the down-scaled initial image, in its defined range (eye range) within the face region provided by the "parallel face finder", the eye search for every eye is executed as described in the following:
　　　Defining the eye range from empirically determined normal positions of the eyes within the face region.
　　　With a specifically formed correlation-based local filter, probabilities for the presence of an eye are determined within the eye range (the eye in this image segment is simplified described as a little dark surface with light environment)
　　　The exact eye position inclusively its probability results from a minimum search in the previously calculated probability mountains "Parallel pupil analyzer"
　Function
　　Detects based on a previously determined eye position, the position of the pupil midpoints within the detected eyes (thereby, the accuracy increases of the eye position, which is important for the measurements or the subsequent evaluation of the pupil)
　Input
　　Initial image in original resolution as well as the determined eye positions and face size (from the "parallel eye analyzer" or the "parallel face finder")
　Output
　　Position of the pupil within the evaluated image as well as a status indicating if a pupil was found or not
　Detailed description
　　Based on the determined eye positions and the face size, an image section to be processed is identified around the eye
　　Beyond this image matrix, a vector is built up containing the minima of the image columns as well as a vector containing the minima of the image lines
　　Within these vectors (from minimum grey values), the pupil midpoint is as described in the following separately detected in horizontal and vertical direction:

Detection of the minimum of the respective vector (as position within the pupil)

Based on this minimum, within the vector, in positive and negative direction, the position is determined, at which an adjustable threshold related proportionally to the dynamic range of all vector elements is exceeded The midpoints of these ranges in both vectors together form the midpoint of the pupil in the analyzed image "Temporal smart smoothing filter"

Function

Adaptive temporal smoothing of a data series (e.g. of a determined face coordinate), whereby dropouts, absurd values or extreme outliers do NOT lead to fluctuations in the smoothened data Input To every activation time of the module respectively one value of the data series and the associated quality criteria (regarding face tracking: face score and down-scaling stage, in which the face was found)

Output

Smoothened data value (e.g. face coordinate)

Detailed description

Via a set of filter parameters, during initializing of the filter, its behavior can be determined The current input value is used for the smoothing, if it does not fall within one of the following categories:

According to the associated score, it is a dropout of the data series

According to the associated down-scaling stage, it is an absurd value (value, which had been determined in down-scaling stage which was too far away)

According to the too large difference towards the last value used for the smoothing, it is an outlier If one of these criteria is fulfilled, further, the previously determined smoothened value is outputted, otherwise, the current value is consulted for the smoothing In order to obtain a possibly low delay during smoothing, the current values are stronger rated than pas ones:

Currently smoothened value=current value*smoothing coefficient+last smoothened value*(1−smoothing coefficient)

The smoothing coefficient is in defined borders dynamically adjusted to the tendency of the data to be smoothened:

Reduction with rather constant value development of the data series

Increase with increasing or decreasing value development of the data series

If in the long term a larger leap regarding the ellipsis parameters to be smoothened occurs, the filter and, thus, also the smoothened value development adjusts "3D camera system model"

Function

Modeling of the 3D room in which several cameras, the user (or his/her eyes) and possibly a screen are located Input Configuration file, which contains the model parameters (position parameters, optical parameters, et al) of all elements of the model Output Provides a statistical framework and functions for the calculations within this model Detailed description Modeling of the spatial position (position and rotation angle) of all elements of the model as well as their geometric (e.g. pixel size, sensor size, resolution) and optical (e.g. focal length, objective distortion) characteristics The model comprises at this point in time the following elements:

Camera units consisting of:
Camera sensors
Objective lenses
eyes
Display

Besides the characteristics of all elements of the model, in particular the subsequently described functions "3D position calculation" (for the calculation of the eye position) and "3D gaze direction calculation" (for the calculation of the gaze direction) are provided In other application cases, also the following functions are provided:

By means of this model, inter alia the 3D line of sight (consisting of the pupil midpoint and the gaze direction vector (corresponding to biology and physiology of the human eye can be calculated Optionally, also the point of view of a viewer on another object of the 3D model (e.g. on a display) may be calculated as well as the focused area of the viewer "3D position calculation"

Function

Calculation of the spatial position (3D coordinates) of a point, captured by two or more cameras (e.g. pupil midpoint)

Input 2D-coordinates of a point in two camera images

Output 3D-coordinates of the point

Error measure: describes the accuracy of the transferred 2D coordinates in connection with the model parameters Detailed description From the transferred 2D-coordinates, by means of the "3D camera system model" (in particular under consideration of the optical parameters) for both cameras, the light beams are calculated, which have displayed the 3D point as 2D point on the sensors These light beams are described as straight lines in the 3D room of the mode The point of which both straight lines have the smallest distance (in the ideal case, the intersection of the straight lines), is assumed to be the searched 3D point Advantages Determination of the face position and the eye position in a (live) camera image in 2D and by recalculation in the 3D room in 3D (by including of a 3D room model)

The algorithms presented under 3, are optimized to real-time capable and parallel processing in FPGAs High frame rates (60 FPS @ 640×480 on a XILINX Spartan 3A DSP @ 48 MHz) and short latency periods due to entirely parallel processing without recursion in the processing chain→very fast image processing and an output of the results with a minimum delay Minimum construction room as the entire functionality can be achieved with one component (FPGA)

Low energy consumption

Fixed time regime (constant time difference between consecutive results) and thereby, predestined for the use in security-critical applications Possibility to direct porting of the processing from the FPGA to an ASIC (application specific integrated circuit)→very cost efficient solution at high quantities due to exploitation of the scaling effects Application Advantages during the application compared to a software solution Autonomous functionality (System on Chip)

Possibility of the easy transfer into an ASIC

Space-saving integration into existing systems/switches

Application fields similar to those of a software solution (in a (live) camera image data stream face positions and the corresponding eye positions are detected, which are used for the below listed applications)

Security applications

E.g. momentary nodding off warning systems in the automotive field, by evaluation of the eyes (blink degree) and the eyes and head movement Man-machine-communication E.g. input interfaces for technical devices (head or eye position as input parameter)

Gaze-tracking

E.g. face and eye positions as preliminary stage for the gaze direction determination (in combination with "integrated eye-tracker")

Marketing

E.g. assessing attractiveness of advertisement by determining the head and eye parameters (inter alia position)

In the following, by means of two illustrations, further background knowledge regarding the above described aspects is disclosed.

A detailed calculation example for this gaze direction calculation is described in the following by means of FIGS. 8a to 8e.

Calculating the Pupil Midpoint

Figure 8A:
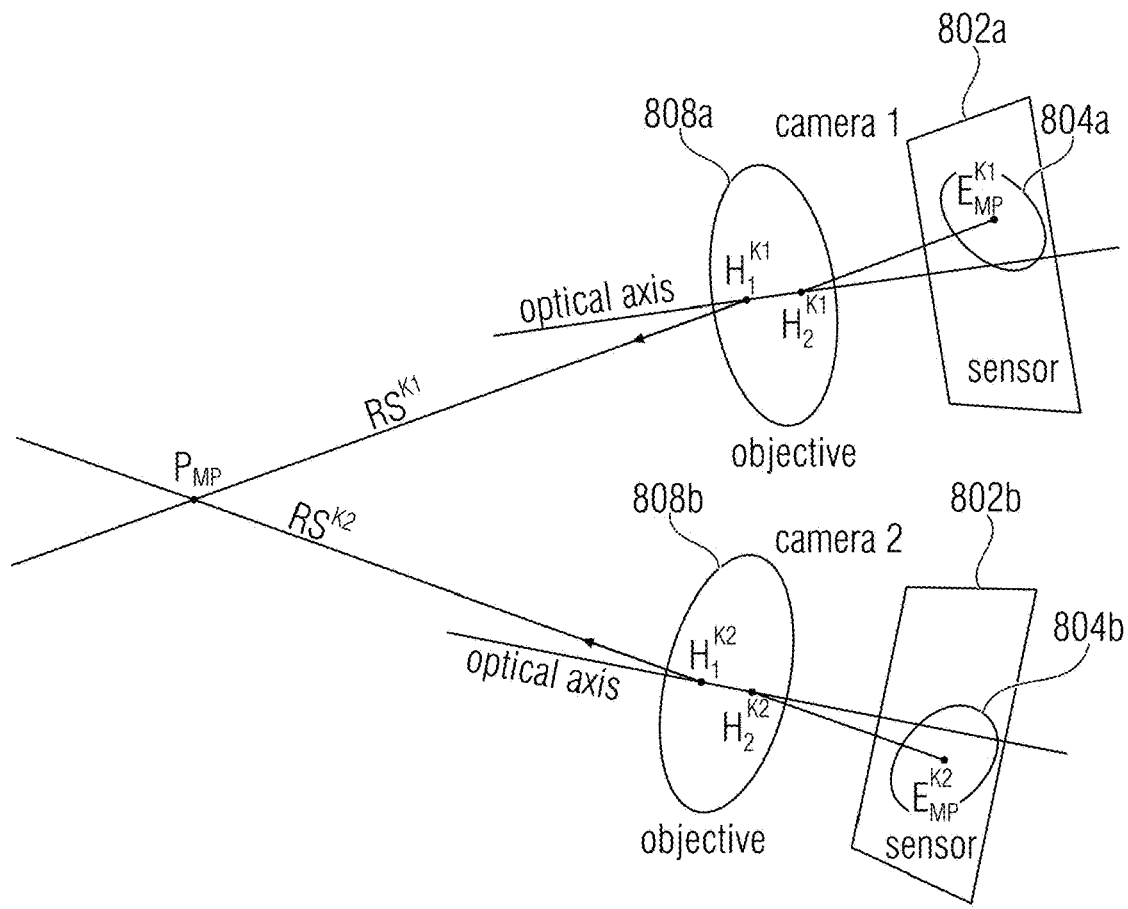
FIG. 8a-e are schematic illustrations of optical systems.

As already described, with depicting the circular pupil 806a by the camera lenses 808a and 808b on the image sensors 802a and 802b an elliptic pupil projection respectively arises (cf. FIG. 8a). The center of the pupil is on both sensors 802a and 802b and, thus, also in the respective camera images depicted as midpoint $E_{MP}^{K1}$ and $E_{MP}^{K2}$ of the ellipsis. Therefore, due to stereoscopic rear projection of these two ellipsis midpoints $E_{MP}^{K1}$ and $E_{MP}^{K2}$, the 3D pupil midpoint can be determined by means of the objective lens model. An optional requirement thereto is an ideally time synchronous picture so that the depicted scenes taken from both cameras are identical and, thus, the pupil midpoint was collected at the same position.

Initially, for each camera, the rear projection beam RS of the ellipsis midpoint has to be calculated, which runs along an intersection beam between the object and the intersection on the object's side (H1) of the optical system (FIG. 8a).

$$RS(t) = RS_0 + t \cdot RS_{\vec{n}} \tag{A1}$$

This rear projection beam is defined by equation (A1). It consists of a starting point $RS_0$ and a standardized direction vector $RS_{\vec{n}}$, which result in the used objective lens model (FIG. 8b) from the equations (A2) and (A3) from the two main points $H_1$ and $H_2$ of the objective as well as from the ellipsis center $E_{MP}$ in the sensor plane. For this, all three points ($H_1$, $H_2$ and $E_{MP}$) have to be available in the eye-tracker coordination system.

$$RS_0 = H_1 \tag{A2}$$

$$RS_{\vec{n}} \frac{H_2 - E_{MP}}{|H_2 - E_{MP}|} \tag{A3}$$

The main points can be calculated by the equations $$H_2 = K_O + b \cdot K_{\vec{n}}$$

and $$H_1 = K_O + (b+d) \cdot K_{\vec{n}}$$

Directly form the objective lens and camera parameters (FIG. 8b), wherein $K_O$ is the midpoint of the camera sensor plane and $K_{\vec{n}}$ is the normal vector of the camera sensor plane. The 3D ellipsis center in the camera coordination system can be calculated from the previously determined ellipsis center parameters $x_m$ and $y_m$, which are provided by means of the equation $$P_{Camera} = \begin{bmatrix} P_{Camera}^x \\ P_{Camera}^y \\ P_{Camera}^z \end{bmatrix} = \left( \begin{bmatrix} P_{image}^x \\ P_{image}^y \\ 0 \end{bmatrix} + \begin{bmatrix} S_{offset}^x \\ S_{offset}^y \\ 0 \end{bmatrix} - \frac{1}{2} \cdot \begin{bmatrix} S_{res}^x \\ S_{res}^y \\ 0 \end{bmatrix} \right) \cdot S_{PxGr}$$

Thereby, $P_{image}$ is the resolution of the camera image in pixels, $S_{offset}$ is the position on the sensor, at which it is started to read out the image, $S_{res}$ is the resolution of the sensor and $S_{PxGr}$ is the pixel size of the sensor.

The searched pupil midpoint is in the ideal case the point of intersection of the two rea projection beams $RS^{K1}$ and $RS^{K2}$. With practically determined model parameters and ellipsis midpoints, however, already by minimum measurement errors, no intersection point of the straight lines result anymore in the 3D room. Two straight lines in this constellation, which neither intersect, nor run parallel, are designated in the geometry as skew lines. In case of the rear projection, it can be assumed that the two skew lines respectively pass the pupil midpoint very closely. Thereby, the pupil midpoint lies at the position of their smallest distance to each other on half of the line between the two straight lines.

The shortest distance between two skew lines is indicated by a connecting line, which is perpendicular to the two straight lines. The direction vector $\vec{n}_{St}$ of the perpendicularly standing line on both rear projection beams can be calculated according to equation (A4) as intersection product of its direction vectors.

$$\vec{n}_{St} = RS_{\vec{n}}^{K1} \times RS_{\vec{n}}^{K2} \tag{A4}$$

The position of the shortest connecting line between the rear projection beams is defined by equation (A5). By use of $RS^{K1}(s)$, $RS^{K2}(t)$ and $\vec{n}_{St}$ it results therefrom an equation system, from which s, t and u can be calculated.

$$RS^{K1}(s) + u\vec{n}_{St} RS^{K2}(t) \quad (A5)$$

The searched pupil midpoint $P_{MP}$, which lies half the line between the rear projection beams, results consequently from equation (A6) after using the values calculated for s and u.

$$P_{MP} = RS^{K1}(s) + \frac{u}{2} \cdot \vec{n}_{St} \quad (A6)$$

As indicator for the precision of the calculated pupil midpoint, additionally a minimum distance $d_{RS}$ between the rear projection beams can be calculated. The more precise the model parameters and the ellipsis parameters were, the smaller is $d_{RS}$.

$$d_{RS} = u \cdot |\vec{n}_{St}| \quad (A7)$$

The calculated pupil midpoint is one of the two parameters, which determine the line of sight of the eye to be determined by the eye-tracker. Moreover, it is needed for the calculation of the gaze direction vector $\vec{P_n}$, which is described in the following.

The advantage of this method for calculating the pupil midpoint is that the distances of the cameras to the eye do not have to be firmly stored in the system. This is e.g. necessitated by the method described in the patent specification of DE 10 2004 046 617 A1.

Calculation of the Gaze Direction Vector

The gaze direction vector $\vec{P_n}$ to be determined corresponds to the normal vector of the circular pupil surface and, thus, is due to the alignment of the pupil specified in the 3D room. From the ellipsis parameter, which can be determined for each of the two ellipsis-shaped projections of the pupil on the camera sensors, the position and alignment of the pupil can be determined. Thereby, the lengths of the two half-axes as well as the rotation angles of the projected ellipses are characteristic for the alignment of the pupil and/or the gaze direction relative to the camera position.

One approach for calculating the gaze direction from the ellipsis parameters and firmly in the eye-tracking system stored distances between the cameras and the eye is e.g. described in the patent specification of DE 10 2004 046 617 A1. As shown in FIG. 8e, this approach assumes a parallel projection, whereby the straight line defined by the sensor normal and the midpoint of the pupil projected to the sensor passes through the pupil midpoint. For this, the distances of the cameras to the eye need to be previously known and firmly stored in the eye-tracking system.

With the model of the camera objective presented in this approach, which describes the display behavior of a real object, however, a perspective projection of the object to the image sensor occurs. Due to this, the calculation of the pupil midpoint can be performed and the distances of the camera to the eye have not to be previously known, which constitutes one of the essential improvements compared to the above mentioned patent specification. Due to the perspective projection, however, the form of the pupil ellipsis displayed on the sensor results contrary to the parallel projection not only due to the inclination of the pupil vis-à-vis the sensor surface. The deflection δ of the pupil midpoint from the optical axis of the camera objective lens likewise has, as depicted in FIG. 8b, an influence to the form of the pupil projection and, thus, to the ellipsis parameters determined therefrom.

Figure 8B:
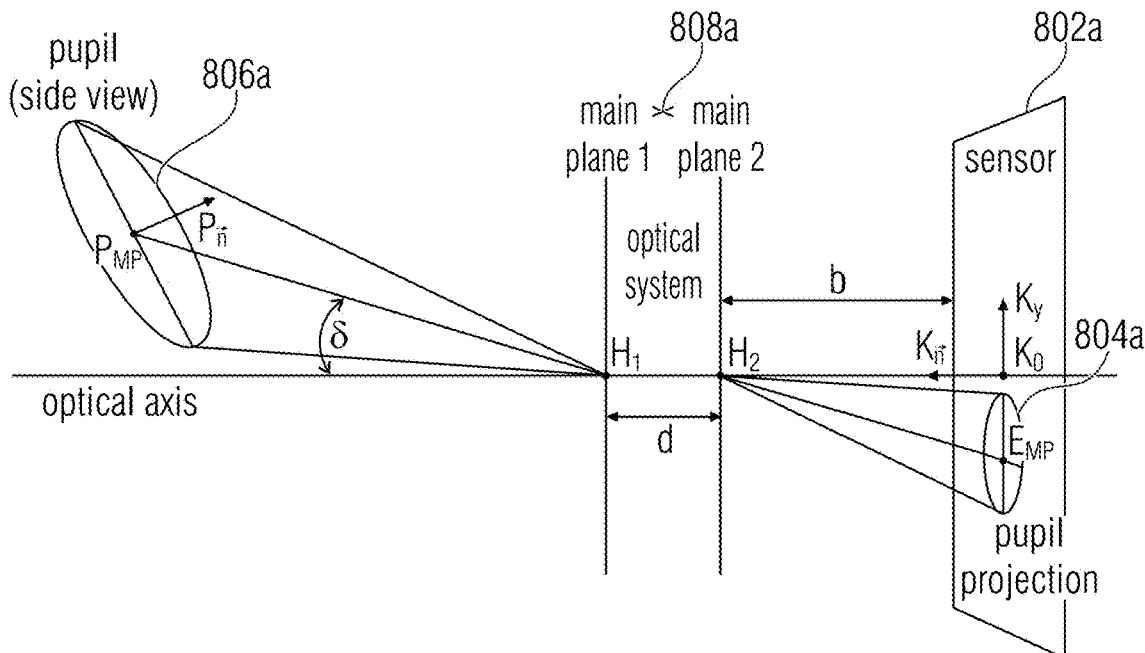

Contrary to the sketch in FIG. 8b, the distance between pupil and camera with several hundred millimeters is very large vis-à-vis the pupil radius, which is between 2 mm and 8 mm. Therefore, the deviation of the pupil projection from an ideal ellipsis form, which occurs with the inclination of the pupil vis-à-vis the optical axis, is very small and can be omitted.

Figure 8C:
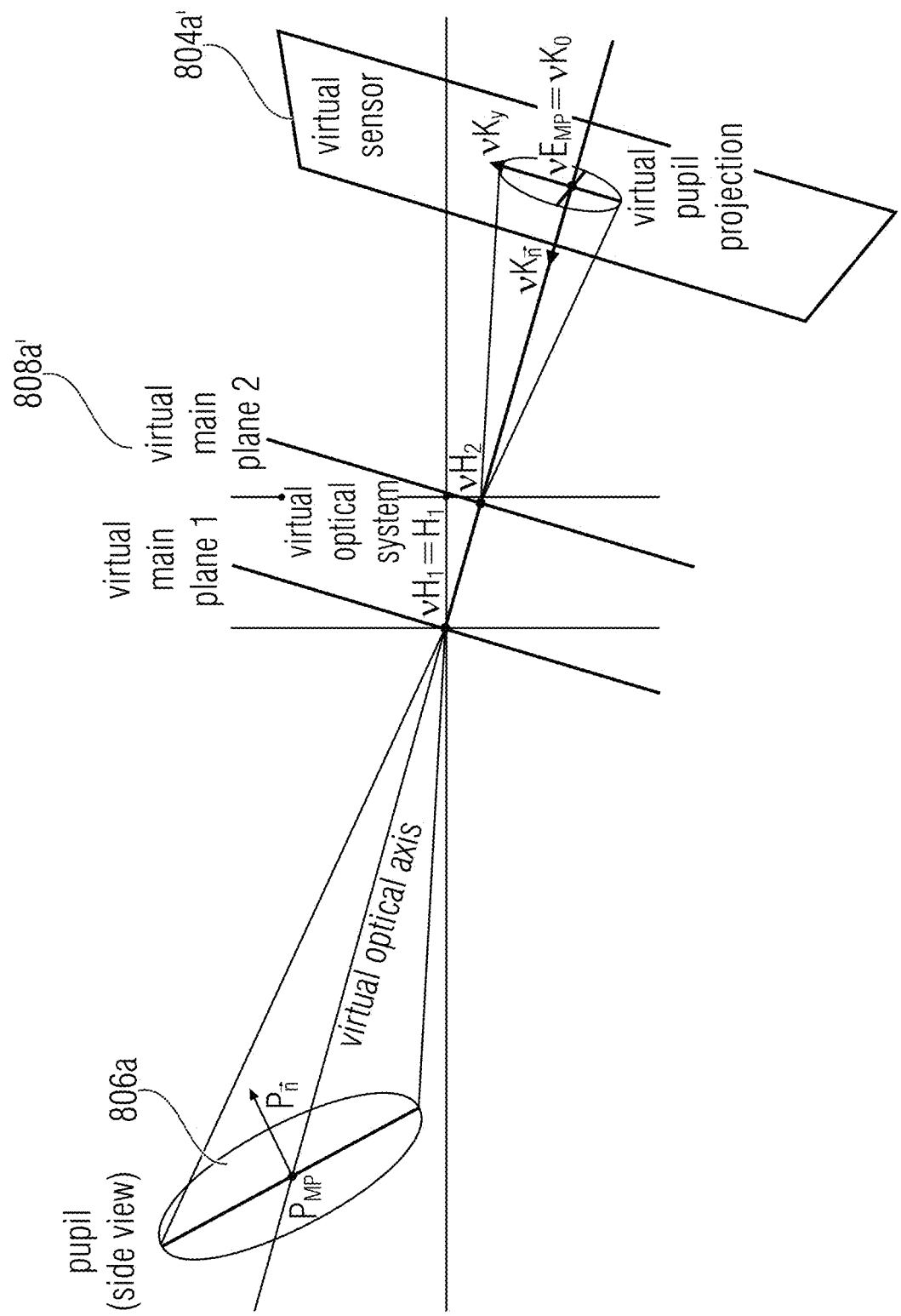
Figure 8D:
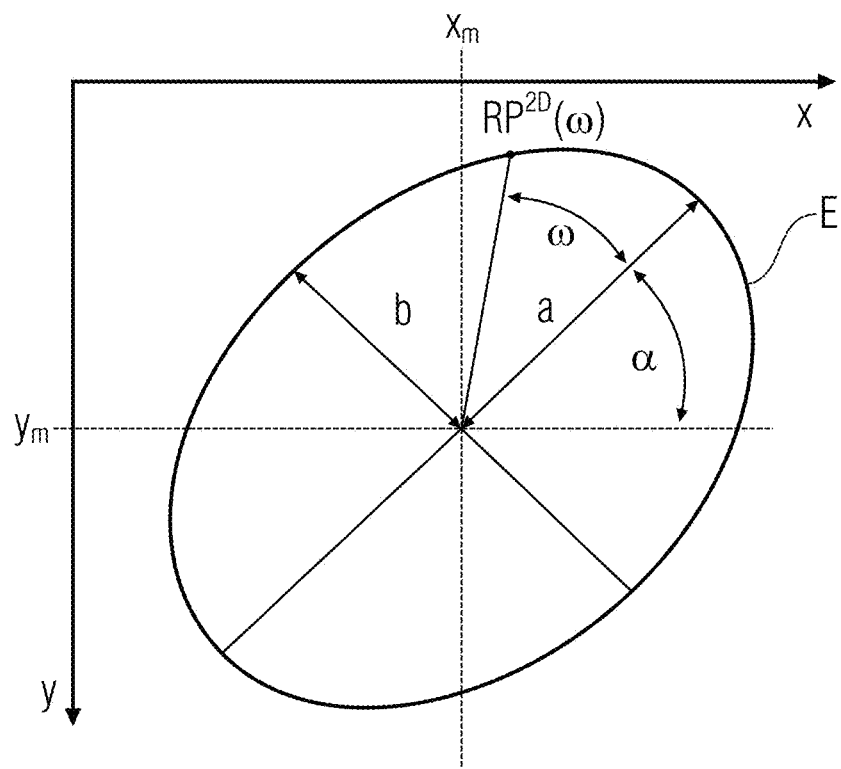
Figure 8E:
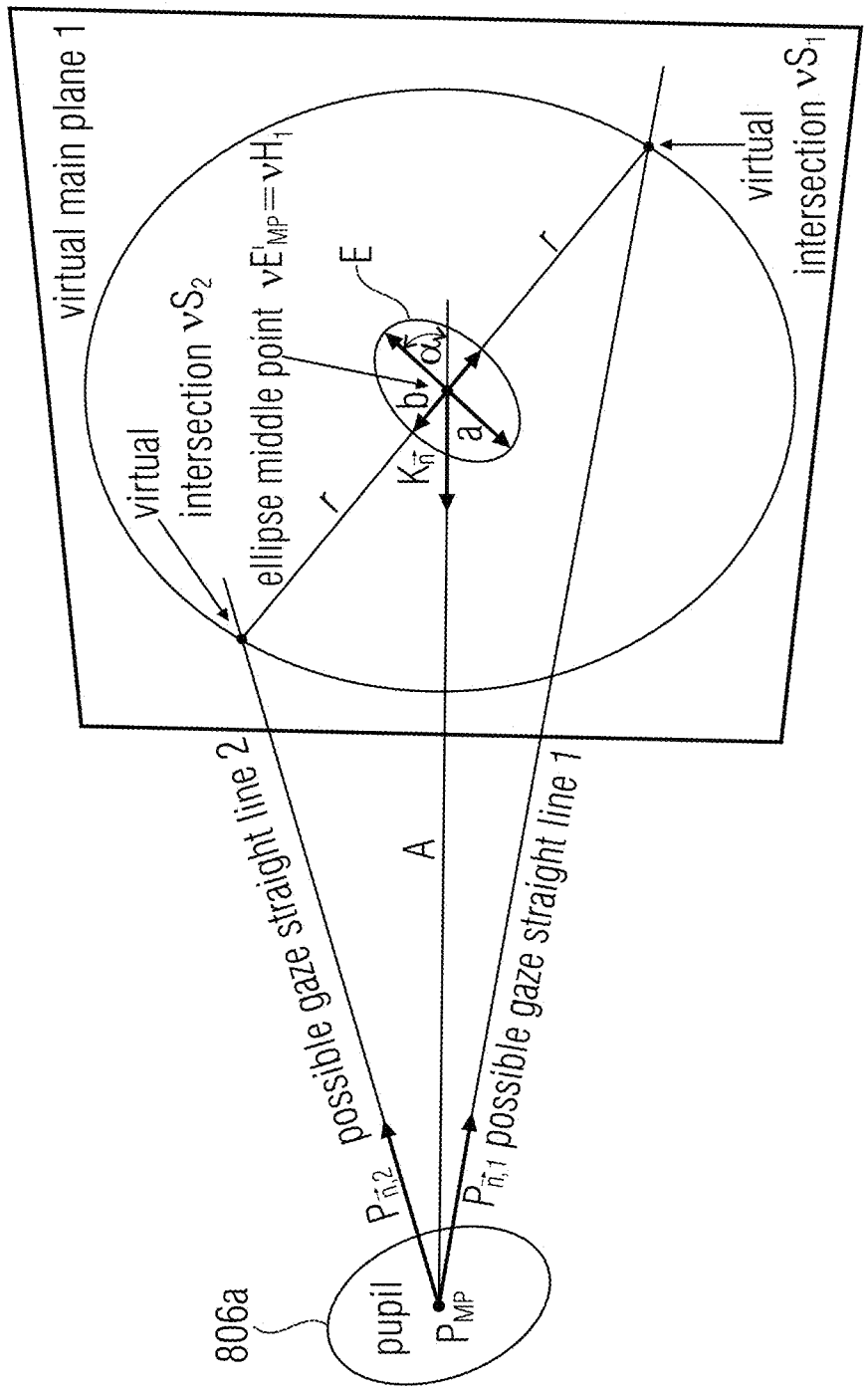

In order to be able to calculate the gaze direction vector $\vec{P_n}$, the influence of the angle δ to the ellipsis parameter has to be eliminated so that the form of the pupil projection alone is influenced by the alignment of the pupil. This is given, if the pupil midpoint $P_{MP}$ directly lies in the optical axis of the camera system. Therefore, the influence of the angle δ can be removed by calculating the pupil projection on the sensor of a virtual camera system vK, the optical axis of which passes directly the previously calculated pupil midpoint $P_{MP}$, as shown in FIG. 8c.

The position and alignment of such a virtual camera system 804a' (vK in FIG. 8c) can be calculated from the parameter of the original camera system 804a (K in FIG. 8b) by rotation about its object-side main point $H_1$. Thus, this corresponds simultaneously to the object-side main point $vH_1$ of the virtual camera system 804a'. Therefore, the direction vectors of the intersection beams of the depicted objects are in front and behind the virtual optical system 808c' identically to those in the original camera system. All further calculations to determining the gaze direction vector take place in the eye-tracker coordination system.

The standardized normal vector $\vec{vK_n}$ of the virtual camera vK is obtained as follows:

$$\vec{vK_n} = \frac{P_{MP} - H_1}{|P_{MP} - H_1|} \quad (A8)$$

For the further procedure, it is necessitated to calculate the rotation angles about the x-axis ($vK_\theta$) about the y-axis ($vK_\varphi$) and about the z-axis ($vK_\psi$) of the eye-tracker coordination system, about which the unit vector of the z-direction of the eye-tracker coordination system about several axes of the eye-tracker coordination system has to be rotated, in order to obtain the vector $\vec{vK_n}$. Due to rotation of the unit vector of the x-direction, as well as of the unit vector of the y-direction of the eye-tracker coordination system about the angles $vK_\theta$, $vK_\varphi$ and $vK_\psi$, the vectors $\vec{vK_x}$, and $\vec{vK_y}$ can be calculated, which indicate the x- and y-axis of the virtual sensor in the eye-tracker coordination system.

In order to obtain the position of the virtual camera system 804a' (FIG. 8c), its location vector and/or coordinate origin $vK_0$, which is simultaneously the midpoint of the image sensor, has to be calculated by means of equation (A9) in a way that it lies in the intersection beam of the pupil midpoint $P_{MP}$.

$$vK_0 = vH_1 - (d+b) \cdot \vec{vK_n} \quad (A9)$$

The distance d necessitated for this purpose between the main points as well as the distance b between the main plane 2 and the sensor plane have to be known or e.g. determined by an experimental setup.

Further, the position of the image-side main point results from equation (A10).

$$vH_2 = vH_1 - d \cdot \vec{vK_n} \quad (A10)$$

For calculating the pupil projection on the virtual sensor 804a', initially the edge points RP$^{3D}$ of the previously determined ellipsis on the Sensor in the original position are necessitated. These result from the edge points RP$^{2D}$ of the ellipsis E in the camera image, whereby corresponding to FIG. 8d, E$_a$ is the short half-axis of the ellipsis, E$_b$ is the long half-axis of the ellipsis E$_{x_m}$, and E$_{y_m}$ is the midpoint coordinate of the ellipsis, and E$_\alpha$ is the rotation angle of the ellipsis. The position of one point RP$^{3D}$ in the eye-tracker coordination system can be calculated by the equations (A11) to (A14) from the parameters of the E, the sensors S and the camera K, wherein ω indicates the position of an edge point RP$^{2D}$ according to FIG. 8d on the ellipsis circumference.

$$\begin{bmatrix} x' \\ y' \end{bmatrix} = \begin{bmatrix} E_a \cdot \cos(\omega) \\ E_b \cdot \sin(\omega) \end{bmatrix} \quad (A11)$$

$$RP^{2D} = \begin{bmatrix} x' \cdot \cos(E_\alpha) + y' \cdot \sin(E_\alpha) + E_{x_m} \\ -x' \cdot \sin(E_\alpha) + y' \cdot \cos(E_\alpha) + E_{y_m} \end{bmatrix} \quad (A12)$$

$$\begin{bmatrix} s_1 \\ t_1 \end{bmatrix} = \left( RP^{2D} \cdot \frac{1}{2} \cdot S_{res} - S_{offset} \right) \cdot S_{PxGr} \quad (A13)$$

$$RP^{3D} = K_0 + s_1 \cdot K_{\vec{x}} + t_1 \cdot K_{\vec{y}} \quad (A14)$$

The direction of one intersection beam KS in the original camera system, which displays a pupil edge point as ellipsis edge point RP$^{3D}$ on the sensor, is equal to the direction of the intersection beam vKS in the virtual camera system, which displays the same pupil edge point as ellipsis edge point RP$^{3D}$ on the virtual sensor. The intersection beams of the ellipsis edge points in FIG. 8b and FIG. 8c demonstrate this aspect. Thus, the two beams KS and vKS have the same direction vector, which results from equation (A15). For the location vector vKS$_0$ of the virtual sensor-side intersection beam vKS, vKS$_0$=vH$_2$ is applicable.

$$vKS_{\vec{n}} = KS_{\vec{n}} = \frac{RP^{3D} - H_2}{|RP^{3D} - H_2|} \quad (A15)$$

The virtual intersection beam and the virtual sensor plane, which corresponds to the x-y-plane of the virtual camera vK, are equated in equation (A16), whereby by resolving s$_2$ and t$_2$, the parameter of their intersection are obtained. By these, the ellipsis edge point in pixel coordinates in the image of the virtual camera can be calculated by equation (A17).

$$vKS_0 + r_2 \cdot vKS_{\vec{n}} = K_0 + s_2 \cdot K_{\vec{x}} + t_2 \cdot K_{\vec{y}} \quad (A16)$$

$$vRP^{2D} = \begin{bmatrix} s_2 \\ t_2 \end{bmatrix} \cdot \frac{1}{S_{PxGr}} + \left( \frac{1}{2} S_{res} - S_{offset} \right) \quad (A17)$$

Subsequently, from several virtual edge points vRP$^{2D}$ the parameter of the virtual ellipsis vE can be calculated by means of ellipsis fitting, e.g. with the "direct least square fitting of ellipses", algorithm according to Fitzgibbon et al. For this, at least six virtual edge points vRP$^{2D}$ are necessitated, which can be calculated by using several ω in equation (A11) with the above described path.

The form of the virtual ellipsis vE determined this way, only depends on the alignment of the pupil. Furthermore, its midpoint is in the center of the virtual sensor and together with the sensor normal, which corresponds to the camera normal vK$_{\vec{n}}$t, it forms a straight line running along the optical axis through the pupil midpoint P$_{MP}$. Thus, the requirements are fulfilled to subsequently calculate the gaze direction based on the approach presented in the patent specification of DE 10 2004 046 617 A1. Thereby, with this approach, it is now also possible by using the above described virtual camera system to determine the gaze direction, if the pupil midpoint lies beyond the axis of the optical axis of the real camera system, which is mostly the case in real applications.

As shown in FIG. 8e, the previously calculated virtual ellipsis vE is now accepted in the virtual main plane 1. As the midpoint of vE lies in the center of the virtual sensor and, thus, in the optical axis, the 3D ellipsis midpoint vE'$_{MP}$ corresponds to the virtual main point 1. Simultaneously, it is the dropped perpendicular foot of the pupil midpoint P$_{MP}$ in the virtual main plane 1. In the following, only the axial ratio and the rotation angle of the ellipsis vE is used. These form parameters of vE thereby can be used unchanged in respect of the main plane 1, as the alignments of the x- and y-axis of the 2D sensor plane, to which they refer to, correspond to the 3D sensor plane and, thus, also to the alignment of the main plane 1.

Every picture of the pupil 806a in a camera image can arise by two different alignments of the pupil. During evaluating the pupil form, therefore, as shown in FIG. 8e, two virtual intersections vS of the two possible straights of view with the virtual main plane 1 arise from the results of every camera. Corresponding to the geometric ratio in FIG. 8e, the two possible gaze directions P$_{\vec{n},1}$ and P$_{\vec{n},2}$ can be determined as follows.

The distance A between the known pupil midpoint and the ellipsis midpoint vE'$_{MP}$ is:

$$A = |vH_1 - P_{MP}| \quad (A18)$$

Therefrom, r can be determined with equation A19.

$$r = \frac{\sqrt{a^2 - b^2}}{b} \cdot A \quad (A19)$$

Both direction vectors r$_{\vec{n},1}$ as well as r$_{\vec{n},2}$, which are aligned from vH$_1$ to vS$_1$ as well as to vS$_2$, are analogously calculated to the equations $$M_\varphi = \begin{bmatrix} 1 & 0 & 0 \\ 0 & \cos(\varphi) & -\sin(\varphi) \\ 0 & \sin(\varphi) & \cos(\varphi) \end{bmatrix}$$

$$M_\theta = \begin{bmatrix} \cos(\theta) & 0 & \sin(\theta) \\ 0 & 1 & 0 \\ -\sin(\theta) & 0 & \cos(\theta) \end{bmatrix}$$

$$M_\psi = \begin{bmatrix} \cos(\psi) & -\sin(\psi) & 0 \\ \sin(\psi) & \cos(\varphi) & 0 \\ 0 & 0 & 1 \end{bmatrix}$$

$$\vec{v}' = M_\theta \cdot M_\varphi \cdot M_\psi \cdot \vec{v}$$

from vK$_\theta$, vK$_\varphi$, vK$_\psi$, and vE$_\alpha$:

$$r_{\vec{n},1} = M_{\theta=vK_\theta} \cdot M_{\varphi=vK_\varphi} \cdot M_{\psi=vK_\psi-90°-vE_\alpha} \cdot [1,0,0]^T \quad (A20)$$

$$r_{\vec{n},2} = M_{\theta=vK_\theta} \cdot M_{\varphi=vK_\varphi} \cdot M_{\psi=vK_\psi+90°-vE_\alpha} \cdot [1,0,0]^T \quad (A21)$$

Subsequently, both virtual intersections vS1 as well as vS2 can be determined and therefrom, the possible gaze directions $P_{\vec{n},1}$ as well as $P_{\vec{n},2}$.

$$vS_1 = vH_1 + r \cdot r_{\vec{n},1} \qquad (A22)$$

$$vS_2 = vH_1 + r \cdot r_{\vec{n},2} \qquad (A23)$$

$$P_{\vec{n},1} = \frac{vS_1 - P_{MP}}{|vS_1 - P_{MP}|} \qquad (A24)$$

$$P_{\vec{n},2} = \frac{vS_2 - P_{MP}}{|vS_2 - P_{MP}|} \qquad (A25)$$

In order to determine the actual gaze direction, the possible gaze directions of the camera 1 ($P_{\vec{n},1}^{K1}$ as well as $P_{\vec{n},2}^{K1}$) and the camera 2 ($P_{\vec{n},1}^{K2}$ as well as $P_{\vec{n},2}^{K2}$) are necessitated. From these four vectors, respectively one of each camera indicates the actual gaze direction, whereby these two standardized vectors are ideally identical. In order to identify them, for all four possible combinations, the differences of the respectively selected possible gaze direction vectors are formed from a vector of one camera and from a vector of the other camera. The combination, which has the smallest difference, contains the searched vectors. Averaged, these result in the gaze direction vector $P_{\vec{n}}$ which is to be determined. When averaging, a nearly simultaneously captured image has to be assumed so that both cameras collected the same pupil position as well as the same alignment and, thus, the same gaze direction.

As a degree for the accuracy of the calculated gaze direction vector, additionally, the angle $w_{diff}$ between the two averaged vectors $P_{\vec{n}}^{K1}$ and $P_{\vec{n}}^{K2}$, which indicate the actual gaze direction, can be calculated. The smaller $w_{diff}$ is, the more precise the model parameters and ellipsis midpoints were, which had been used for the calculations so far.

$$w_{diff} = \arccos\left(\frac{P_{\vec{n}}^{K1} \circ P_{\vec{n}}^{K2}}{\left|P_{\vec{n}}^{K1}\right| \cdot \left|P_{\vec{n}}^{K2}\right|}\right) \qquad (A26)$$

The points of view $\theta_{BW}$ and $\varphi_{BW}$ vis-à-vis the normal position of the pupil ($P_{\vec{n}}$ is parallel to the z-axis of the eye-tracker coordination system) can be calculated with the equations $$\varphi_{BW} = \arcsin(-P_{\vec{n}}^y)$$

and $$\theta_{BW} = \begin{cases} 0° & \text{if } (z=0) \wedge (x=0) \\ 90° & \text{if } (z=0) \wedge (x<0) \\ -90° & \text{if } (z=0) \wedge (x>0) \\ \tan\left(\frac{P_{\vec{n}}^x}{P_{\vec{n}}^z}\right) - 180° & \text{if } (z<0) \wedge (x<0) \\ \tan\left(\frac{P_{\vec{n}}^x}{P_{\vec{n}}^z}\right) + 180° & \text{if } (z<0) \wedge (x\geq 0) \\ \tan\left(\frac{P_{\vec{n}}^x}{P_{\vec{n}}^z}\right) & \text{otherwise} \end{cases}$$

In case that a systematic deviation of the gaze direction from the optical axis of the eye and/or from the pupil normal should be considered, the corresponding angles can be added to the determined points of view $\theta_{BW}$ and $\varphi_{BW}$. The new gaze direction vector then has to be calculated by means of the equation $$P_{\vec{n}}' = M_{\theta=\theta_{BW}'} \cdot M_{\varphi=\varphi_{BW}'} \cdot M_{\psi=0} \cdot \vec{z}$$

from the new points of view $\theta_{BW}'$ and $\varphi_{BW}'$ and $\vec{z} = [0,0,1]^T$.

With the gaze direction vector $P_{\vec{n}}$ is (besides the pupil midpoint $P_{MP}$ from equation A6), also the second parameter of the line of sight (LoS) which is to be determined by the 3D image analyzer, is known. This is derivable from the following equation.

$$LoS(t) = P_{MP} + t \cdot P_{\vec{n}}.$$

The implementation of the above introduced method does not depend on the platform so that the above introduced method can be performed on different hardware platforms, as e.g. a PC.

Development of a method for the processing of the feature extraction method

The objective of the present subsequent embodiments is to develop on the basis of the parallel Hough transformation a robust method for the feature extraction. For this, the Hough core is revised and a method for the feature extraction is presented, which reduces the results of the transformation and breaks them down to a few "feature vectors" per image. Subsequently, the newly developed method is implemented in a MATLAB toolbox and is tested. Finally, an FPGA implementation of the new method is presented.

Parallel Hough Transformation for Straight Lines and Circles

The parallel Hough transformation uses Hough cores of different size, which have to be configured by means of configuration matrices for the respective application. The mathematic contexts and methods for establishing such configuration matrices, are presented in the following.

For establishing the configuration matrices, it is initially necessitated to calculate arrays of curves in discrete presentation and for different Hough cores. The requirements (establishing provisions) for the arrays of curves had already been demonstrated. Under consideration of these establishing provisions, in particular straight lines and half circles are suitable for the configuration of the Hough cores. For the gaze direction determination, Hough cores with configurations for half circles (or curves) are used. For reasons of completeness, also the configurations for straight lines (or straight line segments) are derived here. The mathematic contexts for determining the arrays of curves for straight lines are demonstrated.

Starting point for the calculation of the arrays of curves for straight lines is the linear straight equation in (B1).

$$y = m \cdot x + n \qquad (B1)$$

The arrays of curves can be generated by variation of the increase m. For this, the straight line increase of 0° to 45° is broke down into intervals of same size. The number of intervals depends on the Hough core size and corresponds to the number of Hough core lines. The increase may be tuned via the control variable $Y_{core}$ of 0 to $core_{height}$.

$$m = \frac{1}{core_{heigt}} \cdot y_{core} \qquad (B2)$$

The function values of the arrays of curves are calculated by variation of the control variable (in (B3) exchanged by $x_{core}$), the values of which are of 0 to core width.

$$y = \frac{1}{core_{heigt}} \cdot y_{core} \cdot x_{core} \tag{B3}$$

Figure 9A:
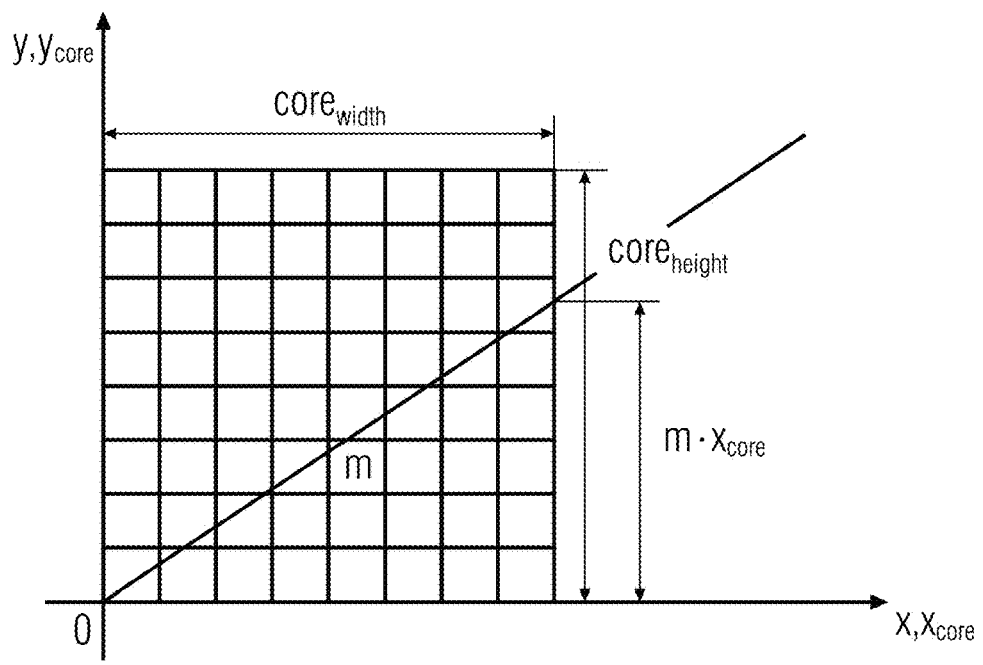
FIG. 9a-9i are further illustrations for explanation of background knowledge for the Hough transformation unit.
Figure 9B:
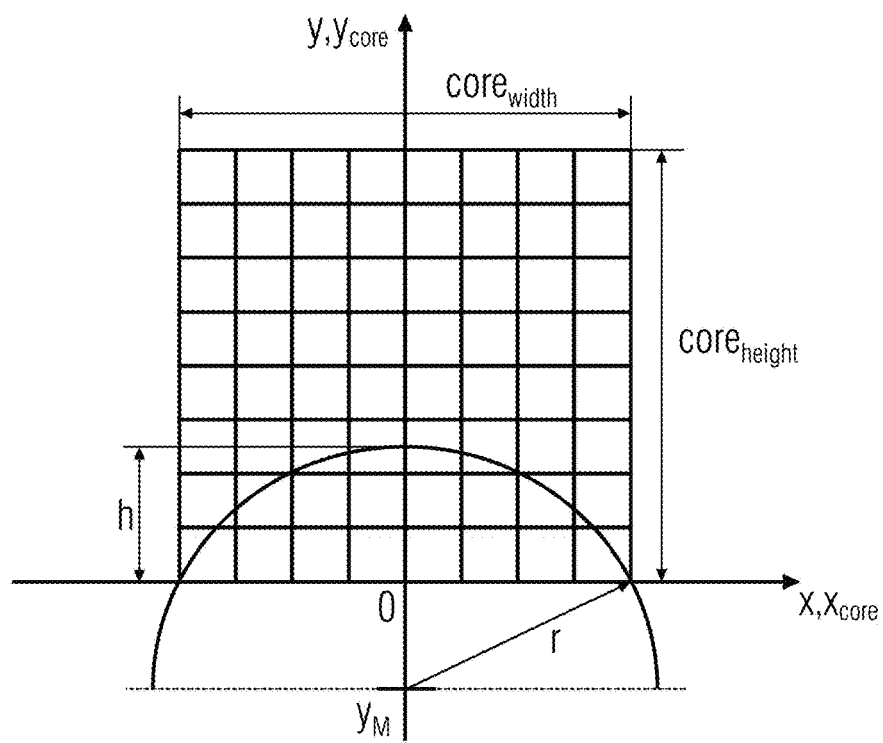

For a discrete demonstration in the 2D plot, the function values have to be rounded. The calculation of the arrays of curves for half circles is oriented on (Katzmann 2005, p. 37-38) and is shown in FIG. 9b.

Starting point for the calculation of the arrays of curves is the circle equation in the coordinate format.

$$r^2 = (x-x_M)^2 + (y-y_M)^2 \tag{B4}$$

With $x_M = 0$ (position of the circle center on the y-axis), $x = x_{core}$ and converting toy for the function values of the arrays of curves follows (B5).

$$y = \sqrt{r^2 - x_{core}^2 + y_M} \tag{B5}$$

As $y_M$ and r are not known, they have to be replaced. For this, the mathematic contexts in (B6) and (B7) from FIG. 9b may be derived.

$$y_M = h - r \tag{B6}$$

$$r^2 = y_M^2 + \left(\frac{core_{width}}{2}\right)^2 \tag{B7}$$

By converting of (B7) to $y_M$ and the condition that $y_M$ has to be negative (cf. FIG. 9b), (B8) is obtained.

$$y_M = \sqrt{r^2 - \left(\frac{core_{width}}{2}\right)^2 \cdot (-1)} \tag{B8}$$

Using (B8) in (B5) leads to (B9).

$$y = \sqrt{r^2 - x_{core}^2 + \sqrt{r^2 - \left(\frac{core_{width}}{2}\right)^2 \cdot (-1)}} \tag{B9}$$

From FIG. 9b, it becomes clear that the Hough core is hub-centered and lies in the y-axis of the circle coordinate system. The variable $x_{core}$ normally runs from 0 to $core_{width}-1$ and, thus, has to be corrected by $$-\frac{core_{width}}{2}.$$

$$y = \sqrt{r^2 - x_{core}^2 - \left(\frac{core_{width}}{2}\right)^2 + \cdot \sqrt{r^2 - \left(\frac{core_{width}}{2}\right)^2 \cdot (-1)}} \tag{B10}$$

Yet, the radius is missing, which is obtained by using of (B6) in (B7) and by further conversions.

$$r^2 = (h-r)^2 + \left(\frac{core_{width}}{2}\right)^2 \tag{B11}$$

$$r^2 = h^2 - 2hr + r^2 + \left(\frac{core_{width}}{2}\right)^2 \tag{B12}$$

$$r = \frac{h2 + \left(\frac{core_{width}}{2}\right)^2}{2 \cdot h} \tag{B13}$$

For producing the arrays of curves, finally, the variable h of 0 to $$\frac{core_{height}}{2}$$

has to be varied. This happens via the control variable $y_{core}$ which runs from 0 to $core_{height}$.

$$r = \frac{\left(\frac{y_{core}}{2}\right)^2 + \left(\frac{core_{width}}{2}\right)^2}{2 \cdot \frac{y_{core}}{2}} \tag{B14}$$

As already regarding the straight lines, the y-values for a discrete demonstration have to be rounded in the 2D plot. The arrays of curves for Hough core of type 2 can easily be determined by the equation (B15).

$$y_{Typ\_2} = core_{height} - y_{Typ\_1} \tag{B15}$$

Based on the arrays of curves, for all Hough sizes respectively two configurations (type 1 and type 2) for straight lines and circles can be determined. The configurations are thereby determined directly from the arrays of curves (cf. Katzmann 2005, p. 35-36). Configuration matrices may be occupied either by zeros or ones. A one thereby represents a used delay element in the Hough core. Initially, the configuration matrix is initialized in the dimensions of the Hough core with zero values. Thereafter, the following steps are passed:

1. Start with the first curve of the arrays of curves and test the y-value of the first x-index number. If the y-value is greater zero, then occupy in the same line (same y-index) at exactly the same position (same x-index) the element of the configuration matrix with one.
2. Modify the y-values with same x-index via all curves of the array of curves. If in the first step an element was occupied with one, then subtract one of all y-values. If in the first step the element was not occupied, then do nothing.
3. Pass through steps 1 and 2 as long as all elements of the configuration matrix were approached.

Figure 9C:
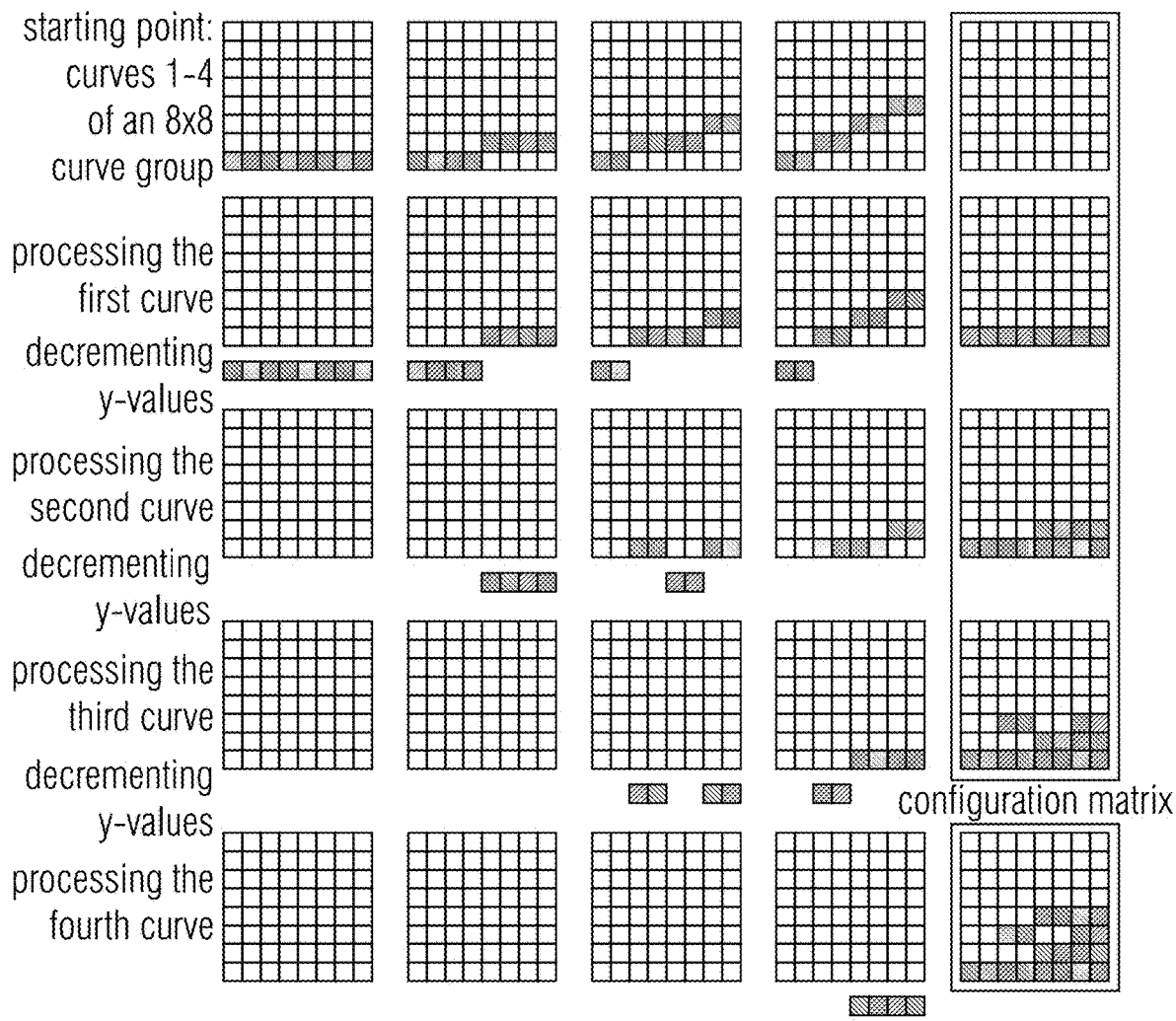

In FIG. 9c, the configuration procedure is gradually demonstrated.

Finally, I would like to respond to some peculiarities of the Hough core configuration. The configurations for straight lines represent only straight line segments depending on the width of the Hough cores. Longer straight line segments in the binary edge image have optionally be assembled from several detected straight line segments. The resolution of the angles (or increase) of the straight line segments depends on the height of the Hough core.

The configurations for circles represent circle arcs around the vertex of the half circle. Only the highest y-index number of the arrays of curves (smallest radius) represents a complete half circle. The developed configurations can be used for the new Hough core.

Revision of the Hough Cores

A decisive disadvantage of the FPGA implementation of Holland-Nell is the rigid configuration of the Hough cores. The delay lines have to be parameterized prior to the synthesis and are afterwards fixedly deposited in the hardware structures (Holland-Nell, p. 48-49). Changes during runtime (e.g. Hough core size) are not possible any more. The new method is to become more flexible at this point. The new Hough core shall be—also during runtime—in the FPGA completely newly configurable. This has several advantages. On the one hand, not two Hough cores (type 1 and type 2) have to be parallel filed and on the other hand, also different configuration for straight lines and half circles may be used. Furthermore, the Hough core size can be flexibly changed during runtime.

Figure 9D:
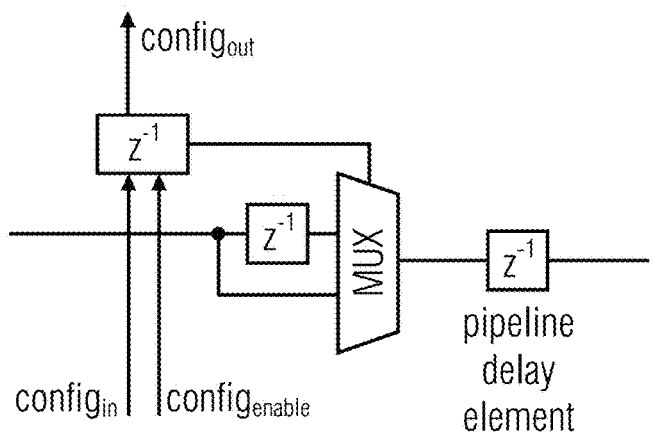

Previous Hough core structures consist of a delay and a bypass and prior to the FPGA synthesis, it is determined, which path is to be used. In the following, this structure is extended by a multiplexer, a further register for the configuration of the delay elements (switching the multiplexers) and by a pipeline delay. The configuration register may be modified during runtime. This way, different configuration matrices can be brought into the Hough core. By setting the pipeline delays, the synthesis tool in the FPGA has more liberties during the implementation of the Hough core design and higher clock rates can be achieved. Pipeline delays break through time-critical paths within the FPGA structures. In FIG. 9d, the new design of the delay elements are demonstrated.

In comparison to the previous implementation according to Katzmann and Holland-Nell, the delay elements of the new Hough cores are built up a bit more complex. For the flexible configuration of the delay element, an additional register is necessitated and the multiplexer occupies further logic resources (has to be implemented in the FPGA in an LUT). The pipeline delay is optional. Besides the revision of the delay elements, also modifications of the design of the Hough core had been carried out. The new Hough core is demonstrated in FIG. 9e.

In contrast to the previous Hough core, initially a new notation is to be implemented. Due to an about 90° rotated design in FIG. 9e, the "line amounts", originally referred to as signals of the initial histogram, are as of now referred to as "column amounts". Every column of the Hough cores, thus, represents a curve of the arrays of curves. The new Hough core furthermore can be impinged with new configuration matrices during runtime. The configuration matrices are filed in the FPGA-internal BRAM and are loaded by a configuration logic. This loads the configurations as column-by-column bit string in the chained configuration register (cf. FIG. 9d). The reconfiguration of the Hough cores necessitates a certain time period and depends on the length of the columns (or the amount of delay lines). Thereby, every column element necessitates a clock cycle and a latency of few tack cycles by the BRAM and the configuration logic is added. Although, the overall latency for the reconfiguration is disadvantageous, but for the video-based image processing, it can be accepted. Normally, the video data streams recorded with a CMOS sensor have a horizontal and a vertical blanking. The reconfiguration, thus, can occur without problems in the horizontal blanking time. The size of the Hough core structure implemented in the FPGA, also pre-determines the maximally possible size of the Hough core configuration. If small configurations are used, these are aligned vertically centered and in horizontal direction at column 1 of the Hough core structure (cf. FIG. 9f). Not used elements of the Hough core structure, are all occupied with delays. The correct alignment of smaller configurations is important for the correction of the x-coordinates (cf. formulas (B17) to (B19)).

The Hough core is as previously fed with a binary edge image passing through the configured delay lines. With each processing step, the column amounts are calculated via the entire Hough core and are respectively compared with the amount signal of the previous column. If a column provides a higher total value, the total value of the original column is overwritten. As initial signal, the new Hough core provides a column total value and the associated column number. On the basis of these values, later on, a statement on which structure was found (represented by the column number) and with which appearance probability this was detected (represented by the total value) can be made. The initial signal of the Hough cores can also be referred to as Hough room or accumulator room. In contrast to the usual Hough transformation, the Hough room is available to the parallel Hough transformation in the image coordinate system. This means that for every image coordinate, a total value with associated column number is outputted. For the complete transformation of the eye image, respectively one Hough core of type 1 and type 2 of the non-rotated and the rotated image has to be passed through. Therefore, after the transformation, not only column amount with associated column number, but also the Hough core type and the alignment of the initial image (non-rotated or rotated) are available. Furthermore, different Hough core sizes and configurations may be used respectively for the straight lines and half circles. Thereby, besides the mentioned results, also the curve type and the Hough core size can be indicated. In summary, a result data set of the new Hough core size is illustrated in the following table. Regarding the parallel Hough transformation, for every image point such a data set arises.

| | Description |
| --- | --- |
| x-coordinate | Is delayed according to the length of the Hough core structure. A precise correction of the x-coordinate can take place. |
| y-coordinate | Is corrected according to the height of the Hough core structure with $y_{new} = y_{old} + \frac{\text{Number of lines}}{2}$. With an even number of lines, it cannot be exactly determined a middle line. With an uneven number of lines, it has be rounded up, in order to obtain the center line. |
| column amount | Appearance probability for the searched structure (maximum value = size of the column, high values represent a high appearance probability) |
| column number | To the total value associated column number (represents the curve of the half circle or the increase of the straight line) |
| Hough core type | 0 if type 1 Hough core configuration and 1 if type 2 Hough core-configuration |
| Image rotation | 0 if initial image does not rotate and 1 if the initial image rotates |
| Hough core size | Size of the Hough core, which has been used for the transformation |
| Curve type | 0 if straight line configuration and 1 if half circle configuration n |

Overview of the result data set arising for every point of view of the initial image with the parallel Hough transformation with revised Hough core structure.

In contrast to the binary and threshold-based output of the Hough cores of Katzmann and Holland-Nell, the new Hough core structure produces significantly more initial data. As such a data quantity is only hard to be handled, a method for feature extraction is presented, which clearly reduces the result data quantity.

Type 2 Hough Core and Image Rotation

To the embodiments regarding the parallel Hough transformation, the necessity of the image rotation and the peculiarities of type 2 Hough cores, was already introduced. Regarding the parallel Hough transformation, the initial image has to pass the Hough core four times. This is necessitated so that the straight lines and half circles can be detected in different angle positions. If only a type 1 Hough core is used, the image would have to be processed in the initial position and rotated about 90°, 180°, and 270°. By including the type 2 Hough core, the rotation about 180° and 270° are omitted. If the non-rotated initial image is processed with a type 2 Hough core, this corresponds to a processing of the about 180° rotated initial image with a type 1 Hough core. It is similar with the rotation about 270°. This can be replaced by the processing of the about 90° rotated image with a type 2 Hough core. For an FPGA implementation, the omission of additional rotations has a positive effect, as image rotations normally are only solved by means of an external storage. According to the applied hardware, only a certain band width (maximally possible data rate) is available between FPGA and storage component. Regarding the use of a type 2 Hough core, the band width of the external storage component is only occupied with a rotation of about 90°. Regarding the previous implementation of Holland-Nell, it was necessitated to file a Hough core of type 1 and a Hough core of type 2 in the FPGA. With the revised Hough core design, it is now also possible to file the Hough core structure once in the FPGA and to upload configurations of type 1 or type 2. Due to this new functionality, the initial image can be completely transformed with only one Hough core and with only one image rotation.

It is still to be considered that during the processing with only one Hough core, also the quadruplicate data rate occurs in the Hough core. Regarding a video data stream of 60 fps and VGA resolution, the pixel data rate amounts to 24 Mhz. In this case, the Hough core would have to be operated with 96 Mhz, which already constitutes a high clock rate for an FPGA of the Spartan 3 generation. In order to optimize the design, it should be intensified operated with pipeline delays within the Hough core structure.

Feature Extraction

The feature extraction works on behalf of the data sets from the previous table. These data sets can be summarized in a feature vector (B16). The feature vector can in the following be referred to as Hough feature.

$$MV=[MV_X, MV_Y, MV_O, MV_{KS}, MV_H, MV_{G-1}, MV_A] \quad (B16)$$

A feature vector respectively consists of respectively an x- and y-coordinate for the detected feature ($MV_x$ and $MV_y$), the orientation $MV_O$, the curve intensity $MV_{KS}$, the frequency $MV_H$, the Hough core size $MV_{G-1}$ and the kind of the detected structure $MV_A$. The detailed meaning and the value range of the single elements of the feature vector can be derived from the following table.

Figure 9E:
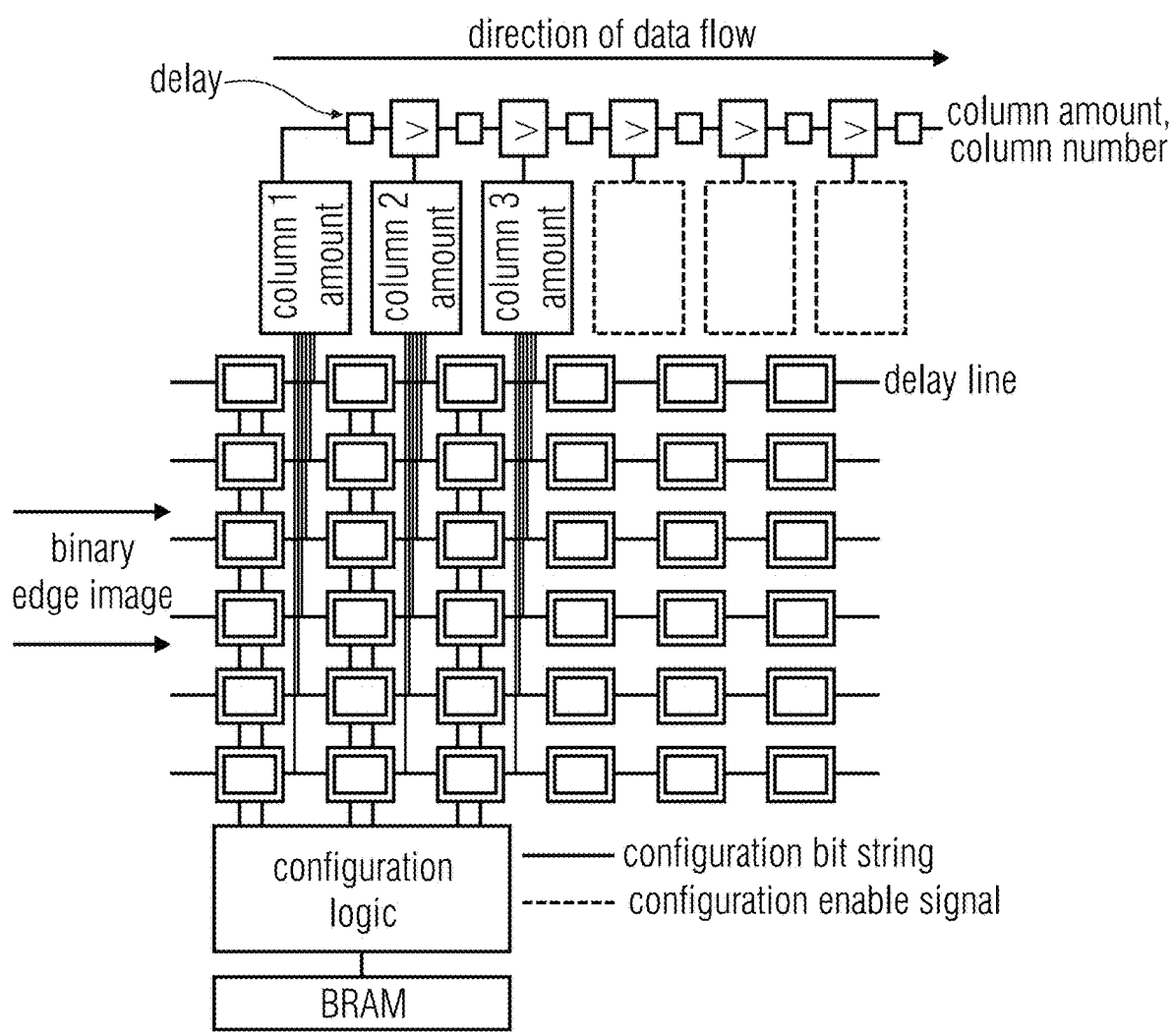
Figure 9F:
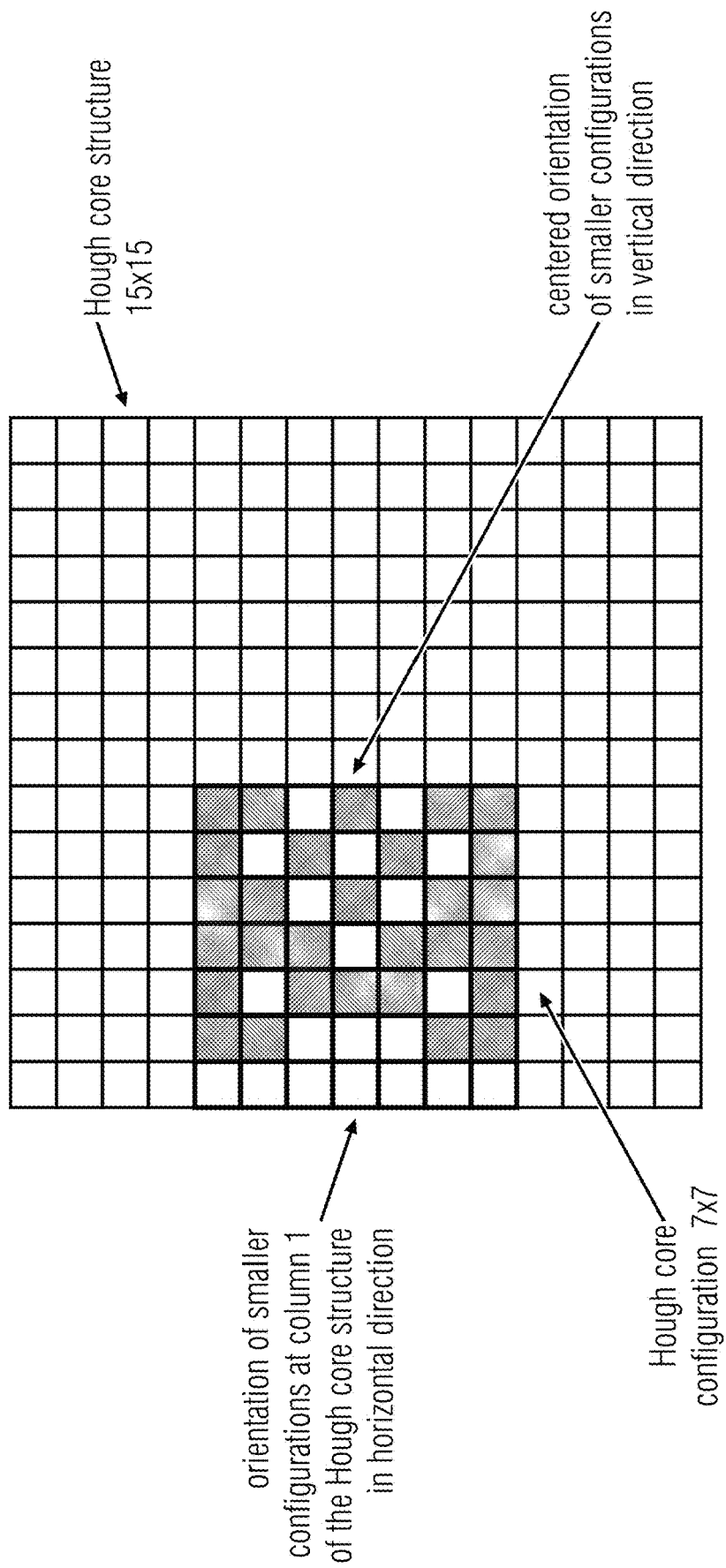

| | |
|---|---|
| MVx and MVy | Both coordinates respectively run to the size of the initial image |
| $MV_O$ | The orientation represents the alignment of the Hough core. This is composed by the image rotation and the used Hough core type and can be divided into four sections. The conversion of the four sections into their respective orientation is demonstrated in the following table. |
| $MV_{KS}$ | The curve intensity maximally runs to the size of the Hough core and corresponds to the Hough core column with the highest column amount (or frequency $MV_H$). By way of illustration, it is referred to FIG. 9e in combination with the above table. Regarding straight lines configuration of the Hough cores, the Hough core column represents the increase or the angle of the straight lines. If half circle configurations are used, the Hough core column represents the radius of the half circle. |
| $MV_H$ | The frequency is a measure for the correlation of the image content with the searched structure. It corresponds to the column amount (cg. FIG. 9e and above table) and can maximally reach the size of the Hough core (more precisely the size of a Hough core column with non-square Hough cores). |
| $MV_{G-1}$ | Size of the Hough core used for the transformation minus one. |
| $MV_A$ | Represents the kind of the detected structure according to the used Hough core configuration (configuration for the straight lines = 0 or configuration for circles = 1). |

Elements of the Hough feature vector, their meaning and value range.

| Straight lines | | | Circles | | |
|---|---|---|---|---|---|
| Orientation $MV_O$ | Range | Angle area | Orientation $MV_O$ | Range | Angle |
| 0 | Range 1r | 0°-45° | 0 | Range 2 | 0° |
| 1 | Range 2 | 45°-90° | 1 | Range 1r | 90° |
| 2 | Range 1 | 90°-135° | 2 | Range 1 | 180° |
| 3 | Range 2r | 135°-180° | 3 | Range 2r | 270° |

Calculation of the orientation depending on the image rotation and the Hough core type used for the transformation.

From the above tables, it becomes obvious that both elements $MV_O$ and $MV_{KS}$ regarding straight lines and half circles have different meanings. Regarding straight lines, the combination from orientation and curve intensity forms the position angle of the detected straight line segment in the angle of 0° to 180°. Thereby, the orientation addresses an angle area and the curve intensity represents the concrete angle within this range. The greater the Hough core (more precise, the more Hough core columns are available), the finer the angle resolution is. Regarding half circles, the orientation represents the position angle or the alignment of the half circle. Half circles may as a matter of principle only be detected in four alignments. Regarding half circle configurations, the curve intensity represents the radius.

Figure 9G:
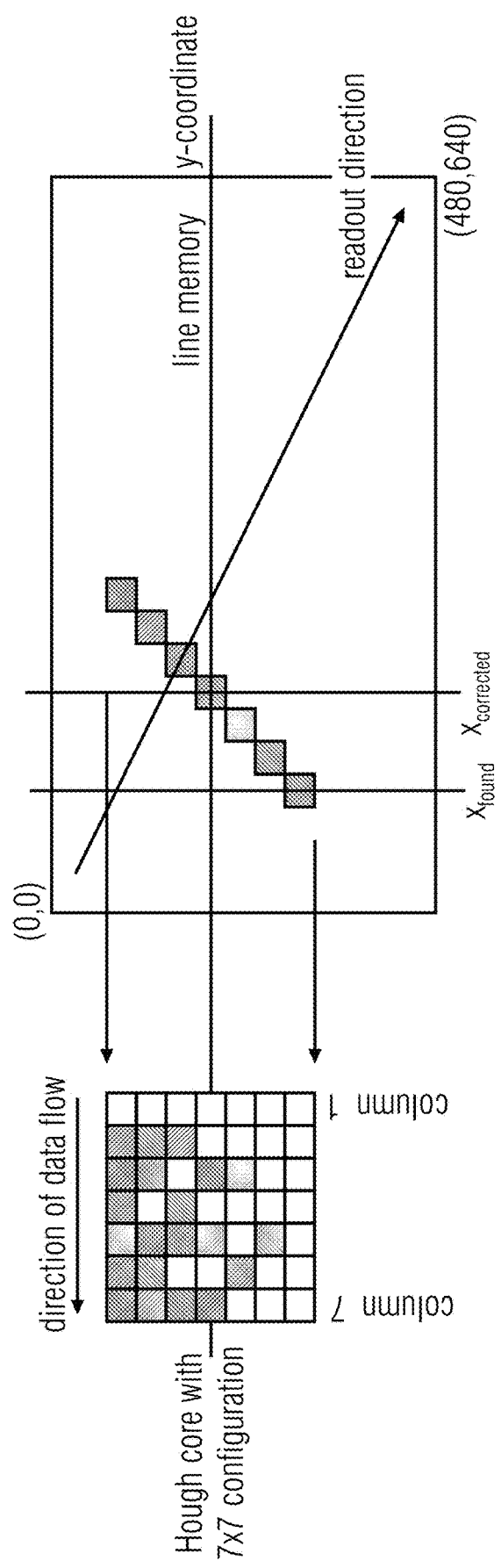

Besides the orientation $MV_O$ and the curve intensity $MV_{KS}$, a further special feature is to be considered regarding the coordinates (MVx and MVy) (cf. FIG. 9g). Regarding straight lines, the coordinates are to represent the midpoint and regarding half circles or curves, the vertex. With this presupposition, the y-coordinate may be corrected corresponding to the implemented Hough core structure and does not depend on the size of the configuration used for the transformation (cf. FIG. 9f). Similar to a local filter, the y-coordinate is indicated vertically centered. For the x-coordinate, a context via the Hough core column is established, which has provided the hit (in the feature vector, the Hough core column is stored with the designation $MV_{KS}$). Dependent on the Hough core type and the image rotation, also calculation provisions for three different cases can be indicated. For a Hough core of type 1, it is respectively referred to formula (B17) for the non-rotated and the rotated initial image. If a Hough core of type 2 is available, it has to be referred to formula (B18) or formula (B19) dependent on the image rotation.

$$M = MV_{x_{corrected}} + \text{floor}\left(\frac{(MV_{KS+1})}{2}\right) \quad (B17)$$

$$MV_{x_{corrected}} = \quad (B18)$$
$$imagewidth_{non\text{-}rotated} - \left(MV_{x_{detected}} + \text{floor}\left(\frac{(MV_{KS+1})}{2}\right)\right)$$

$$MV_{x_{corrected}} = imagewidth_{rotated} - \left(MV_{x_{detected}} + \text{floor}\left(\frac{(MV_{KS+1})}{2}\right)\right) \quad (B19)$$

With the instruction "floor", the fractional rational number is rounded off. In the FPGA, this corresponds to the simple cutting of binary decimals. After the orientation had been determined and the coordinates of the Hough features had been corrected, the actual feature extraction can take place.

Figure 9H:
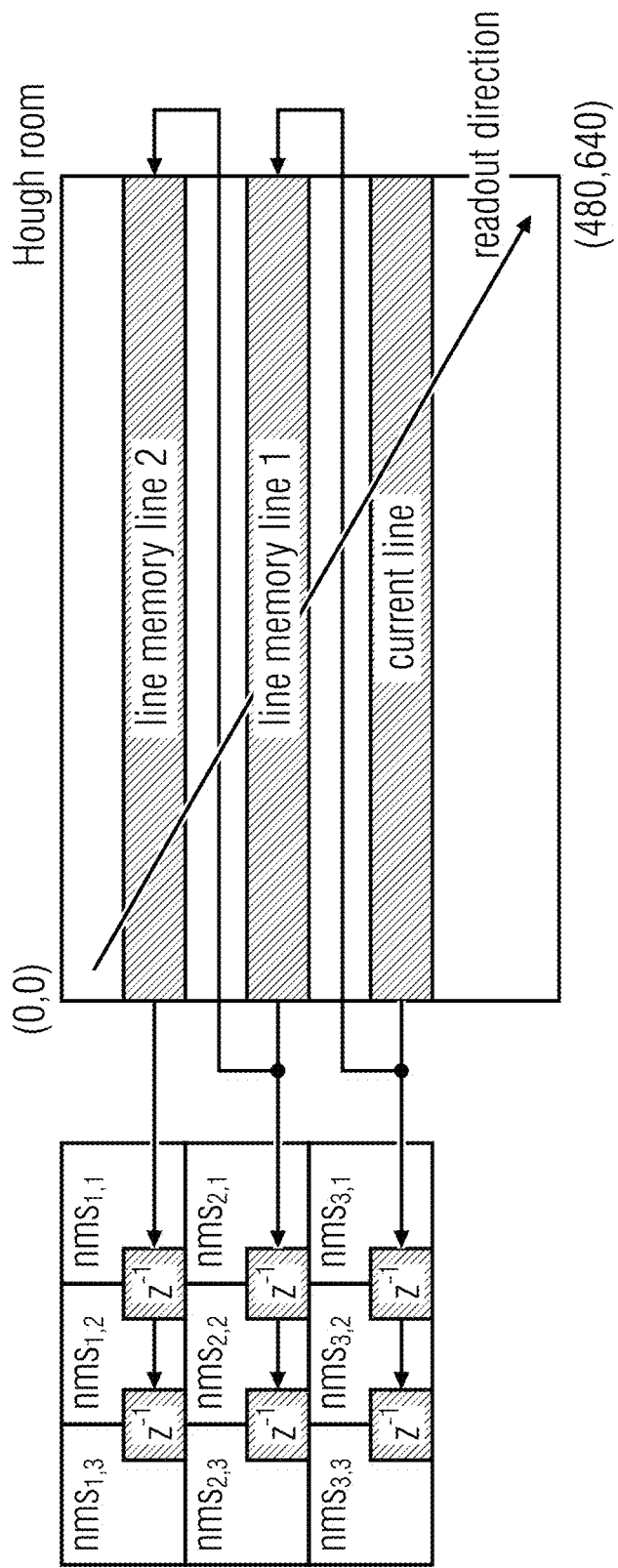

For the feature extraction, three threshold values in combination with a non-maximum suppression operator are used. The non-maximum suppression operator differs regarding straight lines and half circles. Via the threshold values, a minimum $MV_{KS_{min}}$ and maximum curve intensity $MV_{KS_{max}}$ is given and a minimum frequency $MV_{H_{min}}$ is determined. The non-maximum suppression operator can be seen as being a local operator of the size 3×3 (cf. FIG. 9h). A valid feature for half circles (or curves) arises exactly if the condition of the non-maximum suppression operator (nms-operator) in (B23) is fulfilled and the thresholds according to formulas (B20) to (B22) are exceeded.

$$MV_{nms_{2,2}}^{KS} \geq MV_{KS_{min}} \quad (B20)$$

$$MV_{nms_{2,2}}^{KS} \geq MV_{KS_{max}} \quad (B21)$$

$$MV_{nms_{2,2}}^{H} \geq MV_{H_{min}} \quad (B22)$$

$$MV_{nms_{1,1}} \overset{H}{\wedge} MV_{nms_{1,2}} \overset{H}{\wedge} MV_{nms_{1,3}} \overset{H}{\wedge} MV_{nms_{2,1}} \overset{H}{\wedge} MV_{nms_{2,}} \overset{H}{\wedge} MV_{nms_{3,1}} \overset{H}{\wedge} MV_{nms_{3,2}} \overset{H}{\wedge} MV_{nms_{3,3}} \overset{H}{\wedge} MV_{nms_{2,2}} \quad (B23)$$

Due to the non-maximum suppression, Hough features are suppressed, which do not constitute local maxima in the frequency room of the feature vector. This way, Hough features are suppressed, which do not contribute to the searched structure and which are irrelevant for the post-processing. The feature extraction is only parameterized via three thresholds, which can be beforehand usefully adjusted. A detailed explanation of the thresholds can be derived from the following table.

| Threshold value | Description | Comparable parameter of the method according to Katzmann |
|---|---|---|
| $MV_{H_{min}}$ | Threshold value for a minimum frequency, i.e. column total value, which is not allowed to fall below. | Hough-Thres |
| $MV_{KS_{min}}$ | Threshold value for a minimum curve of the Hough feature. With Hough cores with straight line configuration, the threshold relates to the angle area detected by the Hough core. | Bottom-Line |
| $MV_{KS_{max}}$ | Behaves like $MV_{KS_{min}}$ but for a maximum. | Top-Line |

Detailed description of the three threshold values for the extraction of Hough features from the Hough room. Compared to the method according to Katzmann, the parameters are indicated with similar function.

Figure 9I:
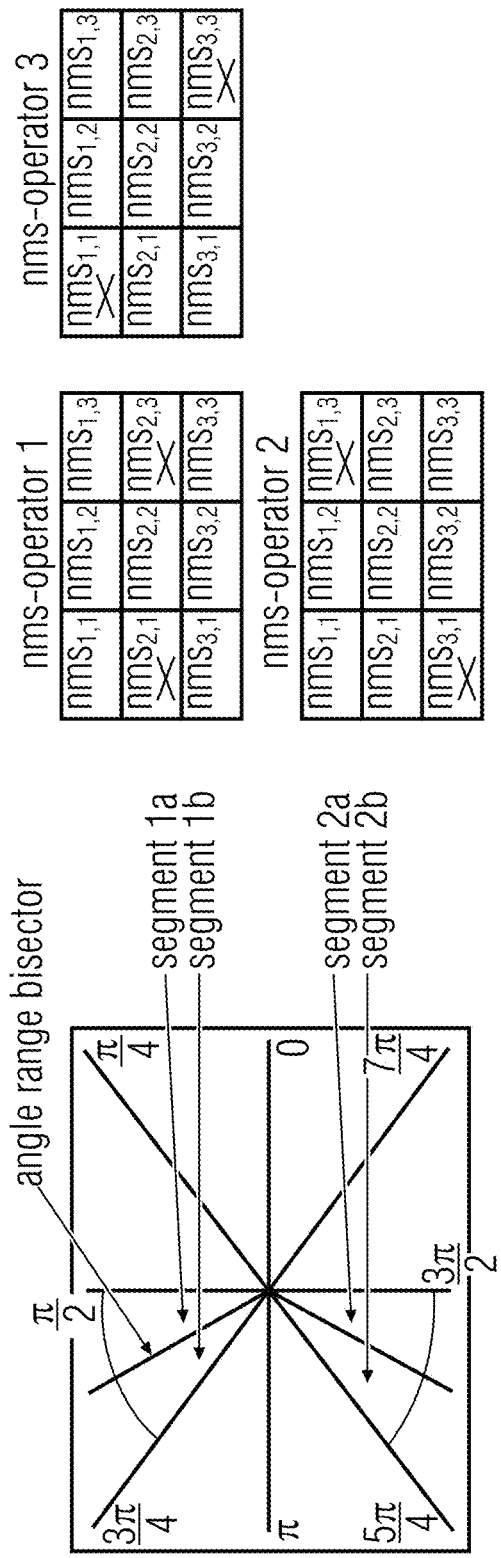

Regarding straight lines, a non-maximum suppression operator of the size 3×3 (cf. FIG. 9h) can be likewise deduced. Thereby, some peculiarities are to be considered. Unlikely to the curves, the searched structures regarding the straight line segments are not detected according to continuously occurring of several maxima along the binary edge development. The non-maximum suppression, thus, can be based on the method in the Canny edge detection algorithm. According to the Hough core type and the detected angle area, three cases can be distinguished (cf. FIG. 9i in combination with the above table). The case distinguishing is valid for rotated as well as for non-rotated initial images, as the retransformation of rotated coordinates only takes place after the non-maximum suppression. Which nms-operator is to be used, depends on the Hough core type and on the angle area, respectively. The angle area provided by a Hough core with configuration for straight lines is divided by the angle area bisection. The angle area bisection can be indicated as Hough core column (decimally refracted) ($MV_{KS_{halbe}}$). The mathematical context depending on the Hough core size is described by formula (B24). In which angle area the Hough feature is lying, refers to the Hough core column having delivered the hit ($MV_{KS}$), which can be directly compared to the angle area bisectional Hough core column.

$$MV_{KS_{half}} = \tan\left(\frac{45}{2}\right) \cdot \frac{\pi}{180} \cdot Houghcore_{size} \quad (B24)$$

If an operator has been selected, the condition regarding the respective nms-operator can be requested similar to the non-maximum suppression for curves (formulas (B25) to (B27)). If all conditions are fulfilled and if additionally the threshold values according to the formulas (B20) to (B22) are exceeded, the Hough feature at position $nms_{2,2}$ can be assumed.

| Hough core type | Angle area | nms-operator | Condition |
|---|---|---|---|
| Range 1a | 1 | A | 1 | $MV_{KS} \leq MV_{KS_{half}}$ |
| Range 1b | 1 | B | 2 | $MV_{KS} > MV_{KS_{half}}$ |

-continued

| | Hough core type | Angle area | nms-operator | Condition |
|---|---|---|---|---|
| Range 2a | 2 | A | 1 | $MV_{KS} \leq MV_{KS_{half}}$ |
| Range 2b | 2 | B | 3 | $MV_{KS} > MV_{KS_{half}}$ |

Decision on one nms-operator depending on the Hough core tye and the angle area, in which the hit occurred.

$$(MV_{nms_{2,2}}{}^H > MV_{nms_{2,2}}{}^H) \wedge (MV_{nms_{2,3}}{}^H > MV_{nms_{2,2}}{}^H) \quad (B25)$$

$$(MV_{nms_{1,3}}{}^H > MV_{nms_{2,2}}{}^H) \wedge (MV_{nms_{3,1}}{}^H > MV_{nms_{2,2}}{}^H) \quad (B26)$$

$$(MV_{nms_{1,1}}{}^H > MV_{nms_{2,2}}{}^H) \wedge (MV_{nms_{3,3}}{}^H > MV_{nms_{2,2}}{}^H) \quad (B27)$$

The completion of the feature extraction forms the re-rotation of the x- and the y-coordinates of rotated Hough features. For the post-processing, these should again be available in the image coordination system. The retransformation is regardless of the curve type (irrelevant if straight line or curve) to be executed, if the rotated initial image is processed. In the formulas (B28) and (B29), the mathematical context is described. With image width, the width of the non-rotated initial image is meant.

$$MV_y = MV_{x_{rot}} \quad (B28)$$

$$MV_x = \text{imagewidth} - MV_{y_{rot}} \quad (B29)$$

By means of the feature extraction, it is possible to reduce the result data of the parallel Hough transformation up to a few points. These may then be transferred to the post-processing as feature vector.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Hough processor comprising the following features:
a pre-processor, which is configured to receive a plurality of samples respectively comprising an image and to rotate the image of the respective sample or to reflect and to output a plurality of versions of the image of the respective sample for each sample; and
a Hough transformation unit, which is configured to collect a predetermined searched pattern within the plurality of samples on the basis of the plurality of versions, wherein a characteristic of the Hough transformation unit, which depends on the searched pattern, is adjustable;
wherein the Hough transformation unit comprises a delay filter the filter characteristic of which depending on the selected searched pattern is adjustable;
wherein the delay filter of the Hough transformation unit comprises one or more delay elements, which are selectively switchable during the ongoing operation in order to allow an adjustment of the filter characteristic of the delay filter;
wherein the Hough transformation unit is connected to a processing unit comprising a unit for analyzing of collected Hough features in order to output a plurality of geometry parameter sets describing the geometry of one or more predefined searched patterns for every sample; and
wherein the processing unit comprises a unit for controlling the adjustable Hough transformation unit in the case of an absent or incorrect recognition of the searched pattern.

2. Hough processor according to claim 1, wherein the Hough transformation unit is configured to determine a pixel-wise correlation.

3. Hough processor according to claim 1, wherein the pre-processor is configured to rotate the image about 360°/n and to reflect the rotated image, in order to output in parallel n versions of the image per sample, or
wherein the pre-processor is configured to output in series a first set of versions comprising the image rotated about 360°/n and a second set of versions, comprising the reflected image and the reflected, rotated image, per sample,
wherein n is number of versions.

4. Hough processor according to claim 1, wherein the Hough transformation unit is configured to collect segments of a predetermined pattern, wherein the predetermined patterns originate from a group comprising at least an ellipsis, a circle, a straight line and a combination of straight line and curve.

5. Hough processor according to claim 1, wherein the delay filter comprises per predetermined searched pattern one column with a plurality of delay elements.

6. Hough processor according to claim 1, wherein the Hough transformation unit per delay element of the delay filter comprises a multiplexer, by means of which the respective delay element is selectively connectable in order to change the filter characteristic.

7. Hough processor according to claim 1, wherein the Hough transformation unit per column comprises an amount member, which is configured to add processed signals by means of the one or more delay elements.

8. Hough processor according to claim 7, wherein the Hough transformation unit is configured to collect segments of the predetermined searched pattern and to output a column amount which allows a conclusion to a maximal accordance degree towards one of the predetermined patterns.

9. Hough processor according to claim 1, wherein the Hough transformation unit is configured to output a multi-dimensional Hough room comprising information on the kind of the collected pattern, an accordance degree with the collected pattern, a position of the collected pattern within the image, a size of the collected pattern segments.

10. Hough processor according to claim 9, wherein the Hough transformation unit comprises a filter processor comprising an amount filter and/or a maximum filter for smoothing the position of the identified pattern in the multi-dimensional Hough room.

11. Hough processor according to claim 9, wherein the Hough transformation unit comprises a Hough extractor, which is configured to select one or more searched pattern segments within the Hough room as Hough features, wherein the selection is based on a non-maxima suppression of the Hough room with predetermined thresholds.

12. Hough processor according to claim 1, wherein the unit for controlling the adjustable Hough transformation unit comprises a first mode for adjusting the characteristic during the operation based on the current characteristic and/or based on the current collection results and a second mode for an initial adjustment of the characteristic during the implementation.

13. Hough processor according to claim 2, wherein the correlation is a correlation between a template predetermined by means of the characteristic and an image content.

14. Hough processor according to claim 13, wherein a plurality of templates is predetermined for which a correlation is determined respectively, in order to, thus, acquire an accordance measure with the image content per pixel.

15. Hough processor according to claim 13, wherein every template is assigned to a characteristic of the searched pattern.

16. Hough processor according to claim 13, wherein the Hough transformation unit is configured to output on the basis of the accordance measure per template per pixel a multi-dimensional room, comprising information on the kind of the collected pattern, an accordance measure with the collected pattern, a position of the collected pattern within the image, a size of the collected pattern segments.

17. Hough processor according to claim 1 comprising an image input stage which is arranged between a camera and a pre-processor.

18. Hough processor according to claim 17, wherein the image input stage comprises a unit for collecting of segmentations and/or edges and/or gradients of an image.

19. Hough processor according to claim 1, wherein the Hough processor is implemented in an embedded processor, a programmable logic component, or a client-specific chip.

20. Image analyzing system for tracking a pupil with the following features:
- a first Hough path for a first camera, wherein the first Hough path comprises a Hough processor according to claim 1; and
- a processing unit comprising a unit for analyzing the collected patterns and for outputting a geometry parameter set, which describes the geometry of one or more predefined searched patterns for each sample.

21. Image analyzing system according to claim 20 the processing unit of which comprises a selective adaptive data processor, which is configured to receive several sets of values, wherein every set is assigned to a respective sample, with the following features:
- a filter processor, which is configured to carry out a smoothing of the sets so that based on the received sets, plausible sets are outputted and so that an implausible set is replaced by a plausible one.

22. Image analyzing system according to claim 20 comprising a second Hough path for a second camera of a stereoscopic camera assembly comprising the first and the second camera, wherein the second Hough path comprises a further Hough processor.

23. Image analyzing system according to claim 22, wherein the processing unit comprises a 3D image analyzer, wherein the 3D image analyzer is configured to receive at least one first set of image data, which is determined on the basis of a first image, and a further set of image information, which is determined on the basis of a further image, wherein the first image comprises a pattern of a three-dimensional object from a first perspective in a first image plane and wherein the further set comprises a relative information describing a relative relation between a point of the three-dimensional object and the first image plane, wherein the 3D image analyzer comprises the following features:
- a position calculator, which is configured to calculate a position of the pattern in a three-dimensional room based on the first set, a further set, which is determined on the basis of a further image, and a geometric relation between the perspectives of the first and the further image, or in order to calculate the position of the pattern in the three-dimensional room based on the first set and a statistically determined relation between two characteristic features in the first image to each other; and
- an alignment calculator configured to calculate a 3D image vector according to which the pattern in the three-dimensional room is aligned, wherein the calculation is based on the first set, the further set and on the calculated position of the pattern.

24. Method for Hough processing comprising:
pre-processing of a plurality of samples respectively comprising an image by using a pre-processor, wherein the image of the respective sample is rotated or reflected so that a plurality of versions of the image of the respective sample for each sample is indicated; and
collecting a predetermined pattern in the plurality of samples on the basis of a plurality of versions by using a Hough transformation unit comprising an adjustable characteristic which depends on the searched pattern, wherein the characteristic is adjusted according to the selected set of patterns;
wherein the Hough transformation unit comprises a delay filter the filter characteristic of which depending on the selected searched pattern is adjustable;
wherein the delay filter of the Hough transformation unit comprises one or more delay elements, which are selectively switchable during the ongoing operation in order to allow an adjustment of the filter characteristic of the delay filter; and
wherein the method further comprises the steps of aliasing of connected Hough features in order to output a plurality of geometry parameter sets describing that the geometry of one or more predefined search patterns for a sample and controlling the adjustable Hough transformation unit in the case of an absent of incorrect recognition of the searched pattern.

25. Method according to claim 24, wherein the adjustable characteristic is a filter characteristic of the delay filter.

26. Method according to claim 25, wherein the adjusting of the delay filter is carried out during the implementation or during the ongoing operation, if the pattern is not or incorrectly recognized.

27. Method according to claim 26, wherein the adjustable characteristic is a post-processed characteristic, a curved characteristic, or a distorted characteristic.

28. Method according to claim 24, wherein collecting of the predetermined pattern comprises determining a pixelwise correlation between a template predetermined by means of a characteristic and an image content, in order to thus acquire an accordance measure with the image content per pixel.

29. A non-transitory digital storage medium having a computer program stored thereon to perform the method for Hough processing comprising:
pre-processing of a plurality of samples respectively comprising an image by using a pre-processor, wherein the image of the respective sample is rotated or reflected so that a plurality of versions of the image of the respective sample for each sample is indicated; and
collecting a predetermined pattern in the plurality of samples on the basis of a plurality of versions by using a Hough transformation unit comprising an adjustable characteristic which depends on the searched pattern, wherein the characteristic is adjusted according to the selected set of patterns;

wherein the Hough transformation unit comprises a delay filter the filter characteristic of which depending on the selected searched pattern is adjustable;

wherein the delay filter of the Hough transformation unit comprises one or more delay elements, which are selectively switchable during the ongoing operation in order to allow an adjustment of the filter characteristic of the delay filter; and wherein the method further comprises the steps of aliasing of connected Hough features in order to output a plurality of geometry parameter sets describing that the geometry of one or more predefined search patterns for a sample and controlling the adjustable Hough transformation unit in the case of an absent of incorrect recognition of the searched pattern;

when said computer program is run by a computer, an embedded processor, a programmable logic component or a client-specific chip.

30. Hough processor according to claim 1, wherein the delay filter is adjusted based on a previous sample of the plurality of samples.

\* \* \* \* \*